United States Patent
Chiang et al.

(10) Patent No.: US 9,786,944 B2
(45) Date of Patent: Oct. 10, 2017

(54) HIGH ENERGY DENSITY REDOX FLOW DEVICE

(75) Inventors: Yet-Ming Chiang, Weston, MA (US); W. Craig Carter, Jamaica Plain, MA (US); Bryan Y. Ho, Berkeley, CA (US); Mihai Duduta, Somerville, MA (US); Pimpa Limthongkul, Boston, MA (US)

(73) Assignees: Massachusetts Institute of Technology, Cambridge, MA (US); 24M Technologies, Inc., Cambridge, MA (US)

( * ) Notice: Subject to any disclaimer, the term of this patent is extended or adjusted under 35 U.S.C. 154(b) by 825 days.

(21) Appl. No.: 12/970,753

(22) Filed: Dec. 16, 2010

(65) Prior Publication Data

US 2011/0200848 A1 Aug. 18, 2011

Related U.S. Application Data

(63) Continuation-in-part of application No. 12/484,113, filed on Jun. 12, 2009, now abandoned.

(Continued)

(51) Int. Cl.
*H01M 8/18* (2006.01)
*B60L 11/18* (2006.01)
*H01M 8/20* (2006.01)

(52) U.S. Cl.
CPC ......... *H01M 8/188* (2013.01); *B60L 11/1875* (2013.01); *B60L 11/1898* (2013.01);
(Continued)

(58) Field of Classification Search
CPC .............................. H01M 8/188; H01M 8/20
See application file for complete search history.

(56) References Cited

U.S. PATENT DOCUMENTS

| | | |
|---|---|---|
| 3,255,046 A | 6/1966 | Ghormley |
| 3,360,401 A | 12/1967 | Grasselli |

(Continued)

FOREIGN PATENT DOCUMENTS

| | | |
|---|---|---|
| CA | 2727399 | 6/2016 |
| CA | 274745 | 11/2016 |

(Continued)

OTHER PUBLICATIONS

Chinese Office Action for Application No. 200980127051.8 mailed Aug. 14, 2013.

(Continued)

*Primary Examiner* — Helen O Conley
(74) *Attorney, Agent, or Firm* — Wolf, Greenfield & Sacks, P.C.

(57) ABSTRACT

Redox flow devices are described in which at least one of the positive electrode or negative electrode-active materials is a semi-solid or is a condensed ion-storing electroactive material, and in which at least one of the electrode-active materials is transported to and from an assembly at which the electrochemical reaction occurs, producing electrical energy. The electronic conductivity of the semi-solid is increased by the addition of conductive particles to suspensions and/or via the surface modification of the solid in semi-solids (e.g., by coating the solid with a more electron conductive coating material to increase the power of the device). High energy density and high power redox flow devices are disclosed. The redox flow devices described herein can also include one or more inventive design features. In addition, inventive chemistries for use in redox flow devices are also described.

19 Claims, 28 Drawing Sheets

Related U.S. Application Data

(60) Provisional application No. 61/287,180, filed on Dec. 16, 2009, provisional application No. 61/060,972, filed on Jun. 12, 2008, provisional application No. 61/175,741, filed on May 5, 2009.

(52) U.S. Cl.
CPC .............. *H01M 8/20* (2013.01); *Y02E 60/528* (2013.01); *Y02T 10/705* (2013.01); *Y02T 90/34* (2013.01)

(56) References Cited

U.S. PATENT DOCUMENTS

| | | | |
|---|---|---|---|
| 3,476,602 A | 11/1969 | Brown et al. | |
| 3,540,933 A | 11/1970 | Boeke | |
| 3,540,934 A | 11/1970 | Boeke | |
| 3,551,207 A | 12/1970 | Herbst | |
| 3,996,064 A | 12/1976 | Thaller | |
| 4,018,971 A | 4/1977 | Sheibley | |
| 4,126,733 A | 11/1978 | Doniat | |
| 4,159,366 A | 6/1979 | Thaller | |
| 4,192,910 A | 3/1980 | Frosch | |
| 4,318,969 A | 3/1982 | Peled | |
| 4,320,180 A | 3/1982 | Nozaki | |
| 4,335,191 A | 6/1982 | Peled | |
| 4,352,864 A | 10/1982 | Struthers | |
| 4,370,392 A | 1/1983 | Savinell | |
| 4,375,501 A | 3/1983 | Peled | |
| 4,382,116 A | 5/1983 | Gahn | |
| 4,410,609 A | 10/1983 | Peled | |
| 4,431,718 A | 2/1984 | Bernard et al. | |
| 4,443,522 A | 4/1984 | Struthers | |
| 4,456,665 A | 6/1984 | Peled | |
| 4,461,815 A | 7/1984 | Peled | |
| 4,485,154 A | 11/1984 | Remick et al. | |
| 4,517,258 A | 5/1985 | Bronoel | |
| 4,576,878 A | 3/1986 | Gahn | |
| 4,614,693 A | 9/1986 | Hashimoto et al. | |
| 4,755,440 A | 7/1988 | Peled | |
| 4,784,924 A | 11/1988 | Savinell | |
| 4,814,240 A | 3/1989 | Zaromb | |
| 4,956,244 A | 9/1990 | Shimizu et al. | |
| 5,061,578 A | 10/1991 | Kozuma et al. | |
| 5,079,104 A | 1/1992 | Roche et al. | |
| 5,308,718 A | 5/1994 | Eidler | |
| 5,368,952 A | 11/1994 | Sonneveld | |
| 5,441,820 A | 8/1995 | Siu et al. | |
| 5,558,961 A | 9/1996 | Doeff et al. | |
| 5,591,538 A | 1/1997 | Eidler | |
| 5,600,534 A | 2/1997 | Eidler | |
| 5,601,943 A | 2/1997 | Eidler | |
| 5,610,802 A | 3/1997 | Eidler | |
| 5,638,952 A | 6/1997 | Kim | |
| 5,650,239 A | 7/1997 | Lex | |
| 5,656,390 A | 8/1997 | Kageyama | |
| 5,674,802 A | 10/1997 | Sheppard | |
| 5,759,711 A | 6/1998 | Miyabayashi | |
| 5,792,576 A | 8/1998 | Xing et al. | |
| 5,837,397 A | 11/1998 | Xing | |
| 5,849,427 A | 12/1998 | Siu et al. | |
| 5,869,200 A | 2/1999 | Nunnally | |
| 5,912,088 A | 6/1999 | Ernst | |
| 6,004,445 A * | 12/1999 | Genders et al. | 204/537 |
| 6,143,443 A | 11/2000 | Kazacos | |
| 6,187,479 B1 | 2/2001 | Liu | |
| 6,203,947 B1 | 3/2001 | Peled | |
| 6,242,125 B1 | 6/2001 | Eidler | |
| 6,261,714 B1 | 7/2001 | Eidler | |
| 6,277,520 B1 | 8/2001 | Moutsios et al. | |
| 6,296,958 B1 | 10/2001 | Pinto et al. | |
| 6,447,943 B1 | 9/2002 | Peled | |
| 6,455,187 B1 | 9/2002 | Tomazic | |
| 6,468,688 B2 | 10/2002 | Kazacos | |
| 6,492,047 B1 | 12/2002 | Peled | |
| 6,497,973 B1 | 12/2002 | Amendola | |
| 6,551,745 B2 | 4/2003 | Moutsios et al. | |
| 6,555,267 B1 | 4/2003 | Broman et al. | |
| 6,562,514 B1 | 5/2003 | Kazacos | |
| 6,689,507 B1 | 2/2004 | Tsutsumi et al. | |
| 6,720,107 B1 | 4/2004 | Holtom | |
| 6,764,789 B1 | 7/2004 | Sekiguchi | |
| 6,811,911 B1 | 11/2004 | Peled | |
| 6,979,512 B2 | 12/2005 | Phillips | |
| 6,986,966 B2 | 1/2006 | Clarke | |
| 7,033,696 B2 | 4/2006 | Clarke | |
| 7,078,123 B2 | 7/2006 | Kazacos | |
| 7,214,443 B2 | 5/2007 | Clarke et al. | |
| 7,252,905 B2 | 8/2007 | Clarke | |
| 7,270,911 B2 | 9/2007 | Clarke | |
| 7,297,437 B2 | 11/2007 | Clarke et al. | |
| 7,320,844 B2 | 1/2008 | Skyllas-Kazacos | |
| 7,338,734 B2 | 3/2008 | Chiang et al. | |
| 7,412,824 B1 | 8/2008 | Newburry et al. | |
| 7,413,824 B2 | 8/2008 | Peled et al. | |
| 7,521,149 B2 | 4/2009 | Medeiros | |
| 7,560,189 B2 | 7/2009 | Clarke | |
| 7,625,663 B2 | 12/2009 | Clarke | |
| 8,097,364 B2 | 1/2012 | Reynolds | |
| 8,133,629 B2 | 3/2012 | McLean et al. | |
| 8,541,138 B2 | 9/2013 | Kazacos et al. | |
| 8,722,226 B2 | 5/2014 | Carter et al. | |
| 8,722,227 B2 | 5/2014 | Chiang et al. | |
| 8,778,552 B2 | 7/2014 | Chiang et al. | |
| 9,153,833 B2 | 10/2015 | Chiang et al. | |
| 9,293,781 B2 | 3/2016 | Zhou et al. | |
| 2001/0028977 A1 | 10/2001 | Kazacos et al. | |
| 2001/0055713 A1 | 12/2001 | Eidler et al. | |
| 2003/0022059 A1 | 1/2003 | Ito et al. | |
| 2003/0039868 A1 | 2/2003 | Liberatore et al. | |
| 2003/0091883 A1 | 5/2003 | Peled et al. | |
| 2003/0143456 A1 | 7/2003 | Kazacos et al. | |
| 2003/0211377 A1 | 11/2003 | Holmes et al. | |
| 2004/0151977 A1 | 8/2004 | Morrisey et al. | |
| 2004/0191623 A1 | 9/2004 | Kubata et al. | |
| 2004/0209153 A1 | 10/2004 | Peled et al. | |
| 2004/0234843 A1 | 11/2004 | Skyllas-Kazacos et al. | |
| 2004/0241552 A1 | 12/2004 | Skyllas-Kazacos et al. | |
| 2005/0069752 A1 | 3/2005 | Tiquet et al. | |
| 2005/0175890 A1 | 8/2005 | Tsutsumi et al. | |
| 2005/0244707 A1 | 11/2005 | Skyllas-Kazacos et al. | |
| 2005/0252786 A1 | 11/2005 | DiMascio | |
| 2006/0032046 A1 | 2/2006 | Nathan et al. | |
| 2006/0063065 A1 | 3/2006 | Clarke et al. | |
| 2006/0183016 A1 | 8/2006 | Kazacos et al. | |
| 2006/0194115 A1 * | 8/2006 | De Jonghe et al. | 429/246 |
| 2006/0204810 A1 | 9/2006 | Surampudi et al. | |
| 2008/0131357 A1 | 6/2008 | Kumar et al. | |
| 2008/0142373 A1 | 6/2008 | Joshi et al. | |
| 2008/0241629 A1 | 10/2008 | Peled et al. | |
| 2008/0292964 A1 | 11/2008 | Kazacos et al. | |
| 2009/0017379 A1 | 1/2009 | Inatomi et al. | |
| 2009/0032754 A1 | 2/2009 | Pechtold | |
| 2009/0159347 A1 | 6/2009 | Zhou et al. | |
| 2009/0253025 A1 | 10/2009 | Whitacre | |
| 2010/0047671 A1 | 2/2010 | Chiang et al. | |
| 2010/0141211 A1 | 6/2010 | Yazami | |
| 2010/0190042 A1 | 7/2010 | Wahl et al. | |
| 2010/0248046 A1 | 9/2010 | Kimura et al. | |
| 2010/0323264 A1 | 12/2010 | Chiang et al. | |
| 2011/0189520 A1 | 8/2011 | Carter et al. | |
| 2011/0274948 A1 | 11/2011 | Duduta et al. | |
| 2012/0003518 A1 | 1/2012 | Fischel | |
| 2012/0164499 A1 | 6/2012 | Chiang et al. | |
| 2014/0154546 A1 | 6/2014 | Carter et al. | |
| 2014/0248521 A1 | 9/2014 | Chiang et al. | |
| 2015/0129081 A1 | 5/2015 | Chiang et al. | |
| 2016/0013507 A1 | 1/2016 | Chiang et al. | |

(56) References Cited

U.S. PATENT DOCUMENTS

| | | | |
|---|---|---|---|
| 2016/0218375 A1 | 7/2016 | Chiang et al. | |
| 2016/0268621 A1 | 9/2016 | Chiang et al. | |

FOREIGN PATENT DOCUMENTS

| | | | | |
|---|---|---|---|---|
| CN | 1209219 | A | 2/1999 | |
| CN | 1372703 | A | 10/2002 | |
| CN | 1610155 | A | 4/2005 | |
| CN | 1623246 | A | 6/2005 | |
| CN | 1697231 | A | 11/2005 | |
| CN | 1319207 | C | 5/2007 | |
| CN | 101110481 | A | 1/2008 | |
| CN | 101213700 | A | 7/2008 | |
| CN | 201549546 | U | 8/2010 | |
| CN | 201410526190.0 | | 8/2016 | |
| EP | 0330290 | B1 | 5/1996 | |
| EP | 1176658 | * | 1/2002 | ........... H01M 10/40 |
| EP | 1519433 | A1 | 3/2005 | |
| EP | 09 762 935.6-2119 | | 9/2011 | |
| GB | 2346006 | A | 7/2000 | |
| GB | 2374722 | A | 10/2002 | |
| JP | S5769663 | A | 4/1982 | |
| JP | S57121167 | A | 7/1982 | |
| JP | H05-182697 | A | 7/1993 | |
| JP | 2000-502832 | A | 3/2000 | |
| JP | 2002-518795 | A | 6/2002 | |
| JP | 2002-216833 | A | 8/2002 | |
| JP | 2002-536783 | A | 10/2002 | |
| JP | 2006-520520 | A | 9/2006 | |
| JP | 2008-544444 | A | 12/2008 | |
| JP | 2009-224141 | A | 10/2009 | |
| JP | 2011-524074 | | 8/2011 | |
| JP | 2012-523103 | | 9/2012 | |
| JP | 2014-14830 | | 2/2016 | |
| KR | 10-20117000724 | | 7/2016 | |
| WO | WO 97/24774 | | 7/1997 | |
| WO | WO 99/65100 | | 12/1999 | |
| WO | WO 00/44058 | A2 | 7/2000 | |
| WO | WO 2004/082056 | A1 | 9/2004 | |
| WO | WO 2006/129635 | A1 | 12/2006 | |
| WO | WO 2006/135958 | | 12/2006 | |
| WO | WO 2008/128341 | | 10/2008 | |
| WO | WO 2008/148148 | A1 | 12/2008 | |
| WO | WO 2009/010051 | A2 | 1/2009 | |
| WO | 2009/003551 | | 9/2009 | |
| WO | WO 2009/151639 | A1 | 12/2009 | |
| WO | WO 2010/118060 | A1 | 10/2010 | |
| WO | 2010/060876 | | 5/2011 | |
| WO | WO 2011/084649 | A3 | 7/2011 | |
| WO | 2011/031748 | | 8/2011 | |
| WO | WO 2011/127384 | A1 | 10/2011 | |
| WO | 2011/048266 | | 11/2011 | |
| WO | WO 2012/024499 | A1 | 2/2012 | |
| WO | WO 2012/083233 | A1 | 6/2012 | |

OTHER PUBLICATIONS

Office Action for U.S. Appl. No. 13/975,474 mailed Jan. 30, 2014.
Notice of Allowance for U.S. Appl. No. 13/975,474 mailed Mar. 4, 2014.
International Search Report and Written Opinion for PCT/US2011/031748, mailed Aug. 24, 2011.
International Search Report and Written Opinion for PCT/US2009/003551, mailed Sep. 21, 2009.
International Search Report and Written Opinion for PCT/US2010/60876, mailed May 23, 2011.
International Search Report and Written Opinion for PCT/US2011/048266, mailed Nov. 23, 2011.
European Office Action for EP 09 762 935.6-2119, dated Sep. 27, 2011.
Amatucci, G.G., and N. Pereira, "Fluoride based electrode materials for advanced energy storage devices", Journal of Fluorine Chemistry, 128 (4), p. 243-262, (2007).
Armand, M. et al., Conjugated dicarboxylate anodes for Li-ion batteries, Nature Materials, 8, 120-125 (2009) DOI: 10.1038/nmat2372).
Badway, "Carbon Metal Fluoride Nanocomposites" *J. Electrochem. Soc.*, 150 (9) A1209-A1218 (2003).
Badway, "Carbon Metal Fluoride Nanocomposites: High-Capacity Reversible Metal Fluoride Conversion Materials as Rechargeable Positive Electrodes for Li Batteries" *J. Electrochem. Soc.* 2003, vol. 150, Issue 10, pp. A1318-A1327.
Badway, et al. "Structure and Electrochemistry of Copper Fluoride Nanocomposites Utilizing Mixed Conducting Matrices" *Chem. Mater.* 2007, 19, 4129-4141.
Bae, et al. "Chromium redox couples for application to redox flow batteries" *Electrochimica Acta* 48 (2002) 279/287.
Bartolozzi, "Development of Redox Flow Batteries. A Historical Bibliography" *Journal of Power Sources*, 27 (1989) 219-234.
Bazylak, et al. "Improved fuel utilization in microfluidic fuel cells a computational study" *Journal of Power Sources* 143 (2005) 57-66.
Bervas, et al. "Bismuth Fluoride Nanocomposite as a Positive Electrode Material for Rechargeable Lithium Batteries" *Electrochem. Solid-State Lett.* 2005, vol. 8, Issue 4, pp. A179-A183.
Bervas, et al. "Investigation of the Lithiation and Delithiation Conversion Mechanisms of Bismuth Fluoride Nanocomposites" *J. Electrochemical Society*, 153(4) A799-A808 (2006).
Bervas, M., L.E. Klein, and G.G. Amatucci, "Reversible Conversion Reactions with Lithium in Bismuth Oxyfluoride Nanocomposites", J. Electrochem. Soc., 153, A 159 (2006).
Chakrabarti, M., "Evaluation of electrolytes for redox flow battery applications," Electrochemica Acta, 52, 2189 (2007).
Chan, et al. "High-performance lithium battery anodes using silicon nanowires" *Letters* nature nanotechnology (3) 31-35 (2008).
Chen, et al. "Solution Redox Couples for Electrochemical Energy Storage" *J. Electrochem. Soc.* vol. 128, No. 7: 1460-67 (1981).
Chen, Gary S. Beck, and P. Styring. Numerical model of a single phase, regenerative fuel cell, Fuel Cell Science and Technology Conference Proceeding, Jun. 14-16, Rochester NY 2004.
Cosandey, et al. "EELS Spectroscopy of Iron Fluorides and FeFx/C Nanocomposite Electrodes Used in Li-Ion Batteries" *Microscopy and Microanalysis*, vol. 13,Issue 02, (2007) pp. 87-95.
De Leon, et al. "Redox Flow Cells for Energy Conversion" *Journal of Power Sources* 160 (2006) 716-732.
Duduta, et al. "Semi-Solid Lithium Rechargeable Flow Battery" *Adv. Energy Mater.* (2011), 1, 511-516.
Endo, et. al., "Electrochemistry of tris((β-diketonato)ruthenium(III) complexes at platinum electrodes in nonaqueous solutions and substituent effects on their reversible half-wave potentials," Bulletin of the Chemical Society of Japan, 1989 62(3), 709-716.
Giridharan, M. G., S. Krishnamoorthy, and A. Krishnan. Computational simulation of microfluidics, electrokinetics, and particle transport in biological mems devices. In Proceedings of SPIE, vol. 3680, p. 150, 1999.
Hong, et al. "A novel in-plane passive microfluidic mixer with modified Tesla structures" *The Royal Society of Chemistry* Lab Chip,(2004), 4 , 109-113.
Johnson, T.J. and Laurie E Locascio. Characterization and optimization of slanted well designs for microfluidic mixing under electroosmotic flow. Lab on a chip, 2(3): 135-40,2002.
Koo, J., and S. Kleinstreuer. Liquid flow in microchannels: experimental observations and computational analyses of microfluidics effects. Journal of Micromechanics and Microengineering, 13(5):568,2003.
Kumar, "Effect of channel dimensions and shape in the flow-field distributor on the performance of polymer electrolyte membrane fuel cells" *Journal of Power Sources* 113 (2003) 11-18.
Lee, et al. "Fabricating Genetically Engineered High-Power Lithium-Ion Batteries Using Multiple Virus Genes" *Science* 324, 1051 (2009).
Li et al. "Li-Storage via Heterogeneous Reaction in Selected Binary Metal Fluorides and Oxides" *J. Electrochem. Soc.* 2004, vol. 151, Issue 11, pp. A1878-A1885.
Li, W., J.R. Dahn, and D.S. Wainwright, "Rechargeable Lithium Batteries with Aqueous Electrolytes" (Science, vol. 264, p. 1115, May 20, 1994).

(56) References Cited

OTHER PUBLICATIONS

Molenda, J., A. Stoklosa, T. Bak, "Modification in the electronic structure of cobalt bronze LixCoO2 and the resulting electrochemical properties," Solid State Ionics, 36,53 (1989).
Morikawa, H. Kikuchi, N. Saito, "Development and Advances of a V-Flow FC Stack for FCX Clarity," SAE Paper 2009-01-1010, SAE International, 2009.
Nakahara, et al. "Rechargeable batteries with organic radical cathodes" Chemical Physics Letters 359 (2002) 351-354.
Nam et al. "Virus enabled synthesis and assembly of nanowires for lithium ion battery electrodes" Science 312, 885 (2006).
Nishide, et al. "Organic radical battery: nitroxide polymers as a cathode-active material" Electrochimica Acta 50 (2004) 827-831.
Pereira, et al. "Iron Oxyfluorides as High Capacity Cathode Materials for Lithium Batteries" J. Electrochem. Soc. 2009, vol. 156, Issue 6, pp. A407-A416.
Plitz, et al. "Structure and Electrochemistry of Carbon-Metal Fluoride Nanocomposites Fabricated by Solid-State Redox Conversion Reaction" J. Electrochem. Soc. 2005, vol. 152, Issue 2, pp. A307-A315.
Plurion Advantages Webpage (Access date of Jun. 23, 2010).
Plurion Advantages Webpage (Access date of May 14, 2008).
Price, A., S. Male, M. Kleimaier, "The Regenesys Utility-Scale Flow Battery Technology: Flow Battery Technologies for Electrical Energy Storage," VDI Berichte 1734, 47 (2002).
Ruffo, et al. "Electrochemical behavior of LiCoO2 as aqueous lithium-ion battery electrodes" Electrochemistry Communications 11 (2009) 247-249.
Skyllas-Kazacos, "Efficient Vanadium Redox Flow Cell" J. Electrochem. Soc. vol. 134, No. 12 (1987).
US Geological Survey—USGS 2010, Mineral Commodity Summaries.
Walsh "Electrochemical technology for environmental treatment and clean energy conversion" Pure Appl. Chem., vol. 73, No. 12, pp. 1819-1837, 2001.
Wang, Hengzi, P. Iovenitti, E. Harvey, and S. Masood. Optimizing layout of obstacles for enhanced mixing in microchannels. Smart Materials and Structures, I 1(5):662, 2002.
Wen, et al. "A study of the Fe(III)/Fe(II)—triethanolamine complex redox couple for redox flow battery application" Electrochimica Acta 51 (2006) 3769-3775.
Yamamura, T., et. al., "Enhancements in the electron transfer kinetics of uranium-based redox couples induced by tetraketone ligands with potential chelate effect," Journal of Physical Chemistry, 111, 18812 (2007).
Jossen et al., Advances in redox-flow batteries. First International Renewable Energy Storage Conference. Gelsenkirchen, Germany Oct. 30-31, 2006. 23 pages.
European Extended Search Report mailed Dec. 9, 2013 for Application No. EP 13187507.2.
International Preliminary Report on Patentability mailed Dec. 23, 2010 for PCT/US2009/003551.
International Preliminary Report on Patentability mailed Jun. 28, 2012 for PCT/US2010/060876.
International Preliminary Report on Patentability mailed Oct. 18, 2012 for PCT/US2011/031748.
International Preliminary Report on Patentability mailed Feb. 28, 2013 for PCT/US2011/048266.
Chinese Office Action for Application No. 200980127051.8 mailed Dec. 26, 2012.
Japanese Office Action mailed Dec. 22, 2014 for Application No. JP 2012-544855.
Canadian Office Action mailed Aug. 11, 2015 for Application No. CA 2727399.
Korean Office Action for Application No. KR 10-2011-7000724 mailed Aug. 28, 2015.
Chinese Office Action mailed Feb. 12, 2015 for Application No. CN 200980127051.8.
International Search Report and Written Opinion for Application No. PCT/US2010/030136 dated Jul. 13, 2010.
Japanese Office Action for Application No. JP 2011-513506 dated Jul. 29, 2013.
[No Author Listed] Basic principle of the vandium fuel cell. Cellennium (Thailand) Company Limited: Technology. <http://www.vandiumbattery.com/technology.asp> Accessed Apr. 12, 2009. 2 pages.
[No Author Listed] Depertment of Energy Tutorial: II. Energy storage technology overview. <http://www.netl.doe.gov/technologies/coalpower/fuelcells/seca/tutorial/Tutorialll/files/Tutorialll> 61 pages.
[No Author Listed] Flow cell battery recharges power grid. Advanced Battery Technology. Apr. 2003. <http://findarticles.com/p/articles/mi/qa3864/is/200304/ai/n9167647/.pdf> 4 pages.
[No Author Listed] Proposal No. N091-053-0414. High system-power density flow battery for advanced modular, energy storage technology. Navy SBIR FY2009.1. 2 pages.
Amatucci, Battery materials and issues for grid applications. Rutgers Department of Material Science and Engineering. Stanford University Global Climate & Energy Project. Nov. 2, 2007. <http://gcep.stanford.edu/pdfs/iq9bO__1Ib0rRuH_ve0A2jA/Amatucci-20071102.pdf> 33 pages.
Asgeirsson, Zinc bromine flow battery at detroit edison utility application. California energy commission workshop. Feb. 24, 2005. DTE Energy. 35 pages.
Davidson, New battery packs powerful punch. USA Today. Jul. 4, 2007. 3 pages.
De Boer et al., Flow batteries. KEMA. Jun. 2007. Leonardo Energy. Pages 1-9.
Flow/Redox Batteries: Technologies, Applications and Markets. The New Management Report from EscoVale Consultancy Services. Report #5061. No date given. 7 pages.
Katz et al., Chapter 21: Biochemical fuel cells. Handbook of Fuel Cells—Fundamentals, Technology and Applications, vol. 1: Fundamentals and Survey of Systems. Edited by Vielstich et al. John Wiley & Sons. 2003. 27 pages.
Kuntz, Flow battery storage application with wind power. California Energy Commission Staff Workshop: Meeting California's electricity system challenges through electricity energy storage. Feb. 24, 2005. VRB Power Systems Inc. 15 pages.
Medeiros et al., Magnesium-solution phase catholyte semi-fuel cell for undersea vehicles. International Power Sources Symposium. ScienceDirect. Oct. 2004;136(2):226-31.
Miley et al., Optimization of the H2O2—NaBH4 regenerative fuel cell for space power applications using FEMLAB modeling. Proceedings of the COMSOL Multiphysics User's Conference 2005 Boston. <http://cds.comsol.com/access/dl/papers/1090/Miley.pdf> 6 pages.
Officer, Better rechargable batteries. Anzode (NZ) Ltd. Anzode Clean Energy Solutions. No date given. 13 pages.
Peek, Evaliation of utility scale system. TVA Regenesys Flow Battery Demonstration. Sandia National Laboratories. Oct. 30, 2003. 18 pages.
Pillai et al., Studies on promising cell performance with H2SO4 as the catholyte for electrogeneration of AG2+ from AG+ in HNO3 anolyte in mediated electrochemical oxidation process. J Appl Electrochem. Jan. 2009;39(1):23-30.
Regenesys Utility Scale Energy Storage. Project Summary. DTI. Contract No. K/EL/00246/00/00. URN No. 04/1048. 20 pages
Rydh et al., Energy analysis of batteries in photovoltaic systems. EESAT 2003. San Francisco, CA. Oct. 27-29, 2003. 6 pages.
Rydh et al., Energy analysis of batteries in photovoltaic systems. Part I: Performance and energy requirements. Energy Conversion and Management. 2005;46:1957-79.
Rydh et al., Energy analysis of batteries in photovoltaic systems. Part II: Energy return factors and overall battery efficiencies. Energy Conversion and Management. 2005;46:1980-2000.
Thaller, Cleantech energy storage blog: Redox flow batteries . . . Then and now (part 1). Sep. 4, 2008. <http://www.deeyaenergy.com/blog/bid/5225/Redox-Flow-Batteries-Then-And-Now-Part-1> Accessed Apr. 12, 2009. 4 pages.
Thomas, Persistence and progress: The zinc bromine battery. ZBB. No date given. 27 pages.

(56) References Cited

OTHER PUBLICATIONS

USF and Progress Energy Florida purchase two 5kW×4hr VRB Energy Storage Systems. VRB Power Systems Inc. News Release. Jul. 25, 2007. 2 pages.

ZBB Energy aims for sales of up to US$38m in zinc bromine batteries form new Chinese joing venture. Media Release. ZBB Energy Corporation. Mar. 30, 2005. 2 pages.

ZBB Energy Corporation. The ZBB is the best battery for renewable energy storage! No date given. 65 pages.

Chinese Office Action for Application No. 201080063874.1 dated Apr. 24, 2014.

Extended European Search Report dated Aug. 21, 2014 for Application No. EP 11848843.6.

[No Author Listed] Department of Energy Tutorial: II. Energy storage technology overview. <http://www.netl.doe.gov/technologies/coalpower/fuelcells/seca/tutorial/TutorialII/files/TutorialII> 61 pages; 2010.

Garrard et al, Numerical model of single phase, regenerative fuel cell, Fuel Cell Science, Engineering and Technology conference Proceeding, Jun. 14-16, 2004. Rochester, NY, pp. 79-84. 8 pgs.

Chinese Office Action dated Nov. 24, 2015 for Application No. CN 200980127051.8.

Japanese Office Action for Application No. 2014-14830 dated Feb. 25, 2016.

Canadian Office Action dated Jun. 8, 2016 for Application No. CA 2727399.

Korean Office Action for Application No. KR 10-2011-7000724 dated Jul. 11, 2016.

Canadian Office Action dated Nov. 21, 2016 for Application No. CA 2,784,745.

Chinese Office Action for Application No. 201410526190.0 dated Aug. 18, 2016.

Chung et al., Electronically conductive phospho-olivines as lithium storage electrodes.Nat Mater. Oct. 2002;1(2):123-8.

Huang et al., Preparation and electrochemical performance of Ag doped $Li_4Ti_5O_{12}$. Electrochemistry Communications Nov. 2004;6(110):1093-97.

Kinchin, The Electrical Properties of Graphite. Proceedings of the Royal Society of London. Series A, Mathematical and Physical Sciences. Mar. 24, 1953; 217(1128): 9-26.

Leonidov et al., Structure, Iconic Conduction, and Phase Transformations in Lithium Titanate $Li_4Ti_5O_{12}$ Physics of the Solid State, 2003 45(11): 2079-2085.

U.S. Appl. No. 14/840,810, filed Aug. 31, 2015, Chiang et al.
U.S. Appl. No. 14/824,664, filed Aug. 12, 2015, Chiang et al.
U.S. Appl. No. 15/045,718, filed Feb. 17, 2016, Chiang et al.
Extended European Search Report for Application No. EP 17163848.9, dated Jun. 14, 2017.

* cited by examiner

| Material | Operating Voltage (V) | Capacity (mAh/g) | Potential vs. Li (V) | SSDE | DMC | DXL | DOL | [Li(G4)]TFSI |
|---|---|---|---|---|---|---|---|---|
| | | | 5 | | | | | |
| Li₂MnO₂ LiMO₂* | 4.5 | 250 | 4.5 | | | | | |
| LiCoO₂ | 3.9 | 140 | 4 | | | | | |
| LiFePO₄ | 3.4 | 170 | 3.5 | | | | | |
| LiMn₂O₄ | 2.8 – 3.2 | 140 | 3 | | | | | |
| | | | 2.5 | | | | | |
| | | | 2 | | | | | |
| LTO | 1.55 | 170 | 1.5 | | | | | |
| Si | 0.5 – 1 | 4200 | 1 | | | | | |
| 3M anode | 0.4 – 0.5 | 450 | 0.5 | | | | | |
| Graphite | 0.1 – 0.2 | 340 | 0 | | | | | |

HIGH ENERGY DENSITY REDOX FLOW DEVICE

RELATED APPLICATIONS

This application is a continuation-in-part of U.S. patent application Ser. No. 12/484,113, entitled "High Energy Density Redox Flow Device," filed Jun. 12, 2009, which claims priority under 35 U.S.C. §119(e) to U.S. Provisional Patent Application Ser. No. 61/060,972, entitled "High Energy Density Redox Flow Battery," filed Jun. 12, 2008 and U.S. Provisional Patent Application Ser. No. 61/175,741, filed May 5, 2009, entitled "High Energy Density Redox Flow Battery." This application also claims priority under 35 U.S.C. §119(e) to U.S. Provisional Patent Application Ser. No. 61/287,180, entitled "High Energy Density Redox Flow Device," filed Dec. 16, 2009. Each of these applications is incorporated herein by reference in its entirety for all purposes.

INCORPORATION BY REFERENCE

All patents, patent applications and documents cited herein are hereby incorporated by reference in their entirety for all purposes.

STATEMENT REGARDING FEDERALLY SPONSORED RESEARCH OR DEVELOPMENT

This invention was made with government support under Grant Number DE-FC26-05NT42403 awarded by the Department of Energy. The government has certain rights in this invention.

BACKGROUND

A battery stores electrochemical energy by separating an ion source and an ion sink at differing ion electrochemical potential. A difference in electrochemical potential produces a voltage difference between the positive and negative electrodes; this voltage difference will produce an electric current if the electrodes are connected by a conductive element. In a battery, the negative electrode and positive electrode are connected by two conductive elements in parallel. The external element conducts electrons only, and the internal element (electrolyte) conducts ions only. Because a charge imbalance cannot be sustained between the negative electrode and positive electrode, these two flow streams supply ions and electrons at the same rate. In operation, the electronic current can be used to drive an external device. A rechargeable battery can be recharged by application of an opposing voltage difference that drives electronic current and ionic current in an opposite direction as that of a discharging battery in service. Thus, the active materials of rechargeable batteries need to be able to accept and provide ions. Increased electrochemical potentials produce larger voltage differences the cathode and anode, and increased voltage differences increase the electrochemically stored energy per unit mass of the device. For high-power devices, the ionic sources and sinks are connected to the separator by an element with large ionic conductivity, and to the current collectors with high electronic conductivity elements.

Rechargeable batteries can be constructed using static negative electrode/electrolyte and positive electrode/electrolyte media. In this case, non-energy storing elements of the device comprise a fixed volume or mass fraction of the device; thereby decreasing the device's energy and power density. The rate at which current can be extracted is also limited by the distance over which cations can be conducted. Thus, power requirements of static cells constrain the total capacity by limiting device length scales.

Redox flow batteries, also known as a flow cells or redox batteries or reversible fuel cells are energy storage devices in which the positive and negative electrode reactants are soluble metal ions in liquid solution that are oxidized or reduced during the operation of the cell. Using two reversible redox couples, liquid state redox reactions are carried out at the positive and negative electrodes. A redox flow cell typically has a power-generating assembly comprising at least an ionically transporting membrane separating the positive and negative electrode reactants (also called catholyte and anolyte respectively), and positive and negative current collectors (also called electrodes) which facilitate the transfer of electrons to the external circuit but do not participate in the redox reaction (i.e., the current collector materials themselves do not undergo Faradaic activity). Redox flow batteries have been discussed by C. Ponce de Leon, A. Frias-Ferrer, J. Gonzalez-Garcia, D. A. Szantos and F. C. Walsh, "Redox Flow Batteries for Energy Conversion," J. Power Sources, 160, 716 (2006), M. Bartolozzi, "Development of Redox Flow Batteries: A Historical Bibliography," J. Power Sources, 27, 219 (1989), and by M. Skyllas-Kazacos and F. Grossmith, "Efficient Vanadium Redox Flow Cell," Journal of the Electrochemical Society, 134, 2950 (1987).

Differences in terminology for the components of a flow battery and those of conventional primary or secondary batteries are herein noted. The electrode-active solutions in a flow battery are typically referred to as electrolytes, and specifically as the catholyte and anolyte, in contrast to the practice in lithium ion batteries where the electrolyte is solely the ion transport medium and does not undergo Faradaic activity. In a flow battery, the non-electrochemically active components at which the redox reactions take place and electrons are transported to or from the external circuit are known as electrodes, whereas in a conventional primary or secondary battery they are known as current collectors.

While redox flow batteries have many attractive features, including the fact that they can be built to almost any value of total charge capacity by increasing the size of the catholyte and anolyte reservoirs, one of their limitations is that their energy density, being in large part determined by the solubility of the metal ion redox couples in liquid solvents, is relatively low. Methods of increasing the energy density by increasing the solubility of the ions are known, and typically involve increasing the acidity of the electrode solutions. However, such measures which may be detrimental to other aspects of the cell operation, such as by increasing corrosion of cell components, storage vessels, and associated plumbing. Furthermore, the extent to which metal ion solubilities may be increased is limited.

In the field of aqueous electrolyte batteries, and specifically batteries that utilize zinc as an electroactive material, electrolytes that comprise a suspension of metal particles and in which the suspension is flowed past the membrane and current collector, have been described. See for example U.S. Pat. Nos. 4,126,733 and 5,368,952 and European Patent EP 0330290B1. The stated purpose of such electrodes is to prevent detrimental Zn metal dendrite formation, to prevent detrimental passivation of the electrodes, or to increase the amount of zincate that can be dissolved in the positive electrode as the cell discharges. However, the energy density of such fluidized bed batteries even when electrolytes with a suspension of particles are used remains relatively low.

Thus, there remains a need for high energy-density and high power-density energy storage devices.

SUMMARY

Redox flow energy storage devices are described in which at least one of the positive electrode or negative electrode-active materials may include a semi-solid or a condensed ion-storing liquid reactant, and in which at least one of the electrode-active materials may be transported to and from an assembly at which the electrochemical reaction occurs, producing electrical energy. By "semi-solid" it is meant that the material is a mixture of liquid and solid phases, for example, such as a slurry, particle suspension, colloidal suspension, emulsion, gel, or micelle. "Condensed ion-storing liquid" or "condensed liquid" means that the liquid is not merely a solvent as it is in the case of an aqueous flow cell catholyte or anolyte, but rather, that the liquid is itself redox-active. Of course, such a liquid form may also be diluted by or mixed with another, non-redox-active liquid that is a diluent or solvent, including mixing with such a diluent to form a lower-melting liquid phase, emulsion, or micelles including the ion-storing liquid.

In one aspect, a redox flow energy storage device is described. The redox flow energy storage device includes:
  a positive electrode current collector, a negative electrode current collector, and an ion-permeable membrane separating the positive and negative current collectors;
  a positive electrode disposed between the positive electrode current collector and the ion-permeable membrane; the positive electrode current collector and the ion-permeable membrane defining a positive electroactive zone accommodating the positive electrode;
  a negative electrode disposed between the negative electrode current collector and the ion-permeable membrane; the negative electrode current collector and the ion-permeable membrane defining a negative electroactive zone accommodating the negative electrode;
  where at least one of the positive and negative electrode includes a flowable semi-solid or condensed liquid ion-storing redox composition which is capable of taking up or releasing the ions during operation of the cell.

In some embodiments, both of the positive and negative electrodes of the redox flow energy storage device include the flowable semi-solid or condensed liquid ion-storing redox compositions.

In some embodiments, one of the positive and negative electrodes of the redox flow energy storage device includes the flowable semi-solid or condensed liquid ion-storing redox composition, and the remaining electrode is a conventional stationary electrode.

In some embodiments, the flowable semi-solid or condensed liquid ion-storing redox composition includes a gel.

In some embodiments, the steady state shear viscosity of the flowable semi-solid or condensed liquid ion-storing redox composition of the redox flow energy storage device is between about 1 cP and about 1,500,000 cP or between about 1 cP and 1,000,000 cP at the temperature of operation of the redox flow energy storage device.

In some embodiments, the ion is selected from the group consisting of $Li^+$, $Na^+$, $H^+$.

In some embodiments, the ion is selected from the group consisting of $Li^+$ and $Na^+$, $Mg^{2+}$, $Al^{3+}$, and $Ca^{2+}$.

In some embodiments, the flowable semi-solid ion-storing redox composition includes a solid including an ion storage compound.

In some embodiments, the ion is a proton or hydroxyl ion and the ion storage compound includes those used in a nickel-cadmium or nickel metal hydride battery.

In some embodiments, the ion storage compound stores ions by undergoing a displacement reaction or a conversion reaction.

In some embodiments, the ion is lithium and the ion storage compound is selected from the group consisting of metal fluorides such as $CuF_2$, $FeF_2$, $FeF_3$, $BiF_3$, $CoF_2$, and $NiF_2$.

In some embodiments, the ion is lithium and the ion storage compound is selected from the group consisting of metal oxides such as CoO, $Co_3O_4$, NiO, CuO, and MnO.

In some embodiments, the ion storage compound comprises an intercalation compound.

In some embodiments, the ion is lithium and the ion storage compound comprises an intercalation compound.

In some embodiments, the ion is sodium and the ion storage compound comprises an intercalation compound.

In some embodiments, the ion is lithium and the ion storage compound includes an intercalation compound selected from compounds with the formula $Li_{1-x-z}M_{1-z}PO_4$, wherein M includes at least one first row transition metal selected from the group consisting of Ti, V, Cr, Mn, Fe, Co and Ni, wherein x is from 0 to 1 and z can be positive or negative.

In some embodiments, the ion is lithium and the ion storage compound includes an intercalation compound selected from compounds with the formula $(Li_{1-x}Z_x)PO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the ion storage compound includes an intercalation compound selected from compounds with the formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-2}M''_a)_y(X_2D_7)_z$, wherein x, plus y(1- a) times a formal valence or valences of M', plus ya times a formal valence or valence of M", is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M" is any of a Group IIA, IIIA, IVA, VA, VIA, VIIA, VIIIA, IB, IIB, IIIB, IVB, VB, and VIB metal, and D is at least one of oxygen, nitrogen, carbon, or a halogen.

In some embodiments, the ion is lithium and the ion storage compound includes an intercalation compound selected from the group consisting of $(A_{1-1}M''_a)_xM'_y(XD_4)_z$, $(A_{1-a}M''_a)_xM'_y(DXD_4)_z$ and $(A_{1-a}M''_a)_xM'_y(X_2D_7)_z$, where (1-a)x plus the quantity ax times the formal valence or valences of M" plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, and D is at least one of oxygen, nitrogen, carbon, or a halogen.

In some embodiments, the ion is lithium and the ion storage compound includes an intercalation compound selected from the group consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg, or Zr.

In some embodiments, the flowable semi-solid ion-storing redox composition includes a solid including amorphous carbon, disordered carbon, graphitic carbon, or a metal-coated or metal-decorated carbon.

In some embodiments, the flowable semi-solid ion-storing redox composition includes a solid including a metal or metal alloy or metalloid or metalloid alloy or silicon.

In some embodiments, the flowable semi-solid ion-storing redox composition includes a solid including nanostructures including nanoparticles, nanowires, nanorods, nanotripods, and nanotetrapods.

In some embodiments, the flowable semi-solid ion-storing redox composition includes a solid including an organic redox compound.

In some embodiments, the positive electrode includes a flowable semi-solid ion-storing redox composition including a solid selected from the group consisting of ordered rocksalt compounds LiMO2 including those having the α-$NaFeO_2$ and orthorhombic-$LiMnO_2$ structure type or their derivatives of different crystal symmetry, atomic ordering, or partial substitution for the metals or oxygen, wherein M includes at least one first-row transition metal but may include non-transition metals including but not limited to Al, Ca, Mg, or Zr and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the positive electrode includes a flowable semi-solid ion-storing redox composition including a solid selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, and where x, plus y(1-a) times a formal valence or valences of M', plus ya times a formal valence or valence of M", is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the positive electrode includes a flowable semi-solid ion-storing redox composition including a compound with a spinel structure.

In some embodiments, the positive electrode includes a flowable semi-solid ion-storing redox composition including a compound selected from the group consisting of $LiMn_2O_4$ and its derivatives; layered-spinel nanocomposites in which the structure includes nanoscopic regions having ordered rocksalt and spinel ordering; so-called "high voltage spinels" with a potential vs. $Li/Li^+$ that exceeds 4.3V including but not limited to $LiNi_{0.5}Mn_{1.5}O_4$; olivines $LiMPO_4$ and their derivatives, in which M includes one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In some embodiments, the negative electrode includes a flowable semi-solid ion-storing redox composition including graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge.

In some embodiments, the redox flow energy storage device further includes a storage tank for storing the flowable semi-solid or condensed liquid ion-storing redox composition, and the storage tank is in flow communication with the redox flow energy storage device.

In some embodiments, the redox flow energy storage device includes an inlet for introduction of the flowable semi-solid or condensed liquid ion-storing redox composition into the positive/negative electroactive zone and an outlet for the exit of the flowable semi-solid or condensed liquid ion-storing redox composition out of the positive/negative electroactive zone. In some specific embodiments, the redox flow energy storage device further includes a fluid transport device to enable the flow communication. In certain specific embodiments, the fluid transport device is a pump. In certain specific embodiments, the pump is a peristaltic pump.

In some embodiments, the flowable semi-solid or condensed liquid ion-storing redox composition further includes one or more additives. In certain specific embodiments, the additives includes a conductive additive. In certain other embodiments, the additive includes a thickener. In yet other specific embodiments, the additive includes a compound that getters water.

In some embodiments, the flowable semi-solid ion-storing redox composition includes an ion-storing solid coated with a conductive coating material. In certain specific embodiments, the conductive coating material has higher electron conductivity than the solid. In certain specific, embodiments, the solid is graphite and the conductive coating material is a metal, metal carbide, metal nitride, or carbon. In certain specific embodiments, the metal is copper.

In some embodiments, the redox flow energy storage device further includes one or more reference electrodes.

In some embodiments, the flowable semi-solid or condensed liquid ion-storing redox composition of the redox flow energy storage device provides a specific energy of more than about 150 Wh/kg at a total energy of less than about 50 kWh.

In some embodiments, the semi-solid or condensed-liquid ion-storing material of the redox flow energy storage device provides a specific energy of more than about 200 Wh/kg at total energy less than about 100 kWh, or more than about 250 Wh/kg at total energy less than about 300 kWh.

In some embodiments, the condensed-liquid ion-storing material includes a liquid metal or metal alloy.

In some embodiments, the flowable redox composition is electrically conductive. In some embodiments the flowable redox composition has an electrical conductivity of at least about $10^{-6}$ S/cm, at least about $10^{-5}$ S/cm, at least about $10^{-4}$ S/cm, or at least about $10^{-3}$ S/cm at a temperature at which the energy storage device is operated. In some embodiments, the semi-solid ion-storing redox composition is electrically conductive in its flowing and/or non-flowing state. In some embodiments, said composition has an electrical conductivity of at least about $10^{-6}$ S/cm, at least about $10^{-5}$ S/cm, at least about $10^{-4}$ S/cm, or at least about $10^{-3}$ S/cm at a temperature at which the energy storage device is operated.

In some embodiments, the ion-permeable membrane includes polyethyleneoxide (PEO) polymer sheets or Nafion™ membranes.

In some embodiments, a method of operating a redox flow energy storage device is described. The method includes:
providing a redox flow energy storage device including:
a positive electrode current collector, a negative electrode current collector, and an ion-permeable membrane separating the positive and negative current collectors;
a positive electrode disposed between the positive electrode current collector and the ion-permeable membrane; the positive electrode current collector and the ion-permeable membrane defining a positive electroactive zone accommodating the positive electrode;
a negative electrode disposed between the negative electrode current collector and the ion-permeable membrane; the negative electrode current collector and the ion-permeable membrane defining a negative electroactive zone accommodating the negative electrode;
where at least one of the positive and negative electrode includes a flowable semi-solid or condensed liquid ion-storing redox composition which is capable of taking up or releasing the ions during operation of the cell;
transporting the flowable semi-solid or condensed liquid ion-storing redox composition into the electroactive zone during operation of the device.

In some embodiments, in the method of operating a redox flow energy storage device, at least a portion of the flowable semi-solid or condensed liquid ion-storing redox composition in the electroactive zone is replenished by introducing new semi-solid or condensed liquid ion-storing redox composition into the electroactive zone during operation.

In some embodiments, the method of operating a redox flow energy storage device further includes:
transporting depleted semi-solid or condensed liquid ion-storing material to a discharged composition storage receptacle for recycling or recharging.

In some embodiments, the method of operating a redox flow energy storage device further includes:
applying an opposing voltage difference to the flowable redox energy storage device; and transporting charged semi-solid or condensed liquid ion-storing redox composition out of the electroactive zone to a charged composition storage receptacle during charging.

In some embodiments, the method of operating a redox flow energy storage device further includes:
applying an opposing voltage difference to the flowable redox energy storage device; and
transporting discharged semi-solid or condensed liquid ion-storing redox composition into the electroactive zone to be charged.

As used herein, positive electrode and cathode are used interchangeably. As used herein, negative electrode and anode are used interchangeably.

The energy storage systems described herein can provide a high enough specific energy to permit, for example, extended driving range for an electric vehicle, or provide a substantial improvement in specific energy or energy density over conventional redox batteries for stationary energy storage, including for example applications in grid services or storage of intermittent renewable energy sources such as wind and solar power.

In some embodiments, a redox flow energy storage device is provided. The redox flow energy storage device can comprise a first, outer electrode current collector, a second, inner electrode current collector disposed at least partially within the first electrode current collector, and an ion-permeable medium at least partially separating said first and second electrode current collectors; a first electrode active material at least partially disposed between said first electrode current collector and said ion-permeable medium; and a second electrode active material at least partially disposed between said second electrode current collector and said ion-permeable medium; wherein at least one of said first and second electrode active materials comprises a fluid, and at least one of the first electrode current collector and the second electrode current collector is capable of being rotated about its longitudinal axis relative to the other electrode current collector.

In one set of embodiments, a flowable ion-storing redox composition for a redox flow energy storage device is described. In some embodiments, the redox flow energy storage device comprises a positive electrode active material, a negative electrode active material, and an ion-permeable medium separating said positive and negative electrode active materials, wherein at least one of said positive and negative electrode active materials comprises the flowable ion-storing redox composition which is capable of taking up or releasing said ions during operation of the device, wherein said flowable ion-storing redox composition comprises at least one compound selected from a ketone; a diketone; a triether; a compound containing 1 nitrogen and 1 oxygen atom; a compound containing 1 nitrogen and 2 oxygen atoms; a compound containing 2 nitrogen atoms and 1 oxygen atom; a phosphorous containing compound, and/or fluorinated, nitrile, and/or perfluorinated derivatives of these.

In some embodiments, a source of acoustic energy for a redox flow energy storage device is provided. In some embodiments, the redox flow energy storage device comprises a positive electrode active material, a negative electrode active material, and an ion-permeable medium separating said positive and negative electrode active materials, wherein at least one of said positive and negative electrode active materials comprises a flowable ion-storing redox composition which is capable of taking up or releasing said ions during operation of the device, wherein the flowable ion-storing redox composition comprises a solid, and said source of acoustic energy is constructed and arranged to inhibit the accumulation of the solid within the redox flow energy storage device and/or to reduce the viscosity of the flowable ion-storing redox composition within the redox flow energy storage device.

In one set of embodiments, an in-line sensor for a redox flow energy storage device is described. In some embodiments, the redox flow energy storage device comprises a positive electrode active material, a negative electrode active material, an ion-permeable medium separating said positive and negative electrode active materials, wherein at least one of said positive and negative electrode active materials comprises a flowable ion-storing redox composition which is capable of taking up or releasing said ions during operation of the device, and an in-line sensor constructed and arranged to determine a property of the flowable ion-storing redox composition.

In some embodiments, a flowable ion-storing redox composition for a redox flow energy storage device. The redox flow energy storage device can comprise a positive electrode active material, a negative electrode active material, and an ion-permeable medium separating said positive and negative electrode active materials, wherein at least one of said positive and negative electrode active materials comprises a flowable ion-storing redox composition which is capable of taking up or releasing said ions during operation of the cell, wherein the flowable ion-storing redox composition comprises an aqueous liquid carrier, and the ion comprises $Li^+$ or $Na^+$.

In some embodiments, a redox flow energy storage device comprises a positive electrode active material, a negative electrode active material, and an ion-permeable medium separating said positive and negative electrode active materials, wherein at least one of said positive and negative electrode active materials comprises a flowable ion-storing redox composition which is capable of taking up or releasing said ions during operation of the device; and a source of mixing fluid in fluid communication with and/or located within a volume in which the flowable ion-storing redox composition is disposed, wherein the mixing fluid is immiscible with the flowable ion-storing redox composition.

In one set of embodiments, a redox flow energy storage device comprises a first electrode active material of a first polarity; a second electrode active material of a second, opposite polarity; an ion-permeable medium separating the first and second electrode active materials, wherein at least one of the first and second electrode active materials comprises a flowable ion-storing redox composition which is capable of taking up or releasing said ions during operation of the cell; and a movable surface in contact with the flowable ion-storing redox composition, wherein the movable surface is constructed and arranged to at least partially direct the flow of the flowable ion-storing redox composition through the redox flow energy storage device.

In some embodiments, a flowable ion-storing redox composition for a redox flow energy storage device is described, wherein the redox flow energy storage device comprises a positive electrode active material, a negative electrode active material, and an ion-permeable medium separating said positive and negative electrode active materials, wherein at least one of said positive and negative electrode active materials comprises the flowable semi-solid or condensed liquid ion-storing redox composition which is capable of taking up or releasing said ions during operation of the device, wherein said flowable ion-storing redox composition comprises at least one of an ether, a ketone, a diether, diketone, an ester, a triether, a carbonate; an amide, a sulfur containing compound; a phosphorous containing compound, an ionic liquid, and fluorinated, nitrile, and/or perfluorinated derivatives of these.

BRIEF DESCRIPTION OF THE DRAWINGS

The subject matter is described with reference to the drawings, which are intended to be illustrative in nature and not intended to be limiting of the invention, the full scope of which is set forth in the claims that follow.

FIG. 20 shows a comparison of voltage (vs. $Li/Li^+$) of several Li-ion cathode and anode materials and the stability ranges of electrolytes, showing systems suitable for semi-solid flow cells.

DETAILED DESCRIPTION

Figure 1A:
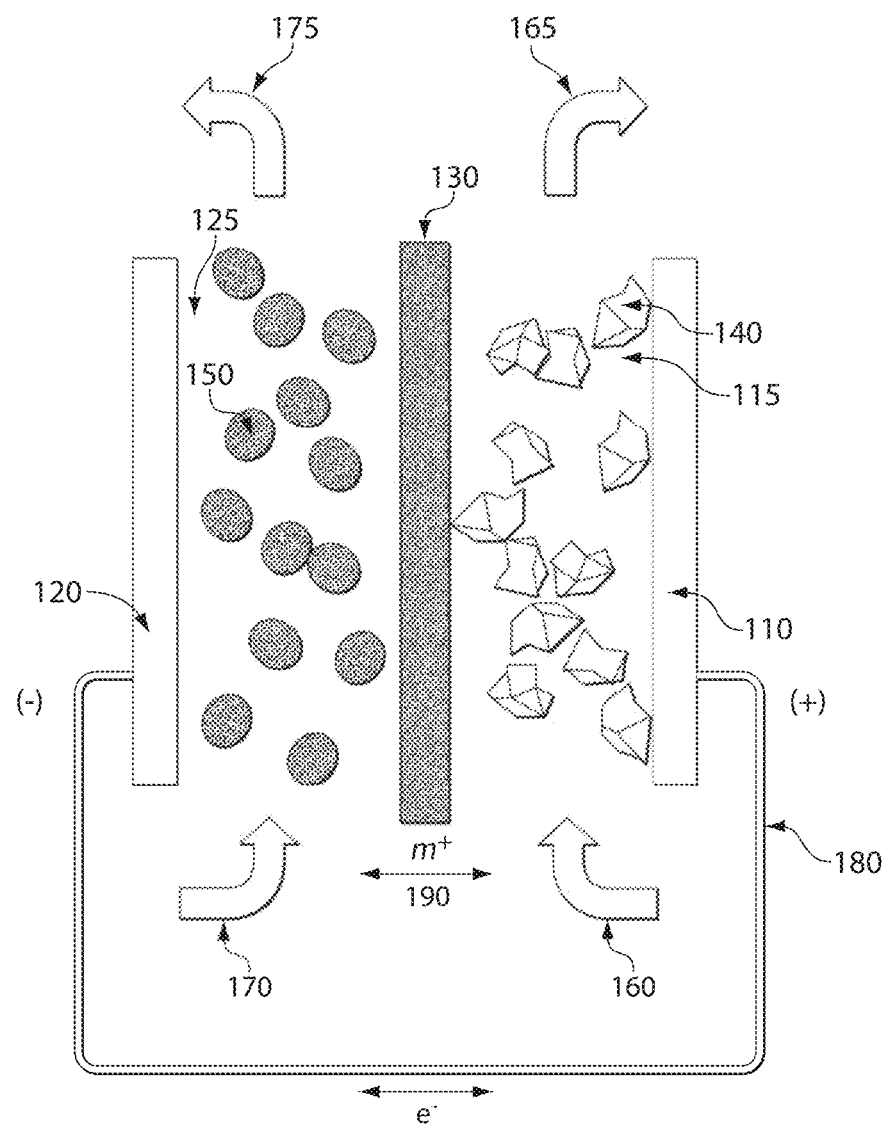
FIG. 1A is a cross-sectional illustration of the redox flow battery according to one or more embodiments.

An exemplary redox flow energy storage device 100 is illustrated in FIG. 1A. Redox flow energy storage device 100 may include a positive electrode current collector 110 and a negative electrode current collector 120, separated by an ion permeable separator 130. Current collectors 110, 120 may be in the form of a thin sheet and are spaced apart from separator 130. Positive electrode current collector 110 and ion permeable separator 130 define an area, 115, herein after referred to as the "positive electroactive zone" that accommodates the positive flowable electrode active material 140. Negative electrode current collector 120 and ion permeable separator 130 define an area, 125, herein after referred to as the "negative electroactive zone" that accommodates the negative flowable electrode active material 150. The electrode-active materials can be flowable redox compositions and can be transported to and from the electroactive zone at which the electrochemical reaction occurs. The flowable redox composition can include a semi-solid or a condensed liquid ion-storing electroactive material, and optionally a fluid for supporting or suspending the solid or condensed ion-storing liquid electrolyte. As used herein, semi-solid refers to a mixture of liquid and solid phases, such as a slurry, particle suspension, colloidal suspension, emulsion, or micelle. In some embodiments, the emulsion or micelle in a semi-solid includes a solid in at least one of the liquid-containing phases. As used herein, condensed liquid or condensed ion-storing liquid refers to a liquid that is not merely a solvent as it is in the case of an aqueous flow cell catholyte or anolyte, but rather that the liquid is itself redox-active. The liquid form can also be diluted by or mixed with another, non-redox-active liquid that is a diluent or solvent, including mixing with such a diluents to form a lower-melting liquid phase, emulsion or micelles including the ion-storing liquid.

The positive electrode flowable material 140 can enter the positive electroactive zone 115 in the direction indicated by arrow 160. Positive electrode material 140 can flow through the electroactive zone and exit at the upper location of the electroactive zone in the direction indicated by arrow 165. Similarly, the negative electrode flowable material 150 can enter the negative electroactive zone 125 in the direction indicated by arrow 170. Negative electrode material 150 can flow through the electroactive zone and exits at the upper location of the electroactive zone in the direction indicated by arrow 175. The direction of flow can be reversed, for example, when alternating between charging and discharging operations. It is noted that the illustration of the direction of flow is arbitrary in the figure. Flow can be continuous or intermittent. In some embodiments, the positive and negative redox flow materials are stored in a storage zone or tank (not shown) prior to use. In some embodiments, the flowable redox electrode materials can be continuously renewed and replaced from the storage zones, thus generating an energy storage system with very high energy capacity. In some embodiments, a transporting device is used to introduce positive and negative ion-storing electroactive materials into the positive and negative electroactive zones, respectively. In some embodiments, a transporting device is used to transport depleted positive and negative ion-storing electroactive materials out of the positive and negative electroactive zones, respectively, and into storage tanks for depleted electroactive materials for recharging. In some embodiments, the transporting device can be a pump or any other conventional device for fluid transport. In some specific embodiments, the transporting device is a peristaltic pump.

During operation, the positive and negative electroactive materials can undergo reduction and oxidation. Ions 190 can move across ion permeable membrane 130 and electrons can flow through an external circuit 180 to generate current. In a typical flow battery, the redox-active ions or ion complexes undergo oxidation or reduction when they are in close proximity to or in contact with a current collector that typically does not itself undergo redox activity. Such a current collector may be made of carbon or nonreactive metal, for example. Thus, the reaction rate of the redox active species can be determined by the rate with which the species are brought close enough to the current collector to be in electrical communication, as well as the rate of the redox reaction once it is in electrical communication with the current collector. In some instances, the transport of ions across the ionically conducting membrane may rate-limit the cell reaction. Thus the rate of charge or discharge of the flow battery, or the power to energy ratio, may be relatively low. The number of battery cells or total area of the separators or electroactive zones and composition and flow rates of the flowable redox compositions can be varied to provide sufficient power for any given application.

In some embodiments, the redox flow energy storage device may be constructed and arranged such that a first electrode current collector of a first polarity is at least partially surrounded by a second electrode current collector of a second, opposite polarity. In such an arrangement, a first electroactive zone of a first polarity may be at least partially surrounded by a second electroactive zone of a second, opposite polarity. As used herein, a first electroactive zone is "at least partially surrounded" by a second electroactive zone if a closed loop can be drawn around the first electroactive zone through only the second electroactive zone, and does not imply that the first electroactive zone is necessarily completely encapsulated by the second electroactive zone.

Figure 1B:
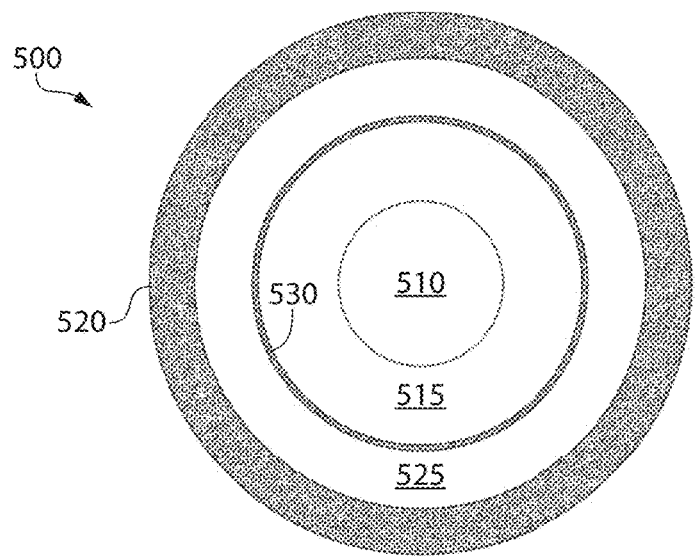
FIG. 1B includes a cross-sectional illustration of a redox flow battery according to one set of embodiments.
Figure 1C:
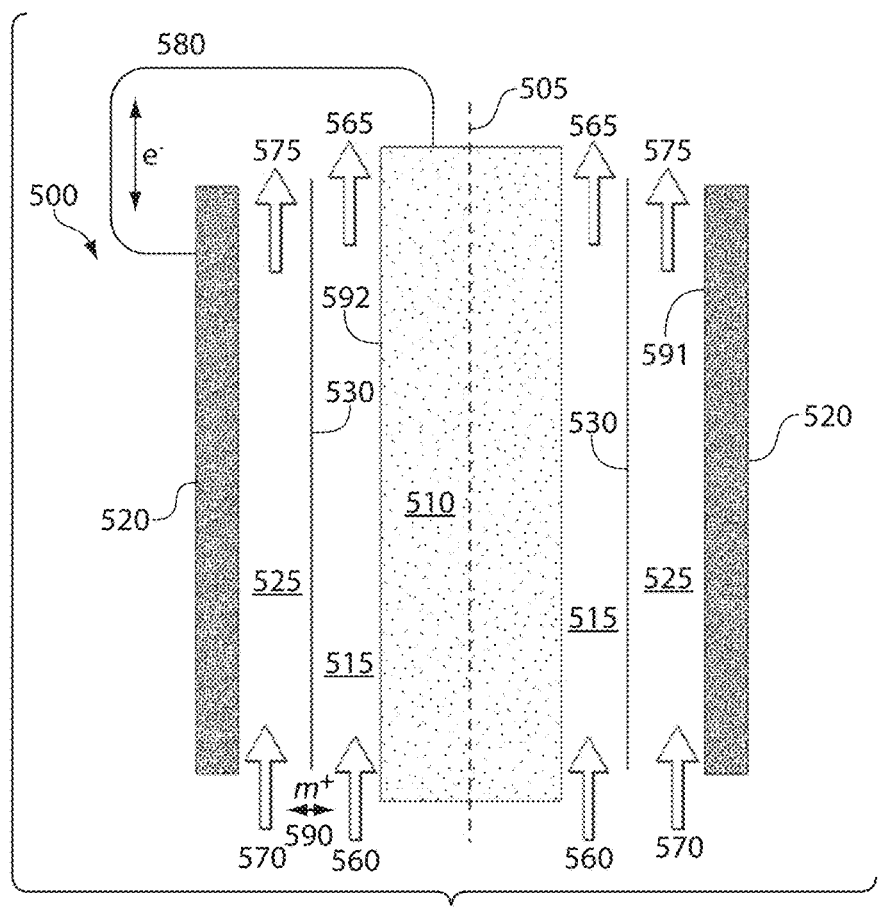
FIG. 1C includes a cross-sectional illustration of a redox flow battery according to one set of embodiments.

FIGS. 1B and 1C include cross-sectional schematic illustrations of one such redox flow energy storage device 500. In FIGS. 1B and 1C, device 500 includes a positive electrode current collector 510 disposed within a negative electrode current collector 520. As illustrated in FIGS. 1B and 1C, the negative electrode current collector is substantially cylindrical, comprising a cavity in which the positive electrode current collector is disposed. In some embodiments, as illustrated in FIGS. 1B and 1C, a first electrode current collector can be substantially concentrically disposed within a second electrode current collector such that their longitudinal axes (indicated by dashed line 505 in FIG. 1C) coincide. It should be understood that, in some instances, the longitudinal axes of the first and second electrode current collectors may not coincide. The positive and negative electrode current collectors can be separated by an ion permeable medium 530 to define a positive electroactive zone 515 and a negative electroactive zone 525 that at least partially surrounds the positive electroactive zone. While the set of embodiments illustrated in FIGS. 1B and 1C includes a positive electrode current collector and a positive electroactive zone at least partially surrounded by a negative electrode current collector and a negative electroactive zone, it should be understood that, in some embodiments, the polarities of the electrode current collectors and electroactive zones can be reversed such that a negative electrode current collector and a negative electroactive zone are at least partially surrounded by a positive electrode current collector and a positive electroactive zone.

Flowable redox material (e.g., an ionic solution, a semi-solid, or a condensed ion-storing electroactive material) can flow through the positive electroactive zone and/or the negative electroactive zone, in some cases. Positive electrode flowable material can enter the positive electroactive zone 515 in the direction indicated by arrows 560 in FIG. 1C. The positive electrode flowable material can flow through the electroactive zone and can exit at the upper location of the electroactive zone in the direction indicated by arrows 565. Similarly, negative electrode flowable material can enter the negative electroactive zone 525 in the direction indicated by arrows 570. Negative electrode material can flow through the negative electroactive zone and exit at the upper location of the electroactive zone in the direction indicated by arrow 575. As noted with respect to FIG. 1A, the illustration of the direction of flow is arbitrary in FIG. 1C. During operation, the positive and negative electroactive materials can undergo reduction and oxidation. Ions 590 can move across ion permeable medium 530 (e.g., a membrane) and electrons can flow through an external circuit 580 to generate current.

Figure 1D:
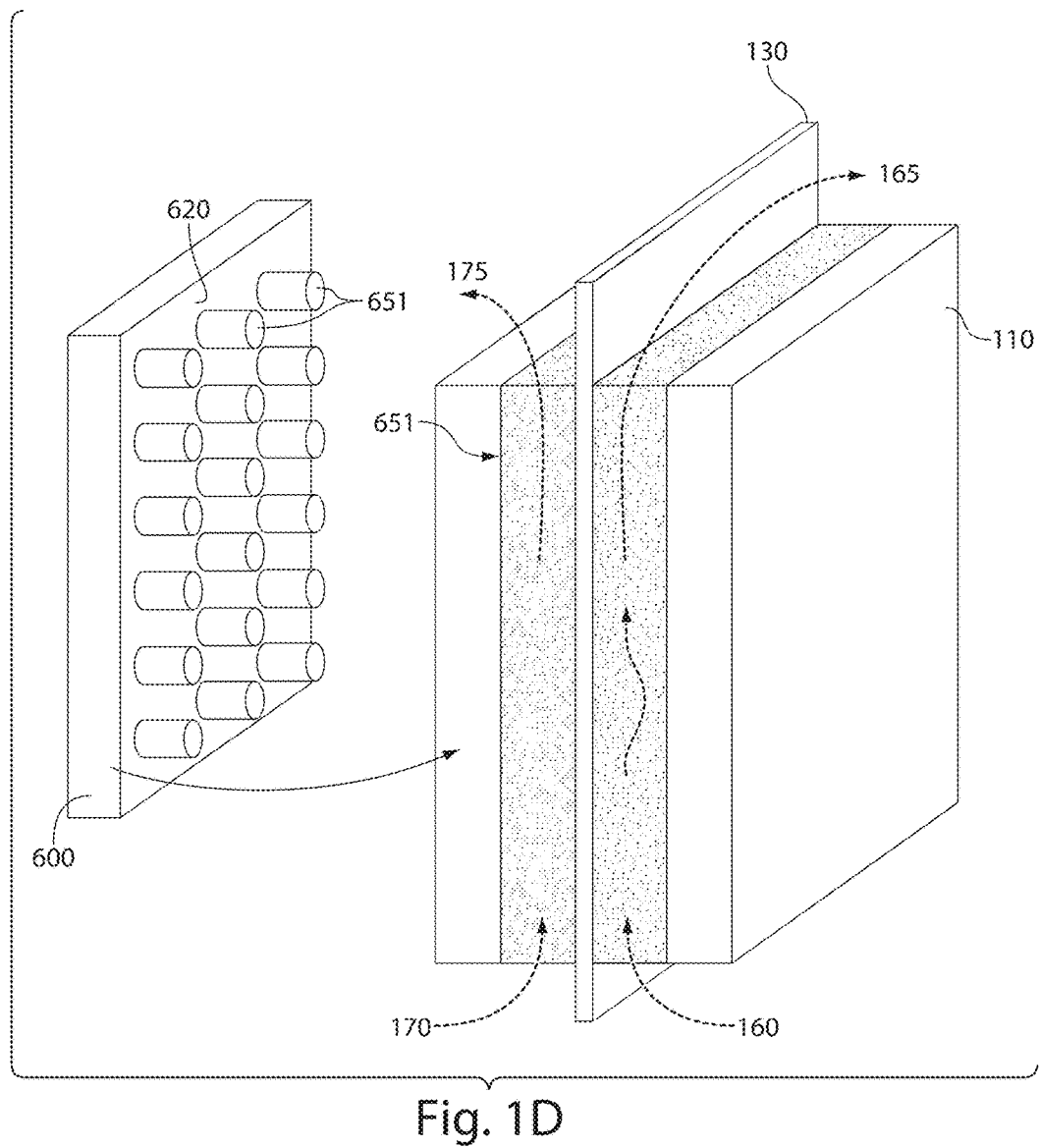
FIG. 1D includes a schematic illustration of an energy storage device comprising a plurality of posts, according to one set of embodiments.
Figure 1E:
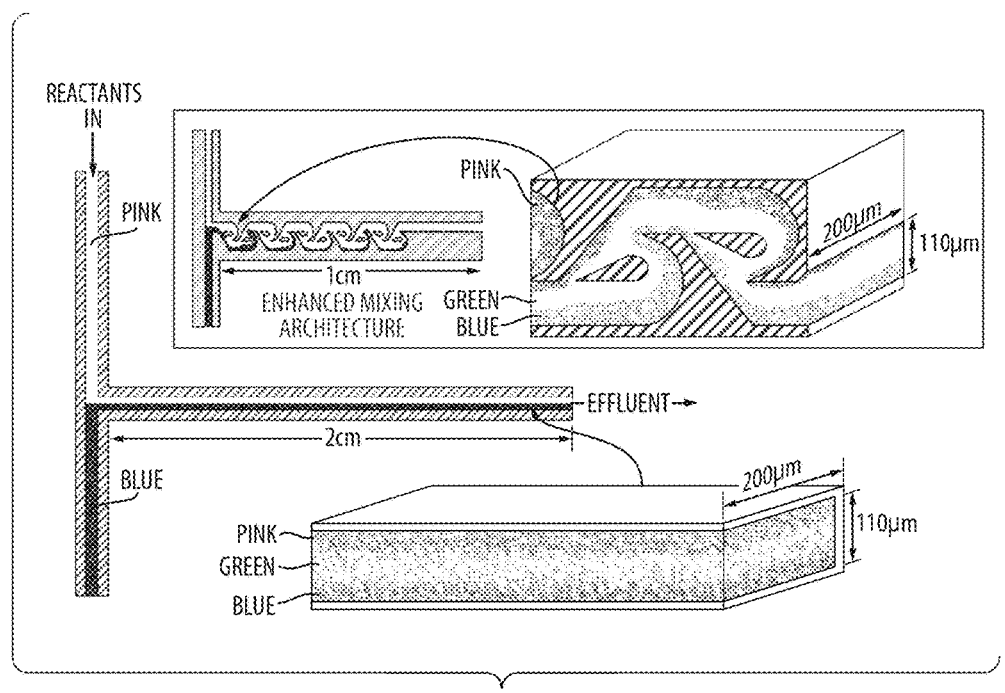
FIG. 1E includes a schematic illustration of a flow channel that can be used, in some embodiments, within an energy storage device.

In some embodiments, the positive and/or negative electrode current collector may include a plurality of surface features (e.g., protrusions). In some instances, the surface features can include protrusions (e.g., posts, fins, baffles, etc.) that extend from a surface of the electrode current collector into an electroactive region. For example, FIG. 1D includes a schematic illustration of an electrode current collector 600 comprising a plurality of posts 651 protruding from surface 620 of the current collector. In some embodiments, the protrusions can be electrically conductive. In some embodiments, the protrusions can comprise modified tesla structures as illustrated in FIG. 1E and described in Hong et al., *Lab on a chip*, 4(2):109-13, 2004, which is incorporated herein by reference in its entirety. Such structures may be useful in enhancing mixing, as current collectors that increase half-cell conductivity, and/or in providing mechanical support for the separator. The presence of electrically conductive protrusions can enhance the amount of electrically conductive surface area of the current collector, relative to an amount of electrically conductive surface area that would be present in the absence of the protrusions.

The protrusions can be, in some instances, constructed and arranged to enhance the circulation of the flowable redox composition. In some embodiments, the protrusions may be constructed and arranged to at least partially direct the flow of the flowable redox composition within an electroactive region. In some instances, the surface features can include features formed into the bulk of the electrode current collector (e.g., channels) which may, in some cases, at least partially direct the flow of fluid within an electroactive region.

Figure 1F:
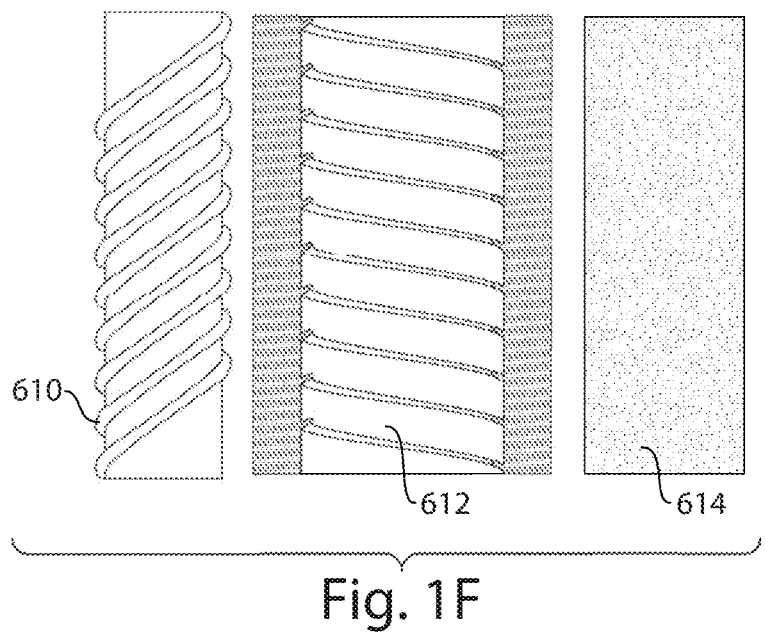
FIGS. 1F-1G include exemplary schematic illustrations of an energy storage device comprising a plurality of augers.
Figure 1G:
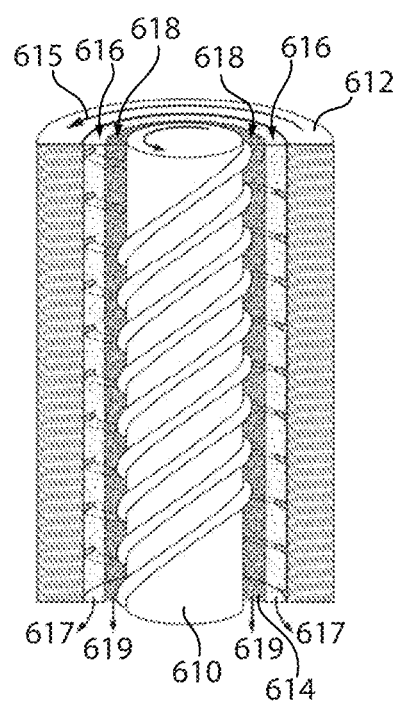

The electrode current collectors can, in some cases, include surface features that force fluid along the longitudinal axis of the redox flow energy storage device (e.g., when the electrode current collector is moved, such as when it is rotated). For example, in some embodiments, at least one of the electrode current collectors can comprise a plurality of undulations formed in the shape of a helix that forms a threading on at least a portion of a electrode current collector. One such example is illustrated in FIGS. 1F-1G. Such threading can be similar to those that would be observed along the exterior of a threaded screw or bolt or along the interior of a threaded nut. The helical undulations in the current collector may transport the flowable ion-storing redox composition along the longitudinal axis of the current collector as the current collector is rotated around its longitudinal axis. In some cases, both the positive and the negative electrode current collector can include threading over at least a part of their surfaces proximate an electroactive region. The threading on the positive and negative electrode current collectors may be of the same or different "handedness." One of ordinary skill in the art would understand the meaning of handedness in this context as being similar to the concept of handedness as applied to screws and other threaded materials.

The surface features outlined above can provide one or more advantages to the energy storage device. For example, in some embodiments (e.g., when the protrusions produce a threaded surface on a current collector) the path over which a flowable ion-storing redox composition travels can be relatively long, compared to the path that would be traveled in the absence of the surface features. In addition, the presence of surface features on a current collector can increase the surface area of the current collector that is exposed to a flowable ion-storing redox composition, thus enhancing device performance. The presence of the surface features may also allow the current collectors to be spaced relatively closely. Especially close spacing between the two current collectors (and, hence, between each current collector and the separation medium) can be achieved, for example, when the first and second current collectors each include threaded surfaces that are arranged such that they oppose each other.

In some embodiments, at least one of the positive or negative flowable redox compositions includes a semi-solid or a condensed ion-storing liquid electroactive material.

During discharging operation, the difference in electrochemical potentials of the positive and negative electrode of the redox flow device can produces a voltage difference between the positive and negative electrodes; this voltage difference would produce an electric current if the electrodes were connected in a conductive circuit. In some embodiments, during discharging, a new volume of charged flowable semi-solid or condensed liquid ion-storing composition is transported from a charged composition storage tank into the electroactive zone. In some embodiments, during discharging, the discharged or depleted flowable semi-solid or condensed liquid ion-storing composition can be transported out of the electroactive zone and stored in a discharged composition storage receptacle until the end of the discharge.

During charging operation, the electrode containing flowable redox composition can be run in reverse, either electrochemically and mechanically. In some embodiments, the depleted flowable semi-solid or condensed liquid ion-storing composition can be replenished by transporting the depleted redox composition out of the electroactive zone and introducing fully charged flowable semi-solid or condensed liquid ion-storing composition into the electroactive zone. This could be accomplished by using a fluid transportation device such as a pump. In some other embodiments, an opposing voltage difference can be applied to the flowable redox energy storage device to drive electronic current and ionic current in a direction opposite to that of discharging, to reverse the electrochemical reaction of discharging, thus charging the flowable redox composition of the positive and negative electrodes. In some specific embodiments, during charging, discharged or depleted flowable semi-solid or condensed liquid ion-storing composition is mechanically transported into the electroactive zone to be charged under the opposing voltage difference applied to the electrodes. In some specific embodiments, the charged flowable semi-solid or condensed liquid ion-storing composition is transported out of the electroactive zone and stored in a charged composition storage receptacle until the end of the charge. The transportation can be accomplished by using a fluid transportation device such as a pump.

One distinction between a conventional flow battery anolyte and catholyte and the ion-storing solid or liquid phases as exemplified herein is the molar concentration or molarity of redox species in the storage compound. For example, conventional anolytes or catholytes that have redox species dissolved in aqueous solution may be limited in molarity to typically 2M to 8M concentration. Highly acidic solutions may be necessary to reach the higher end of this concentration range. By contrast, any flowable semi-solid or condensed liquid ion-storing redox composition as described herein may have, when taken in moles per liter or molarity, at least 10M concentration of redox species, preferably at least 12M, still preferably at least 15M, and still preferably at least 20M. The electrochemically active material can be an ion storage material or any other compound or ion complex that is capable of undergoing Faradaic reaction in order to store energy. The electroactive material can also be a multiphase material including the above-described redox-active solid or liquid phase mixed with a non-redox-active phase, including solid-liquid suspensions, or liquid-liquid multiphase mixtures, including micelles or emulsions having a liquid ion-storage material intimately mixed with a supporting liquid phase. In the case of both semi-solid and condensed liquid storage compounds for the flowable ion-storing redox compositions, systems that utilize various working ions are contemplated, including aqueous systems in which $H^+$ or $OH^-$ are the working ions, nonaqueous systems in which $Li^+$, $Na^+$, or other alkali ions are the working ions, even alkaline earth working ions such as $Ca^{2+}$ and $Mg^{2+}$, or $Al^{3+}$. In each of these instances, a negative electrode storage material and a positive electrode storage material may be required, the negative electrode storing the working ion of interest at a lower absolute electrical potential than the positive electrode. The cell voltage can be determined approximately by the difference in ion-storage potentials of the two ion-storage electrode materials.

In some embodiments, the flowable redox composition is electrically conductive. The flowable redox composition can be electrically conductive while in its flowing and/or non-flowing state. In some embodiments the flowable redox composition (which can be, for example, a semi-solid or a condensed liquid ion-storing electroactive material) has an electrical conductivity of at least about $10^{-6}$ S/cm, at least about $10^{-5}$ S/cm, at least about $10^{-4}$ S/cm, or at least about $10^{-3}$ S/cm while it is flowing and while it is at the temperature at which the energy storage device is operated (e.g., at least one temperature between about $-50°$ C. and about $+50°$ C.). In some embodiments, said composition has an electronic conductivity in its non-flowing state of at least about $10^{-6}$ S/cm, at least about $10^{-5}$ S/cm, at least about $10^{-4}$ S/cm, or at least about $10^{-3}$ S/cm at the temperature at which the energy storage device is operated (e.g., at least one temperature between about $-50°$ C. and about $+50°$ C.). As specific examples, the flowable redox composition can comprise a condensed liquid ion-storing electroactive material having any of the electrical conductivities described herein (while flowing and/or while stationary). In some embodiments, the flowable redox composition comprises a semi-solid, wherein the mixture of the liquid and solid phases, when measured together, has any of the electrical conductivities described herein (while flowing and/or while stationary).

Systems employing both negative and positive ion-storage materials are particularly advantageous because there are no additional electrochemical byproducts in the cell. Both the positive and negative electrodes materials are insoluble in the flow electrolyte and the electrolyte does not become contaminated with electrochemical composition products that must be removed and regenerated. In addition, systems employing both negative and positive lithium ion-storage materials are particularly advantageous when using non-aqueous electrochemical compositions.

In some embodiments, the flowable semi-solid or condensed liquid ion-storing redox compositions include materials proven to work in conventional, solid lithium-ion batteries. In some embodiments, the positive flowable electroactive materials contains lithium positive electroactive materials and the lithium cations are shuttled between the negative electrode and positive electrode, intercalating into solid, host particles suspended in a liquid electrolyte.

In some embodiments at least one of the energy storage electrodes includes a condensed ion-storing liquid of a redox-active compound, which may be organic or inorganic, and includes but is not limited to lithium metal, sodium metal, lithium-metal alloys, gallium and indium alloys with or without dissolved lithium, molten transition metal chlorides, thionyl chloride, and the like, or redox polymers and organics that are liquid under the operating conditions of the battery. Such a liquid form may also be diluted by or mixed with another, non-redox-active liquid that is a diluent or solvent, including mixing with such a diluents to form a lower-melting liquid phase. However, unlike a conventional flow cell catholyte or anolyte, the redox active component will comprise by mass at least 10% of the total mass of the flowable electrolyte, and preferably at least 25%.

In some embodiments, the redox-active electrode material, whether used as a semi-solid or a condensed liquid format as defined above, comprises an organic redox compound that stores the working ion of interest at a potential useful for either the positive or negative electrode of a battery. Such organic redox-active storage materials include "p"-doped conductive polymers such as polyaniline or polyacetylene based materials, polynitroxide or organic radical electrodes (such as those described in: H. Nishide et al., *Electrochim. Acta*, 50, 827-831, (2004), and K. Nakahara, et al., *Chem. Phys. Lett.*, 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et al., *Nature Materials*, DOI: 10.1038/nmat2372).

In some embodiments the redox-active electrode material comprises a sol or gel, including for example metal oxide sols or gels produced by the hydrolysis of metal alkoxides, amongst other methods generally known as "sol-gel processing." Vanadium oxide gels of composition $V_xO_y$ are amongst such redox-active sol-gel materials.

Other suitable positive active materials include solid compounds known to those skilled in the art as those used in NiMH (Nickel-Metal Hydride) Nickel Cadmium (NiCd) batteries. Still other positive electrode compounds for Li storage include those used in carbon monofluoride batteries, generally referred to as $CF_x$, or metal fluoride compounds having approximate stoichiometry $MF_2$ or $MF_3$ where M comprises Fe, Bi, Ni, Co, Ti, V. Examples include those described in H. Li, P. Balaya, and J. Maier, Li-Storage via Heterogeneous Reaction in Selected Binary Metal Fluorides and Oxides, *Journal of The Electrochemical Society*, 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", J. Electrochem. Soc., 153, A799 (2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", *J. Electrochem. Soc.*, 152, A307 (2005).

As another example, fullerenic carbon including single-wall carbon nanotubes (SWNTs), multiwall carbon nanotubes (MWNTs), or metal or metalloid nanowires may be used as ion-storage materials. One example is the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, *Nature Nanotechnology*, published online 16 Dec. 2007; doi: 10.1038/nnano.2007.411.

Exemplary electroactive materials for the positive electrode in a lithium system include the general family of ordered rocksalt compounds $LiMO_2$ including those having the $\alpha$-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA") and Li(Ni, Mn, Co)$O_2$ (known as "NMC"). Other families of exemplary electroactive materials includes those of spinel structure, such as $LiMn_2O_4$ and its derivatives, "high voltage spinels" with a potential vs. Li/Li$^+$ that exceeds 4.3V including but not limited to $LiNi_{0.5}Mn_{1.5}O_4$. so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In one or more embodiments the active material comprises a transition metal polyanion compound, for example as described in U.S. Pat. No. 7,338,734. In one or more embodiments the active material comprises an alkali metal transition metal oxide or phosphate, and for example, the compound has a composition $A_x(M'_{1-a}M''_a)_y(XD_4)_z$, $A_x(M^{1-a}M''_a)_y(DXD_4)_z$, or $A_x(M'_{1-a}M''_a)_y(X_2D_7)_z$, and have values such that x, plus y(1-a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_a(DXD_4)z(A_{1-a}M''_a)_xM'_y(X_2D_7)_z$ and have values such that (1-a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments the redox-active electrode material comprises a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulfide.

In some embodiments the semi-solid flow battery is a lithium battery, and the negative electrode active compound comprises graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge. In some embodiments, $Li_4Ti_5O_{12}$ can be included as an electrode active material (e.g., a negative electrode active material).

Exemplary electroactive materials for the negative electrode in the case of a lithium working ion include graphitic or non-graphitic carbon, amorphous carbon, or mesocarbon microbeads; an unlithiated metal or metal alloy, such as metals including one or more of Ag, Al, Au, B, Ga, Ge, In, Sb, Sn, Si, or Zn, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, or amorphous metal alloys of lithiated or non-lithiated compositions.

The current collector can be electronically conductive and should be electrochemically inactive under the operation conditions of the cell. Typical current collectors for lithium cells include copper, aluminum, or titanium for the negative current collector and aluminum for the positive current collector, in the form of sheets or mesh, or any configuration for which the current collector may be distributed in the electrolyte and permit fluid flow. Selection of current collector materials is well-known to those skilled in the art. In some embodiments, aluminum is used as the current collector for positive electrode. In some embodiments, copper is used as the current collector for negative electrode. In other embodiments, aluminum is used as the current collector for negative electrode.

In some embodiments, the negative electrode can be a conventional stationary electrode, while the positive electrode includes a flowable redox composition. In other embodiments, the positive electrode can be a conventional stationary electrode, while the negative electrode includes a flowable redox composition.

In some embodiments, the semi-solid flow cells of the present invention use $Li^+$ or $Na^+$ as the working ion and comprise an aqueous electrolyte. Although the use of aqueous electrolytes can, in some cases, require the use of lower potentials (to avoid the electrolytic decomposition of water) than can be used with some nonaqueous systems (e.g., conventional lithium ion systems using alkyl carbonate electrolyte solvents), the energy density of a semi-solid aqueous flow battery can be much greater than that of a conventional aqueous solution flow cell (e.g., vanadium redox or zinc-bromine chemistry) due to the much greater density of ion storage that is possible in the solid phase of a semi-solid catholyte or anolyte. Aqueous electrolytes are typically less expensive than nonaqeous electrolytes and can lower the cost of the flow battery, while typically also having higher ionic conductivity. In addition, aqueous electrolyte systems can be less prone to formation of insulating SEIs on the conductive solid phases used in the catholyte or anolyte, or current collectors, which can increase the impedance of the flow battery.

The following non-limiting examples of aqueous systems show that a broad range of cathode-active materials, anode-materials, current collector materials, electrolytes, and combinations of such components may be used in the semi-solid aqueous flow batteries of this set of embodiments.

In some embodiments, oxides of general formula $A_xM_yO_z$ may be used as ion storage compounds in an aqueous semi-solid flow cell, wherein A comprises a working ion that may be one or more of Na, Li, K, Mg, Ca, and Al; M comprises a transition metal that changes its formal valence state as the working ion is intercalated or deintercalated from the compound; O corresponds to oxygen; x can have a value of 0 to 10; y can have a value of 1 to 3; and z can have a value of 2 to 7.

The aqueous or nonaqueous semi-solid flow cells may also comprise, as the semi-solid ion storage electrode, one or more lithium metal "polyanion" compounds, including but not limited to compounds described in U.S. Pat. No. 7,338,734, to Chiang et al. which is incorporated herein by reference in its entirety for all purposes. Such compounds include the compositions $(A)_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, wherein A is at least one of an alkali metal or hydrogen, M' is a first-row transition metal, X is at least one of phosphorus, sulfur, arsenic, boron, aluminum, silicon, vanadium, molybdenum and tungsten, M" is any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0 \leq a \leq 0.1$, x is equal to or greater than 0, y and z are greater than 0 and have values such that x, plus y(1-a) times a formal valence or valences of M', plus ya times a formal valence or valence of M", is equal to z times a formal valence of the $XD_4$, $X_2D_7$, or $DXD_4$ group. In some embodiments, the compound crystallizes in an ordered or partially disordered structure of the olivine $(A_xMXO_4)$, NASICON $(A_x(M',M'')_2(XO_4)_3)$, $VOPO_4$, $LiFe(P_2O_7)$ or $Fe_4(P_2O_7)_3$ structure-types, and has a molar concentration of the metals (M'+M") relative to the concentration of the elements X that exceeds the ideal stoichiometric ratio y/z of the prototype compounds by at least 0.0001.

Other such compounds comprise the compositions $(A_{1-a}M''_a)_xM'_y(XD_4)_z$, $(A_{1-a}M''_a)_xM'_y(DXD_4)_z$, or $(A_{1-a}M''_a)_xM'_y(X_2D_7)_z$, wherein A is at least one of an alkali metal or hydrogen; M' is a first-row transition metal; X is at least one of phosphorus, sulfur, arsenic, boron, aluminum, silicon, vanadium, molybdenum and tungsten; M" any of a Group IIA, IIIA, IVA, VA, VIA, VIIA, VIIIA, IB, IIB, IIIB, IVB, VB, and VIB metal; D is at least one of oxygen, nitrogen, carbon, or a halogen; $0 \leq a \leq 0.1$; and x, y, and z are greater than zero and have values such that (1-a)x plus the quantity ax times the formal valence or valences of M" plus y times the formal valence or valences of M' is equal to z times the formal valence of the $XD_4$, $X_2D_7$ or $DXD_4$ group. In some of these embodiments, the compound crystallizes in an ordered or partially disordered structure of the olivine $(A_xMXO_4)$, NASICON $(A_x(M',M'')_2(XO_4)_3)$, $VOPO_4$, $LiFe(O_2O_7)$ or $Fe_4(P_2O_7)_3$ structure-types, and has a molar concentration of the metals (M'+M") relative to the concentration of the elements X that exceeds the ideal stoichiometric ratio y/z of the prototype compounds by at least 0.0001.

Still other such compounds comprise the compositions $(A_{b-a}M''_a)_xM'_y(XD_4)_z$, $(A_{b-a}M''_a)_xM'_y(DXD_4)_z$, or $(A_{b-a}M''_a)_xM'_y(X_2D_7)_z$, wherein A is at least one of an alkali metal or hydrogen; M' is a first-row transition metal; X is at least one of phosphorus, sulfur, arsenic, boron, aluminum, silicon, vanadium, molybdenum and tungsten; M" any of a Group IIA, IIIA, IVA, VA, VIA, VIIA, VIIIA, IB, IIB, IIIB, IVB, VB, and VIB metal; D is at least one of oxygen, nitrogen, carbon, or a halogen; $0 \leq a \leq 0.1$; $a \leq b \leq 1$; and x, y, and z are greater than zero and have values such that (b-a)x plus the quantity ax times the formal valence or valences of M" plus y times the formal valence or valences of M' is equal to z times the formal valence of the $XD_4$, $X_2D_7$ or $DXD_4$ group. In some of these embodiments, the compound crystallizes in an ordered or partially disordered structure of the olivine $(A_xMXO_4)$, NASICON $(A_x(M',M'')_2(XO_4)_3)$, $VOPO_4$, $LiFe(P_2O_7)$ or $Fe_4(P_2O_7)_3$ structure-types, and has a molar concentration of the metals (M'+M") relative to the concentration of the elements X that exceeds the ideal stoichiometric ratio y/z of the prototype compounds by at least 0.0001.

Rechargeable lithium batteries using an aqueous electrolyte have been described by W. Li, J. R. Dahn, and D. S. Wainwright (*Science*, vol. 264, p. 1115, 20 May 1994). They demonstrated a rechargeable system in which both the cathode and anode are lithium intercalation compounds, being $LiMn_2O_4$ and $VO_2$ (B) respectively, and the electrolyte is a solution of 5 M $LiNO_3$ and 0.001 M LiOH in water, with a cell voltage of about 1.5V. Other aqueous rechargeable lithium batteries include the following combinations of cathode/anode: $Li(Ni_{1-x}Co_x)O_2/LiV_3O_8$, $LiCoO_2/LiV_3O_8$, $LiMn_2O_4/TiP_2O_7$, $LiMn_2O_4/LiTi_2(PO_4)_3$, $Li(Ni_{0.33}Mn_{0.33})O_2/Li_xV_2O_5$, $V_2O_5/Li_xV_2O_5$, $LiMn_2O_4/Li_xV_2O_5$, $LiMn_2O_4/NaTi_2(PO_4)_3$, $LiMn_2O_4/Li_3Fe_2(PO_4)_3$, $LiMn_2O_4/LiFeP_2O_7$, $LiMn_2O_4/LiFe_4(P_2O_7)_3$, $LiCoO_2/C$, $Li_{0.5}Mn_2O_4/LiCoO_2$, $\gamma$-$MnO_2$/Zn, and $TiO_2$ (anatase)/Zn. The semi-solid flow batteries described herein can include the use of any one or more of these cathode-active materials with any one or more of the anode-active materials. Electrode conductive additives and binders, current collector materials, current collector coatings, and electrolytes that can be used in such non-flow systems (as described herein) can also be used in the semi-solid flow batteries described herein.

In some embodiments, the flow cell can include an aqueous positive electrode active material comprising a material of the general formula $Li_xFe_yP_aO_z$, (wherein, for example, x can be between about 0.5 and about 1.5, y can be between about 0.5 and about 1.5, a can be between about 0.5 and about 1.5, and z can be between about 3 and about 5), and a negative electrode active material comprising a material of the general formula $Li_{x'}Ti_{y'}O_{z'}$ (wherein, for example, x' can be between about 3 and about 5, y' can be between about 4 and about 6, and z' can be between about 9 and about 15 or between about 11 and about 13). As a specific example, in some embodiments, the negative electrode active material can comprise $LiFePO_4$ and the positive electrode active material can comprise $Li_4Ti_5O_{12}$. In some embodiments, the positive and/or negative electrode active materials can include cation or anion doped derivatives of these compounds.

Other specific combinations of electrode active materials that can be used in aqueous flow cells (listed here as anode/cathode pairs) include, but are not limited to, $LiV_3O_8/LiCoO_2$; $LiV_3O_8/LiNiO_2$; $LiV_3O_8/LiMn_2O_4$; and $C/Na_{0.44}MnO_2$.

Sodium can be used as the working ion in conjunction with an aqueous electrolyte and cathode-active or anode active compounds that intercalate sodium at suitable potentials, or that store sodium by surface adsorption and the formation of an electrical double layer as in an electrochemical capacitor or by surface adsorption accompanied by charge transfer. Materials for such systems have been described in US Patent Application US 2009/0253025, by J. Whitacre, for use in conventional (non-flow type) secondary batteries. The semi-solid flow batteries described herein can use one or more of the cathode-active materials, anode-active materials, electrode conductive additives and binders, current collector materials, current collector coatings, and electrolytes considered in such non-flow systems. One or more embodiments described herein can incorporate these materials in semi-solid flow batteries.

Cathode active materials that store sodium and can be used in an aqueous electrolyte system include, but are not limited to, layered/orthorhombic $NaMO_2$ (birnessite), cubic spinel $\lambda$-$MnO_2$ based compounds, $Na_2M_3O_7$, $NaMPO_4$, $NaM_2(PO_4)_3$, $Na_2MPO_4F$, and tunnel-structured $Na_{0.44}MO_2$, where M is a first-row transition metal. Specific examples include $NaMnO_2$, $Li_xMn_2O_4$ spinel into which Na is exchanged or stored, $Li_xNa_yMn_2O_4$, $Na_yMn_2O_4$, $Na_2Mn_3O_7$, $NaFePO_4$, $Na_2FePO_4F$, and $Na_{0.44}MnO_2$. Anode materials can include materials that store sodium reversibly through surface adsorption and desorption, and include high surface area carbons such as activated carbons, graphite, mesoporous carbon, carbon nanotubes, and the like. They also may comprise high surface area or mesoporous or nanoscale forms of oxides such as titanium oxides, vanadium oxides, and compounds identified above as cathode materials but which do not intercalate sodium at the operating potentials of the negative electrode.

Current collector materials can be selected to be stable at the operating potentials of the positive and negative electrodes of the flow battery. In nonaqueous lithium systems the positive current collector may comprise aluminum, or aluminum coated with conductive material that does not electrochemically dissolve at operating potentials of 2.5-5V with respect to $Li/Li^+$. Such materials include Pt, Au, Ni, conductive metal oxides such as vanadium oxide, and carbon. The negative current collector may comprise copper or other metals that do not form alloys or intermetallic compounds with lithium, carbon, and coatings comprising such materials on another conductor.

In aqueous $Na^+$ and $Li^+$ flow batteries the positive current collector may comprise stainless steel, nickel, nickel-chromium alloys, aluminum, titanium, copper, lead and lead alloys, refractory metals, and noble metals. The negative current collector may comprise stainless steel, nickel, nickel-chromium alloys, titanium, lead oxides, and noble metals. In some embodiments, the current collector comprises a coating that provides electronic conductivity while passivating against corrosion of the metal. Examples of such coatings include, but are not limited to, TiN, CrN, C, CN, NiZr, NiCr, Mo, Ti, Ta, Pt, Pd, Zr, W, FeN, and CoN. Electrolytes used in aqueous semi-solid flow cells may comprise an alkaline or alkaline earth salt dissolved in water to a concentration of 0.1M to 10M. The salt used may comprise alkali or alkaline earth metals other than the ion species stored in the intercalation electrode. Thus for lithium and sodium storing electrodes, the electrolyte may contain $A_2SO_4$, $ANO_3$, $AClO_4$, $A_3PO_4$, $A_2CO_3$, ACl, $ANO_3$, and AOH, where A comprises Li, Na, both Li and Na, or K. Alkaline earth salts include but are not limited to $CaSO_4$, $Ca(NO_3)_2$, $Ca(ClO_4)_2$, $CaCO_3$, $Ca(OH)_2$, $MgSO_4$, $Mg(NO_3)_2$, $Mg(ClO_4)_2$, $MgCO_3$, and $Mg(OH)_2$. The pH of an aqueous electrolyte may be adjusted using methods known to those of ordinary skill in the art, for example by adding OH containing salts to raise pH, or acids to lower pH, in order to adjust the voltage stability window of the electrolyte or to reduce degradation by proton exchange of certain active materials.

In some embodiments the redox-active compound is present as a nanoscale, nanoparticle, or nanostructured form. This can facilitate the formation of stable liquid suspensions of the storage compound, and improves the rate of reaction when such particles are in the vicinity of the current collector. The nanoparticulates may have equiaxed shapes or have aspect ratios greater than about 3, including nanotubes, nanorods, nanowires, and nanoplatelets. Branched nanostructures such as nanotripods and nanotetrapods can also be used in some embodiments. Nanostructured ion storage compounds may be prepared by a variety of methods including mechanical grinding, chemical precipitation, vapor phase reaction, laser-assisted reactions, and bio-assembly. Bio-assembly methods include, for example, using viruses having DNA programmed to template an ion-storing inorganic compound of interest, as described in K. T. Nam, D. W. Kim, P. J. Yoo, C.-Y. Chiang, N. Meethong, P. T. Hammond, Y.-M. Chiang, A. M. Belcher, "Virus enabled synthesis and assembly of nanowires for lithium ion battery electrodes," *Science,* 312[5775], 885-888 (2006).

In redox cells with a semi-solid flowable redox composition, too fine a solid phase can inhibit the power and energy of the system by "clogging" the current collectors. In one or more embodiments, the semi-solid flowable composition contains very fine primary particle sizes for high redox rate, but which are aggregated into larger agglomerates. Thus in some embodiments, the particles of solid redox-active compound in the positive or negative flowable redox compositions are present in a porous aggregate of 1 micrometer to 500 micrometer average diameter.

The redox energy storage devices can include, in some embodiments, small particles that can comprise a lubricant such as, for example, fluoropolymers such as polytetrafluoroethylene (PTFE).

In some embodiments, acoustic energy is applied to the system to inhibit the accumulation of particles of solid redox-active compound or any other solid within the system. "Acoustic energy" is given its normal meaning in the art, and is generally used to refer to an oscillation of pressure transmitted through a medium. In one embodiment, the acoustic energy is applied to a semi-solid suspension, for example, used as the positive and/or negative flowable redox composition in the inventive redox flow energy storage devices. The application of acoustic energy may, for example, allow one to avoid undesirable states of particle aggregation in the flowable redox composition (e.g., a suspension), to avoid particle stratification and settling, to disrupt or inhibit the formation of solid-electrolyte interface (SEI) layers, to alter the rheology of the suspension in-situ, among other reasons.

The acoustic energy can originate from any suitable source. In some embodiments, the acoustic energy source may be a discrete device (e.g., removably attached to the energy storage device, positioned proximate the energy storage device) or it may be monolithically integrated with the energy storage device. For example, the acoustic energy can, in some embodiments, originate from a resonator. In one set of embodiments, acoustic energy can be provided by a piezoelectric or electrostrictive actuator that is, for example, driven by an AC field.

Acoustic energy can be applied at any location within the flow cell system, including in a storage tank, at a segment of tubing or a channel, or within the redox flow energy storage device(s). For example, one or more piezoelectric actuators may be attached to the walls of a storage tank to control particle settling, in much the same manner than an ultrasonic cleaning bath is constructed with a piezoelectric element attached to the wall of the vessel. One or more acoustic energy sources may be inserted in the tank itself, analogous to the use of an ultrasonic "horn" to disperse particle suspensions in liquid. In some embodiments, at least one acoustic energy source is attached to pipes or tubing or joints between pipes or tubing that carry the semi-solid suspension between storage tanks and the flow cell. In some cases, at least one acoustic energy source is incorporated into an in-line sensor of the kind discussed herein. At least one acoustic energy source, in some embodiments, is attached to the outer surface(s) of the redox flow energy storage device(s), or may be embedded within the layers of a stack of redox flow energy storage devices, where it/they may be used to control particle dispersion, settling, or suspension rheology.

In some embodiments, acoustic energy can be applied to the energy storage device at a frequency and/or level of energy selected to inhibit accumulation of a solid in the energy storage device (e.g., within a flowable redox composition within the energy storage device). In some embodiments, the frequency and/or power of the acoustic energy source may be tuned, using methods known to those of ordinary skill in the art, to, for example, enhance energy coupling to the suspension and/or maintain low power consumption by the device. This can be accomplished, for example, by employing a source of acoustic energy that includes a controller that allows for the application of a selected frequency and/or amplitude of acoustic energy. In some embodiments, the acoustic energy source may be used to apply ultrasonic acoustic energy to the energy storage device or a portion thereof.

In some embodiments, acoustic energy can be applied to the energy storage device at a frequency and/or level of energy selected to reduce the viscosity of a flowable redox composition within the energy storage device. In some embodiments, acoustic energy can be applied to the energy storage device at a frequency and/or level of energy selected to reduce the viscosity of a flowable redox composition by at least about 10%, at least about 20%, at least about 30%, at least about 40%, or at least about 50%.

The ability to lower the viscosity of the flowable redox composition can be particularly useful in small channels, constrictions, and other areas where transporting the redox composition can be difficult. In some embodiments, acoustic energy can be applied to a portion of a channel through which the flowable redox composition flows, the portion of the channel having a smallest cross-sectional dimension of less than about 1 cm, less than about 5 mm, less than about 1 mm, less than about 100 micrometers, between about 10 micrometers and about 1 cm, between about 10 micrometers and about 5 mm, or between about 10 micrometers and about 1 mm. In some embodiments, the redox flow energy storage device is constructed and arranged such that the flowable redox composition flows through a substantially fluidically continuous channel, and the acoustic energy is applied to a portion of the channel having a smallest cross-sectional dimension that is less than about 0.5 times, less than about 0.25 times, less than about 0.1 times, less than about 0.05 times, or less than about 0.02 times the maximum cross sectional dimension of the channel. The "maximum cross-sectional dimension" of a channel, as used herein, refers to the largest cross-sectional distance between the boundaries of the channel, as measured perpendicular to the length of the channel (i.e., perpendicular to the direction of fluid flow). Likewise, the "minimum cross-sectional dimension" of a channel, as used herein, refers to the smallest cross-sectional distance between the boundaries of the channel, as measured perpendicular to the length of the channel (i.e., perpendicular to the direction of fluid flow).

The ion-permeable medium through which ions are transported within the redox flow energy storage device can include any suitable medium capable of allowing ions to be passed through it. In some embodiments, the ion-permeable medium can comprise a membrane. The membrane can be any conventional membrane that is capable of ion transport. In one or more embodiments, the membrane is a liquid-impermeable membrane that permits the transport of ions therethrough, namely a solid or gel ionic conductor. In other embodiments the membrane is a porous polymer membrane infused with a liquid electrolyte that allows for the shuttling of ions between the anode and cathode electroactive materials, while preventing the transfer of electrons. In some embodiments, the membrane is a microporous membrane that prevents particles forming the positive and negative electrode flowable compositions from crossing the membrane. Exemplary membrane materials include polyethyleneoxide (PEO) polymer in which a lithium salt is complexed to provide lithium conductivity, or Nafion™ membranes which are proton conductors. For example, PEO based electrolytes can be used as the membrane, which is pinhole-free and a solid ionic conductor, optionally stabilized with other membranes such as glass fiber separators as supporting layers. PEO can also be used as a slurry stabilizer, dispersant, etc. in the positive or negative flowable redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

In some embodiments, a carrier liquid is used to suspend and transport the solid phase or condensed liquid of the flowable redox composition. The carrier liquid can be any liquid that can suspend and transport the solid phase or condensed ion-storing liquid of the flowable redox composition. By way of example, the carrier liquid can be water, a polar solvent such as alcohols or aprotic organic solvents. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, and the like. These nonaqueous solvents are typically used as multicomponent mixtures, into which a salt is dissolved to provide ionic conductivity. Exemplary salts to provide lithium conductivity include $LiClO_4$, $LiPF_6$, $LiBF_4$, lithium bis(pentafluorosulfonyl)imide (also referred to as LiBETI), lithium bis(trifluoromethane)sulfonimide (also referred to as LiTFSI), lithium bis(oxalato)borate (also referred to as LiBOB), and the like. As specific examples, the carrier liquid can comprise 1,3-dioxolane mixed with lithium bis(pentafluorosulfonyl)imide, for example, in a mixture of about 70:30 by mass; an alkyl carbonate mixed with $LiPF_6$; $LiPF_6$ in dimethyl carbonate DMC (e.g., at a molarity of about 1 M); $LiClO_4$ in 1,3-dioxolane (e.g., at a molarity of about 2 M); and/or a mixture of tratraglyme and lithium bis(pentafluorosulfonyl) imide (e.g., in a molar ratio of about 1:1).

In some embodiments, the carrier liquid used within a flowable redox composition (e.g., to suspend and transport the solid phase within the flowable redox composition) and/or a salt included in the flowable redox composition (e.g., in a semi-solid suspension used as a catholyte or anolyte in the semisolid flow cell) is selected for its ability to inhibit the formation of a solid-electrolyte interface (SEI). The formation of SEI is a phenomenon known to those of ordinary skill in the art, and is normally present in, for example, primary and secondary lithium batteries. Formation of a thin and stable SEI on the electrode can be desirable in conventional lithium-ion batteries, as it can provide controlled passivation of the electrodes against oxidation reactions (at the positive electrode) or reduction reactions (at the negative electrode) that, if allowed to continue, can consume working lithium in the cell, increase the impedance of the electrodes, introduce safety issues, or degrade the electrolyte. However, in some embodiments described herein, formation of SEI can be undesirable. For example, formation of SEI on conductive particles in the semi-solid suspension or on the surfaces of the current collectors can decrease cell performance, as such films are generally electronically insulating, and can increase the internal resistance of said flow cell. Thus it can be advantageous to select carrier liquids and/or salts that minimize SEI formation at the working potential of the positive and/or negative flowable redox composition (e.g., catholyte and/or anolyte). In some embodiments, the same composition (e.g., carrier fluid, salt, and/or electroactive solid material) is used in both the positive flowable redox composition and the negative flowable redox composition, and is selected to have an electrochemical stability window that includes the potentials at both electrodes or current collectors of the flow cell. In other embodiments, the components of the positive and negative flowable redox composition (e.g., carrier fluid, salt, and/or electroactive solid material) are separately chosen and used to enhance the performance of the positive and/or negative flowable redox compositions (and their respective current collectors). In such cases, the electrolyte phase of the semi-solid cathode and anode may be separated in the flow cell by using a separation medium (e.g., a separator membrane) that is partially or completely impermeable to the carrier liquids, while permitting facile transport of the working ion between positive and negative flowable redox compositions. In this way, a first carrier liquid can be used in the positive electroactive zone (e.g., in the positive flowable redox composition), and a second, different carrier liquid can be used in the negative electroactive zone (e.g., in the negative flowable redox composition).

A variety of carrier liquids can be selected for advantageous use at the negative and/or positive electrode of the flow cells described herein. In some embodiments, the carrier liquid compound includes 1 oxygen atom. For example, the carrier liquid may include an ether (e.g., an acyclic ether, a cyclic ether) or a ketone (e.g., an acyclic ketone, a cyclic ketone) in some embodiments. In some cases, the carrier liquid includes a symmetric acyclic ether such as, for example, dimethyl ether, diethyl ether, di-n-propyl ether, and diisopropyl ether. In some cases, the carrier liquid includes an asymmetric acyclic ether such as, for example, ethyl methyl ether, methyl n-propyl ether, isopropyl methyl ether, methyl n-butyl ether, isobutyl methyl ether, methyl s-butyl ether, methyl t-butyl ether, ethyl isopropyl ether, ethyl n-propyl ether, ethyl n-butyl ether, ethyl i-butyl ether, ethyl s-butyl ether, and ethyl t-butyl ether. In some cases, the carrier liquid includes a cyclic ether including 5-membered rings such as, for example, tetrahydrofuran, 2-methyl tetrahydrofuran, 3-methyl tetrahydrofuran. The carrier liquid can include, in some embodiments, a cyclic ether including 6-membered rings such as, for example, tetrahydropyran, 2-methyl tetrahydropyran, 3-methyl tetrahydropyran, 4-methyl tetrahydropyran.

In some embodiments, the carrier liquid compound includes a ketone. Ketones may be advantageous for use in some embodiments due to their relatively large dipole moments, which may allow for relatively high ionic conductivity in the electrolyte. In some embodiments, the carrier liquid includes an acyclic ketone such as, for example, 2-butanone, 2-pentanone, 3-pentanone, or 3-methyl-2-butanone. The carrier liquid can include, in some cases, a cyclic ketone including cyclic ketones with 5-membered rings (e.g., cyclopentanone, 2-methyl cyclopentanone, and 3-methyl cyclopentanone) or 6-membered rings (e.g., cyclohexanone, 2-methyl cyclohexanone, 3-methyl cyclohexanone, 4-methyl cyclohexanone).

The carrier liquid compound can contain 2 oxygen atoms, in some embodiments. For example, the carrier liquid can include a diether, a diketone, or an ester. In some embodiments, the carrier liquid can include an acyclic diether (e.g., 1,2-dimethoxyethane, 1,2-diethoxyethane) an acyclic diketone (e.g., 2,3-butanedione, 2,3-pentanedione, 2,3-hexanedione), or an acyclic ester (e.g., ethyl acetate, ethyl propionate, methyl propionate). The carrier liquid can include a cyclic diether, in some embodiments. For example, the carrier liquid can include a cyclic diether including 5-membered rings (e.g., 1,3-dioxolane, 2-methyl-1,3-dioxolane, 4-methyl-1,3-dioxolane), or a cyclic diether including 6-membered rings (e.g., 1,3-dioxane, 2-methyl-1,3-dioxane, 4-methyl-1,3-dioxane, 1,4-dioxane, 2-methyl-1,4-dioxane). The carrier liquid can include a cyclic diketone, in some instances. For example, the carrier liquid can include a cyclic diketone including 5-membered rings (e.g., 1,2-cyclopentanedione, 1,3-cyclopentanedione, and 1H-indene-1,3(2H)-dione), or a cyclic diether including 6-membered rings (e.g., 1,2-cyclohexane dione, 1,3-cyclohexanedione, and 1,4-cyclohexanedione). In some embodiments, the carrier liquid can include a cyclic ester. For example, the carrier liquid can include a cyclic ester including 5-membered rings (e.g., gamma-butyro lactone, gamma-valero lactone), or a cyclic ester including 6-membered rings (e.g., delta-valero lactone, delta-hexa lactone).

In some cases, carrier liquid compounds containing 3 oxygen atoms may be employed. For example, the carrier liquid may include a triether. In some cases, the carrier liquid may include an acyclic triether such as, for example, 1-methoxy-2-(2-methoxyethoxy)ethane, and 1-ethoxy-2-(2-ethoxyethoxy)ethane, or trimethoxymethane. In some cases, the carrier liquid can include a cyclic triether. In some embodiments, the carrier liquid can include a cyclic triether with 5-membered rings (e.g., 2-methoxy-1,3-dioxolane) or a cyclic triether with 6-membered rings (e.g., 1,3,5-trioxane, 2-methoxy-1,3-dioxane, 2-methoxy-1,4-dioxane).

The carrier liquid compound includes, in some embodiments, a carbonate (e.g., unsaturated carbonates). The carbonates may, in some cases, form an SEI at a lower potential than liquid carbonates conventionally used in commercial lithium batteries. In some instances, acyclic carbonates can be used (e.g., methyl vinyl carbonate, methyl ethynyl carbonate, methyl phenyl carbonate, phenyl vinyl carbonate, ethynyl phenyl carbonate, divinyl carbonate, diethynyl carbonate, diphenyl carbonate). In some instances, cyclic carbonates can be used such as, for example cyclic carbonates with 6-membered rings (e.g., 1,3-dioxan-2-one).

In some embodiments, the carrier liquid includes compounds that include a combination of one or more ethers, esters, and/or ketones. Such structures can be advantageous for use in some embodiments due to their relatively high dipole moments, allowing for high ionic conductivity in the electrolyte. In some embodiments, the carrier liquid includes an ether-ester (e.g., 2-methoxyethyl acetate), an ester-ketone (e.g., 3-acetyldihydro-2(3H)-furanone, 2-oxopropyl acetate), a diether-ketone (e.g., 2,5-dimethoxy-cyclopentanone, 2,6-dimethoxy-cyclohexanone), or an anhydride (e.g., acetic anhydride).

In some cases, the carrier liquid compound includes one nitrogen and one oxygen atom such as an amide. Such compounds can be acyclic (e.g., N,N-dimethyl formamide) or cyclic (e.g., 1-methyl-2-pyrrolidone, 1-methyl-2-piperidone, 1-vinyl-2-pyrrolidone).

Compounds containing 1 nitrogen and 2 oxygen atoms can be used in the carrier liquid, in some cases. For example, 3-methyl-1,3-oxazolidin-2-one can be used as a carrier liquid, in some cases. 3-methyl-1,3-oxazolidin-2-one may be advantageous for use in some embodiments due to its relatively high dipole moment, which would allow for high ionic conductivity in the electrolyte.

Compounds containing two nitrogen atoms and one oxygen atom can be used in the carrier liquid, in some instances. For example, in some embodiments, the carrier liquid can include 1,3-dimethyl-2-imidazolidinone, N,N,N',N'-tetramethylurea, or 1,3-dimethyltetrahydro-2(1H)-pyrimidinone. These compounds also include a relatively high dipole moment, which can provide advantages in some embodiments.

In some cases, the carrier liquid includes fluorinated or nitrile compounds (e.g., fluorinated or nitrile derivatives of any of the carrier liquid types mentioned herein). Such compounds may increase the stability of the fluid and allow for higher ionic conductivity of the electrolytes. Examples of such fluorinated compounds include, but are not limited to, 2,2-difluoro-1,3-dioxolane, 2,2,5,5-tetrafluorocyclopentaone, 2,2-difluoro-gama-butyrolactone, and 1-(trifluoromethyl)pyrrolidin-2-one. Examples of such nitrile compounds include, but are not limited to, tetrahydrofuran-2-carbonitrile, 1,3-dioxolane-2-carbonitrile, and 1,4-dioxane-2-carbonitrile.

In some cases, the carrier liquid includes sulfur containing compounds. In some cases, the carrier liquid can include a sulfoxide (e.g., dimethyl sulfoxide, tetrahydrothiophene 1-oxide, 1-(methylsulfonyl)ethylene), a sulfone (e.g., dimethyl sulfone, divinyl sulfone, tetrahydrothiophene 1,1-dioxide), a sulfite (e.g., 1,3,2-dioxathiolane 2-oxide, dimethyl sulfite, 1,2-propyleneglycol sulfite), or a sulfate (e.g., dimethyl sulfate, 1,3,2-dioxathiolane 2,2-dioxide). In some embodiments, the carrier liquid can include a compound with 1 sulfur and 3 oxygen atoms (e.g., methyl methanesulfonate, 1,2-oxathiolane 2,2-dioxide, 1,2-oxathiane 2,2-dioxide, methyl trifluoromethanesulfonate).

The carrier liquid includes, in some embodiments, phosphorous containing compounds such as, for example, phosphates (e.g., trimethyl phosphate) and phosphites (e.g., trimethyl phosphite). In some embodiments, the carrier liquid can include 1 phosphorus and 3 oxygen atoms (e.g., dimethyl methylphosphonate, dimethyl vinylphosphonate).

In some embodiments, the carrier liquid includes an ionic liquid. The use of ionic liquids may significantly reduce or eliminate SEI formation, in some cases. Exemplary anions suitable for use in the ionic liquid include, but are not limited to tetrafluoroborate, hexafluorophosphate, hexafluoroarsenoate, perchlorate, trifluoromethanesulfonate, bis(trifluoromethylsulfonyl)amide, and thiosaccharin anion. Suitable cations include, but are not limited to, ammonium, imidazolium, pyridinium, piperidinium or pyrrolidinium derivatives. The ionic liquid can, in some embodiments, include a combination of any one of the above anions and any one of the above cations.

The carrier liquid includes, in some cases, perfluorinated derivates of any of the carrier liquid compounds mentioned herein. A perfluorinated derivative is used to refer to compounds in which at least one hydrogen atom bonded to carbon atom is replaced by a fluorine atom. In some cases, at least half or substantially all of the hydrogen atoms bonded to a carbon atom are replaced with a fluorine atom. The presence of one or more fluorine atoms in the carrier liquid compound may, in some embodiments, allow for enhanced control over the viscosity and/or dipole moment of the molecule.

In some embodiments, the viscosity of the redox compositions undergoing flow can be within a very broad range, from about 1 centipoise (cP) to about $1.5 \times 10^6$ cP or from about 1 centipoise (cP) to about $10^6$ cP at the operating temperature of the battery, which may be between about $-50°$ C. and $+50°$ C. In some embodiments, the viscosity of the electrode undergoing flow is less than about $10^5$ cP. In other embodiments, the viscosity is between about 100 cP and $10^5$ cP. In those embodiments where a semi-solid is used, the volume percentage of ion-storing solid phases may be between 5% and 70%, and the total solids percentage including other solid phases such as conductive additives may be between 10% and 75%. In some embodiments, the cell "stack" where electrochemical reaction occurs operates at a higher temperature to decrease viscosity or increase reaction rate, while the storage tanks for the semi-solid may be at a lower temperature.

In some embodiments, peristaltic pumps are used to introduce a solid-containing electroactive material into an electroactive zone, or multiple electroactive zones in parallel. The complete volume (occupied by the tubing, a slurry reservoir, and the active cells) of the slurry can be discharged and recharged by slurry cycling. The active positive electrode and negative electrode slurries can be independently cycled through the cell by means of peristaltic pumps. The pump can provide independent control of the flow rates of the positive electrode slurry and the negative electrode slurry. The independent control permits power balance to be adjusted to slurry conductivity and capacity properties.

In some embodiments, the peristaltic pump works by moving a roller along a length of flexible tubing. This way the fluid inside the tubing never comes into contact with anything outside of the tubing. In a pump, a drive turns a shaft which is coupled to a pump head. The pump head secures the tubing in place and also use the rotation of the shaft to move a rolling head across the tubing to create a flow within the tube. Such pumps are often used in situations where the fluid being transferred needs to be isolated (as in blood transfusions and other medical applications). Here the peristaltic pump can also be used to transfer viscous fluids and particle suspensions. In some embodiments, a closed circuit of tubing is used to run the slurry in a cycle, with power provided by the peristaltic pump. In some embodiments, the closed anolyte and catholyte systems may be connected to removable reservoirs to collect or supply anolyte and catholyte; thus enabling the active material to be recycled externally. The pump will require a source of power which may include that obtained from the cell. In some embodiments, the tubing may not be a closed cycle, in which case removable reservoirs for charged and of discharged anolytes and catholytes can be employed; thus enabling the active material to be recycled externally. In some embodiments, one or more slurries are pumped through the redox cell at a rate permitting complete charge or discharge during the residence time of the slurry in the cell, whereas in other embodiments one or more slurries are circulated repeatedly through the redox cell at a higher rate, and only partially charged or discharged during the residence time in the cell.

In some embodiments the pumping direction of one or more slurries is intermittently reversed to improve mixing of the slurries or to reduce clogging of passages in the flow system.

While peristaltic pumps have been described in detail, it should be understood that other types of pumps can also be used to transport the flowable redox composition(s) described herein. For example, in some embodiments, a piston pump is used to transport one or more flowable redox compositions through the redox flow energy storage device. In some embodiments, an auger can be used to transport one or more flowable redox compositions.

The flowable redox compositions can include various additives to improve the performance of the flowable redox cell. The liquid phase of the semi-solid slurry in such instances would comprise a solvent, in which is dissolved an electrolyte salt, and binders, thickeners, or other additives added to improve stability, reduce gas formation, improve SEI formation on the negative electrode particles, and the like. Examples of such additives include vinylene carbonate (VC), vinylethylene carbonate (VEC), fluoroethylene carbonate (FEC), or alkyl cinnamates, to provide a stable passivation layer on the anode or thin passivation layer on the oxide cathode; propane sultone (PS), propene sultone (PrS), or ethylene thiocarbonate as antigassing agents; biphenyl (BP), cyclohexylbenzene, or partially hydrogenated terphenyls, as gassing/safety/cathode polymerization agents; or lithium bis(oxatlato)borate as an anode passivation agent.

In some embodiments, the nonaqueous positive and negative electrode flowable redox compositions are prevented from absorbing impurity water and generating acid (such as HF in the case of $LiPF_6$ salt) by incorporating compounds that getter water into the active material suspension or into the storage tanks or other plumbing of the system. Optionally, the additives are basic oxides that neutralize the acid. Such compounds include but are not limited to silica gel, calcium sulfate (for example, the product known as Drierite), aluminum oxide and aluminum hydroxide.

In some embodiments, the colloid chemistry and rheology of the semi-solid flow electrode is adjusted to produce a stable suspension from which the solid particles settle only slowly or not at all, in order to improve flowability of the semi-solid and to minimize any stirring or agitation needed to avoid settling of the active material particles. The stability of the electroactive material particle suspension can be evaluated by monitoring a static slurry for evidence of solid-liquid separation due to particle settling. As used herein, an electroactive material particle suspension is referred to as "stable" when there is no observable particle settling in the suspension. In some embodiments, the electroactive material particle suspension is stable for at least 5 days. Usually, the stability of the electroactive material particle suspension increases with decreased suspended particle size. In some embodiments, the particle size of the electroactive material particle suspension is about less than 10 microns. In some embodiments, the particle size of the electroactive material particle suspension is about less than 5 microns. In some embodiments, the particle size of the electroactive material particle suspension is about 2.5 microns. In some embodiments, conductive additives are added to the electroactive material particle suspension to increase the conductivity of the suspension. Generally, higher volume fractions of conductive additives such as Ketjen carbon particles increase suspension stability and electronic conductivity, but excessive amount of conductive additives may also increase the viscosity of the suspension. In some embodiments, the flowable redox electrode composition includes thickeners or binders to reduce settling and improve suspension stability. In some embodiments, the shear flow produced by the pumps provides additional stabilization of the suspension. In some embodiments, the flow rate is adjusted to eliminate the formation of dendrites at the electrodes.

In some embodiments, the active material particles in the semi-solid are allowed to settle and are collected and stored separately, then re-mixed with the liquid to form the flow electrode as needed.

In some embodiments, the rate of charge or discharge of the redox flow battery is increased by increasing the instant amount of one or both flow electrodes in electronic communication with the current collector.

In some embodiments, this is accomplished by making the semi-solid suspension more electronically conductive, so that the reaction zone is increased and extends into the flow electrode. In some embodiments, the conductivity of the semi-solid suspension is increased by the addition of a conductive material, including but not limited to metals, metal carbides, metal nitrides, and forms of carbon including carbon black, graphitic carbon powder, carbon fibers, carbon microfibers, vapor-grown carbon fibers (VGCF), and fullerenes including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments that are not predominantly a closed shell or tube of the graphene sheet. In some embodiments, nanorod or nanowire or highly expected particulates of active materials or conductive additives can be included in the electrode suspensions to improve ion storage capacity or power or both. As an example, carbon nanofilters such as VGCF (vapor growth carbon fibers), multiwall carbon nanotubes (MWNTs) or single-walled carbon nanotubes (SWNTs), may be used in the suspension to improve electronic conductivity, or optionally to store the working ion.

In some embodiments, the conductivity of the semi-solid ion-storing material is increased by coating the solid of the semi-solid ion-storing material with a conductive coating material which has higher electron conductivity than the solid. Non-limiting examples of conductive-coating material include carbon, a metal, metal carbide, metal nitride, metal oxide, or conductive polymer. In some embodiments, the solid of the semi-solid ion-storing material is coated with metal that is redox-inert at the operating conditions of the redox energy storage device. In some embodiments, the solid of the semi-solid ion-storing material is coated with copper to increase the conductivity of the storage material particle, to increase the net conductivity of the semi-solid, and/or to facilitate charge transfer between energy storage particles and conductive additives. In some embodiments, the storage material particle is coated with, about 1.5% by weight, metallic copper. In some embodiments, the storage material particle is coated with, about 3.0% by weight, metallic copper. In some embodiments, the storage material particle is coated with, about 8.5% by weight, metallic copper. In some embodiments, the storage material particle is coated with, about 10.0% by weight, metallic copper. In some embodiments, the storage material particle is coated with, about 15.0% by weight, metallic copper. In some embodiments, the storage material particle is coated with, about 20.0% by weight, metallic copper. In general, the cycling performance of the flowable redox electrode increases with the increases of the weight percentages of the conductive coating material. In general, the capacity of the flowable redox electrode also increases with the increases of the weight percentages of the conductive coating material.

In some embodiments, the rate of charge or discharge of the redox flow battery is increased by adjusting the inter-particle interactions or colloid chemistry of the semi-solid to increase particle contact and the formation of percolating networks of the ion-storage material particles. In some embodiments, the percolating networks are formed in the vicinity of the current collectors. In some embodiments, the semi-solid is shear-thinning so that it flows more easily where desired. In some embodiments, the semi-solid is shear thickening, for example so that it forms percolating networks at high shear rates such as those encountered in the vicinity of the current collector.

The energy density of nonaqueous batteries using the flowable electrode active materials according to one or more embodiments compares favorably to conventional redox anolyte and catholyte batteries. Redox anolytes and catholytes, for example those based on vanadium ions in solution, typically have a molar concentration of the vanadium ions of between 1 and 8 molar, the higher concentrations occurring when high acid concentrations are used. One may compare the energy density of a semi-solid slurry based on known lithium ion battery positive and negative electrode compounds to these values. The liquid phase of the semi-solid slurry in such instances would comprise a solvent, including but not limited to an alkyl carbonate or mixture of alkyl carbonates, in which is dissolved a lithium salt, including but not limited to $LiPF_6$, and binders, thickeners, or other additives added to improve stability, reduce gas formation, improve SEI formation on the negative electrode particles, and the like.

In a non-aqueous semi-solid redox flow cell, one useful positive electrode flowable redox composition is a suspension of lithium transition metal olivine particles in the liquid discussed above. Such olivines include $LiMPO_4$ where M comprises a first row transition metals, or solid solutions, doped or modified compositions, or nonstoichiometric or disordered forms of such olivines. Taking the compound $LiFePO_4$ for illustrative example, the density of olivine $LiFePO_4$ is 3.6 g/cm$^3$ and its formula weight is 157.77 g/mole. The concentration of Fe per liter of the solid olivine is therefore: $(3.6/157.77) \times 1000$ cm$^3$/liter=22.82 molar. Even if present in a suspension diluted substantially by liquid, the molar concentration far exceeds that of typical redox electrolytes. For example, a 50% solids slurry has 11.41M concentration, exceeding even highly concentrated vanadium flow battery electrolytes, and this is achieved without any acid additions.

In some embodiments, a positive electrode flowable redox composition in which the electrochemically active solid compound forming the particles is $LiCoO_2$, the density is 5.01 g/cm$^3$ and the formula weight is 97.874 g/mole. The concentration of Co per liter is: $(5.01/97.874) \times 1000$ cm$^3$/liter=51.19 molar. The energy density of such semi-solid slurries is clearly a factor of several higher than that possible with conventional liquid catholyte or anolyte solutions.

In some embodiments, a suspension of graphite in the liquid, which may serve as a negative electrode flowable redox composition, is used. In operation, graphite (or other hard and soft carbons) can intercalate lithium. In graphite the maximum concentration is about $LiC_6$. Since graphite has a density of about 2.2 g/cm$^3$, and the formula weight of $LiC_6$ is 102.94 g/mole, the concentration of Li per liter of $LiC_6$ is: $(2.2/102.94) \times 1000$=21.37 molar. This is again much higher than conventional redox flow battery anolytes.

Furthermore, the nonaqueous batteries can have cell working voltages that are more than twice as high as some aqueous batteries, where the voltage can be limited to 1.2-1.5V due to the limitation of water hydrolysis at higher voltage. By contrast, use of $LiFePO_4$ with graphite in a semi-solid redox flow cell provides 3.3V average voltage, and $LiCoO_2$ with graphite provides 3.7V average voltage. Since the energy of any battery is proportional to voltage, the batteries using solid suspension or condensed ion-supporting liquid redox flow compositions have a further improvement in energy over conventional solution-based redox flow cells.

Thus a non-aqueous semi-solid redox flow cell can provide the benefits of both redox flow batteries and conventional lithium ion batteries by providing for a higher cell voltage and for flow battery electrodes that are much more energy dense than redox flow batteries by not being limited to soluble metals, but rather, comprising a suspension of solid or liquid electrode-active materials, or in the case of dense liquid reactants such as liquid metals or other liquid compounds, the flow battery electrolyte may comprise a significant fraction or even a majority of the liquid reactant itself. Unlike a conventional primary or secondary battery, the total capacity or stored energy may be increased by simply increasing the size of the reservoirs holding the reactants, without increasing the amount of other components such as the separator, current collector foils, packaging, and the like. Unlike a fuel cell, such a semi-solid redox flow battery is rechargeable.

Amongst many applications, the semi-solid and condensed ion-supporting liquid redox flow batteries can be used to power a plug-in hybrid (PHEV) or all-electric vehicle (EV). Currently, for markets where the daily driving distance is long, such as the U.S. where the median daily driving distance is 33 miles, PHEVs are an attractive solution because with daily charging a battery that supplies 40 miles of electric range (PHEV40) is practical. For a car weighing about 3000 lb this requires a battery of approximately 15 kWh of energy and about 100 kW power, which is a battery of manageable size, weight, and cost.

However, an EV of the same size for the same driving pattern generally will require longer range, such as a 200 mile driving distance between recharges, or 75 kWh, in order to provide an adequate reserve of energy and security to the user. Higher specific energy batteries are needed to meet the size, weight and cost metrics that will enable widespread use of EVs. The semi-solid and condensed ion-supporting liquid redox flow batteries can enable practical low cost battery solutions for such applications. The theoretical energy density of the $LiCoO_2$/carbon couple is 380.4 Wh/kg. However, high power and high energy lithium ion batteries based on such chemistry provide only about 100-175 Wh/kg at the cell level, due to the dilution effects of inactive materials. Providing a 200 mile range, which is equivalent to providing 75 kWh of energy, requires 750-430 kg of current advanced lithium ion cells. Additional mass is also required for other components of the battery system such as packaging, cooling systems, the battery management system, and the like.

Considering the use of conventional lithium ion batteries in EVs, it is known that specific energy is more limiting than power. That is, a battery with sufficient energy for the desired driving range will typically have more than enough power. Thus the battery system includes wasted mass and volume that provides unneeded power. The semi-solid or condensed ion-supporting liquid redox flow battery can have a smaller power-generating portion (or stack) that is sized to provide the necessary power, while the remaining, larger fraction of the total mass can be devoted to the high energy density positive and negative electrode redox flow compositions and their storage system. The mass of the power-generating stack is determined by considering how much stack is needed to provide the approximately 100 kW needed to operate the car. Lithium ion batteries are currently available that have specific power of about 1000-4000 W/kg. The power generated per unit area of separator in such a battery and in the stacks of the flowable redox cell is similar. Therefore, to provide 100 kW of power, about 25-100 kg of stack is needed.

The remainder of the battery mass may come predominantly from the positive and negative electrode flowable redox compositions. As the theoretical energy density for the $LiCoO_2$/carbon couple is 380.4 Wh/kg, the total amount of active material required to provide 75 kWh of energy is only 197 kg. In flow batteries the active material is by far the largest mass fraction of the positive and negative electrode flowable redox compositions, the remainder coming from additives and liquid electrolyte phase, which has lower density than the ion storage compounds. The mass of the positive and negative electrode flowable redox compositions needed to supply the 75 kWh of energy is only about 200 kg.

Thus, including both the stack mass (25-100 kg) and the positive and negative electrode flowable redox composition mass (200 kg), a semi-solid redox flow battery to supply a 200 mile range may weigh 225 to 300 kg mass, much less than the mass (and volume) of advanced lithium ion batteries providing the same range. The specific energy of such a system is 75 kWh divided by the battery mass, or 333 to 250 Wh/kg, about twice that of current lithium cells. As the total energy of the system increases, the specific energy approaches the theoretical value of 380.4 Wh/kg since the stack mass is a diminishing fraction of the total. In this respect the rechargeable lithium flow battery has different scaling behavior than conventional lithium ion cells, where the energy density is less than 50% of the theoretical value regardless of system size, due to the need for a large percentage of inactive materials in order to have a functioning battery.

Thus in one set of embodiments, a rechargeable lithium ion flow battery is provided. In some embodiments, such a battery has a relatively high specific energy at a relatively small total energy for the system, for example a specific energy of more than about 150 Wh/kg at a total energy of less than about 50 kWh, or more than about 200 Wh/kg at total energy less than about 100 kWh, or more than about 250 Wh/kg at total energy less than about 300 kWh.

In another set of embodiments, a redox flow device uses one or more reference electrode during operation to determine the absolute potential at the positive and negative current collectors, the potentials being used in a feedback loop to determine the appropriate delivery rate of positive and negative electrode flowable redox compositions. For example, if the cathodic reaction is completing faster than the anodic reaction, the cell will be "cathode-starved" and greater polarization will occur at the positive electrode. In such an instance, detection of the cathode potential will indicate such a condition or impending condition, and the rate of delivery of positive electrode flowable redox composition can be increased. If the redox flow cell is being used at high power, and both cathode and anode reactions are completing and resulting in a fully discharged or charged state at the instant flow rates, this too can be detected using the current collector potentials, and the rates of both positive and negative electrode flowable redox compositions are increased so as to "match" the desired current rate of the cell.

More than one reference electrode may be used in order to determine the positional variation in utilization and completeness of electrochemical reaction within the flow battery. Consider for example a planar stack wherein the positive and negative electrode flowable redox compositions flow parallel to the separator and electrodes, entering the stack at one end and exiting at the other. Since the cathode-active and anode-active materials can begin to charge or discharge as soon as they are in electrical communication, the extent of reaction can differ at the entrance and the exit to the stack. By placing reference electrodes at more than one position within the stack and within the cell, the near-instantaneous state of the cell with respect to state of charge or discharge and local polarization can be determined. The operating efficiency, power and utilization of the cell can be optimized by taking into account the voltage inputs from the reference electrodes and altering operating parameters such as total or relative flow rate of catholyte and anolyte.

The reference electrodes may also be placed elsewhere within the flow device system. For example, having reference electrodes in the positive and negative electrode flowable redox composition storage tanks, or having a separate electrochemical cell within the storage tanks, the state of charge and discharge of the positive and negative electrode flowable redox compositions in the tank can be monitored. This also can be used as input to determine the flow rate of the semi-solid suspensions when operating the battery in order to provide necessary power and energy. The position of the reference electrode permits the determination of the local voltage in either the anolyte, catholyte, or separator. Multiple reference electrodes permit the spatial distribution of voltage to be determined. The operating conditions of the cells, which may include flow rates, can be adjusted to optimize power density via changes in the distribution of voltage.

In some embodiments, the semi-solid redox flow cell is a nonaqueous lithium rechargeable cell and uses as the reference electrode a lithium storage compound that is lithiated so as to produce a constant potential (constant lithium chemical potential) over a range of lithium concentrations. In some embodiments the lithium-active material in the reference electrode is lithium titanate spinel or lithium vanadium oxide or a lithium transition metal phosphate including but not limited to a lithium transition metal olivine of general formula $Li_xM_yPO_4$ where M comprises a first row transition metal. In some embodiments the compound is $LiFePO_4$ olivine or $LiMnPO_4$ olivine or mixtures or solid solutions of the two.

In some cases, a discrete in-line sensor, which can be separate from the flow device system (and therefore, removable from the system), may be used during operation of the system. The in-line sensor may contain a reference electrode that can be used to determine an absolute potential at a location within the system such as, for example, a flowable redox composition storage tank or a conduit that transports a flowable redox composition within the system. The use of one or more discrete in-line sensors that can be removed from the redox flow energy storage system may reduce the amount of time needed to replace the sensors, thus reducing system downtime. In addition, the data obtained from a discrete in-line sensor may be compared to the data obtained from an integrated reference electrode, which may be useful in checking the accuracy of one or more integrated reference electrodes.

In some embodiments, the discrete in-line sensor is positioned externally to the electroactive zones of the flow cell and/or externally to the source(s) of flowable redox active material (e.g., outside the storage tank(s) containing the flowable redox active material). The discrete in-line sensor is, in some embodiments, external to a conduit used to directly fluidically connect the source of flowable redox active material to an electroactive zone, as described in more detail below.

In one set of embodiments, an in-line sensor can be used to determine the condition of a positive and/or negative flowable redox composition (e.g., catholyte and/or anolyte), including but not limited to its state-of-charge, electronic or ionic conductivity, state of aggregation, viscosity and state of health by measuring the time dependence of such characteristics. In some embodiments, the in-line sensor can determine certain properties of a positive and/or negative flowable redox composition by taking measurements from a flowable redox composition that is undergoing flow. In-line sensors may, in some instances, determine properties of a flowable redox composition by sampling at least a portion of the flowable redox composition that is diverted from the main flow channels through said sensor. For example, the in-line sensor may divert a portion of a flowable redox composition from the redox flow energy storage device to an independent conduit to determine one or more properties of the flowable redox composition. Measurements that can be performed by the sensor include, but are not limited to the following properties of the flowable redox composition: its electrochemical potential with respect to a reference electrode contained within said sensor; its DC conductivity, measured across conductive electrodes contacting the flowable redox composition; its viscosity; its AC conductivity, from which transport and dielectric properties may be obtained using impedance spectroscopy methods known to those of ordinary skill in the art; and/or its magnetic properties. These properties may be measured as a function of time, temperature, flow rate, and/or amplitude and/or frequency of an applied potential or field. For example, the electrochemical potential of a flowable redox composition may be used to determine its state-of-charge during operation of the flow cell, or to provide information on degradation of the flowable redox composition (e.g., a component within the flowable redox composition). The DC or AC conductivity may be used to determine the state of percolation of a conductive solid phase in a semi-solid suspension flowable redox composition, and/or the rate of SEI accumulation. The variation of these quantities with flow rate may be used as feedback to determine operating conditions under which enhanced cell performance is observed. For example, the C-rate at which the flow cell may be charged or discharged may be maximized at a certain flow rate of the positive and/or negative flowable redox composition.

Figure 1H:
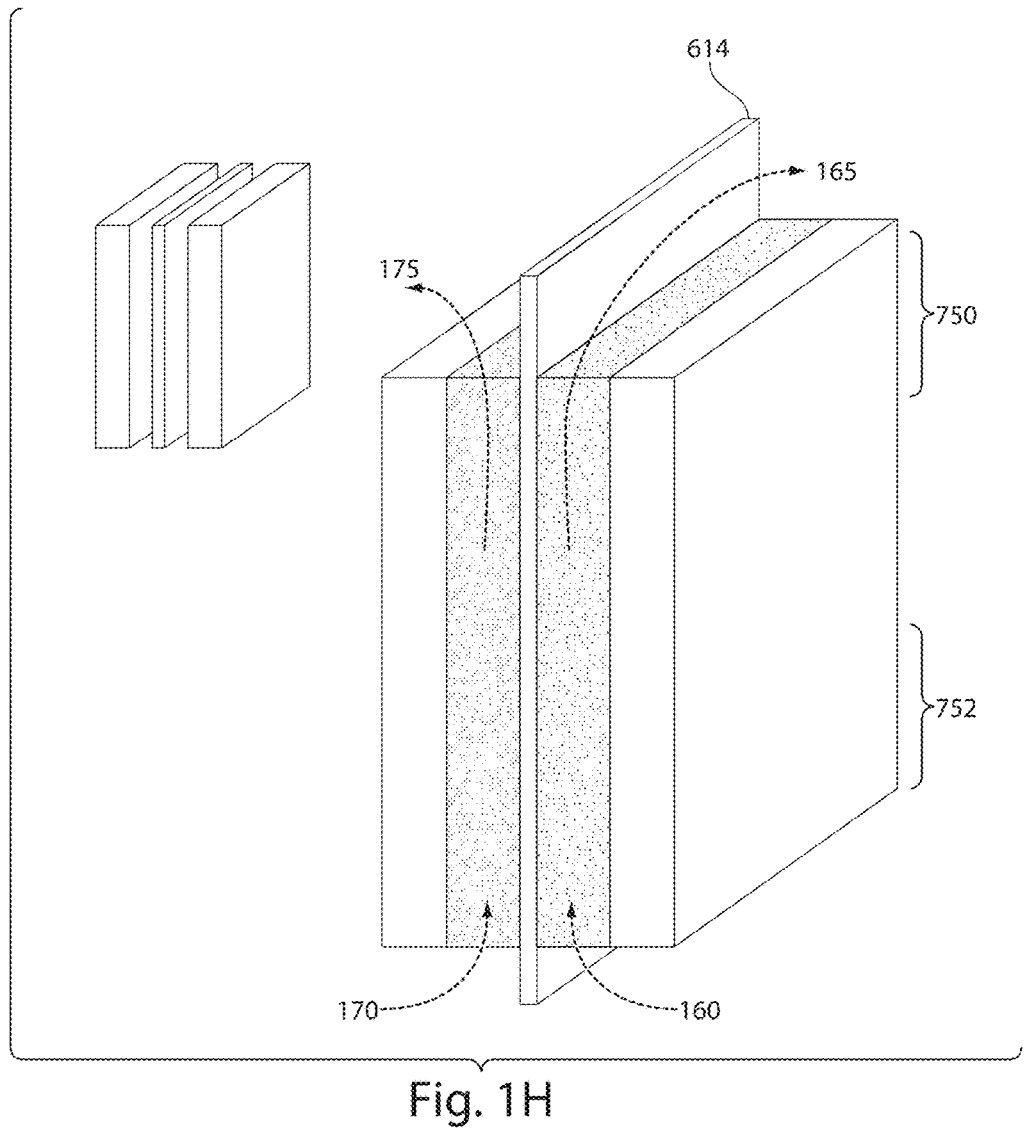
FIG. 1H includes an exemplary schematic illustration of an energy storage device.

A flowable redox composition can be mixed within the redox flow energy storage device via a variety of mechanisms. Mixing the flowable redox composition can allow for the concentration of a redox species to be increased, for example, near a current collector and/or a ion-permeable medium within the redox flow energy storage device, thereby enhancing the performance of the device. In one set of embodiments, heat (e.g., heat generated by an electrochemical reaction within the flow cell, heat generated by an external apparatus such as a resistive heater, etc.) can be present within or can be applied to a portion of the redox flow energy storage device to selectively heat one portion of the device relative to another. This can increase the temperature of at least a portion of the anodic and/or cathodic fluids. For example, in the set of embodiments illustrated in FIG. 1H, region 750 of the energy storage device is hotter than region 752, producing. Natural convection can be induced via decreased density within the active regions of the flow cell, assisting in the pumping of the positive and/or negative flowable redox composition through the flow cell with reduced energy consumption. In the set of embodiments illustrated in FIG. 1H, each of the positive and negative flowable redox compositions abuts an electrically insulating, ion-permeable medium 614 (e.g., a membrane). The inset of FIG. 1H (located in the upper-left-hand corner) includes a schematic illustration of the device without the positive and negative flowable redox compositions positioned within the electroactive zones.

In some embodiments, a mixing fluid can be used to increase the amount of mixing within a flowable redox composition within the redox flow energy storage device. In some embodiments, the redox flow energy storage device includes a source of mixing fluid in fluid communication with and/or located within a volume in which the flowable redox composition is disposed (e.g., an electroactive region). In most cases, the mixing fluid is immiscible with the flowable redox composition. As used herein, two fluids are "immiscible," or not miscible, with each other when one is not soluble in the other to a level of at least 10% by weight at the temperature and under the conditions at which the redox flow energy storage device is operated.

The mixing fluid can be of any suitable type, including liquids and gases. In some embodiments, the mixing fluid is not substantially chemically reactive with the flowable redox composition. As used herein, a component is "not substantially chemically reactive" with another component if, when the two components are contacted with each other, a chemical reaction does not proceed over the time scale of use of the device of the invention.

Figure 1J:
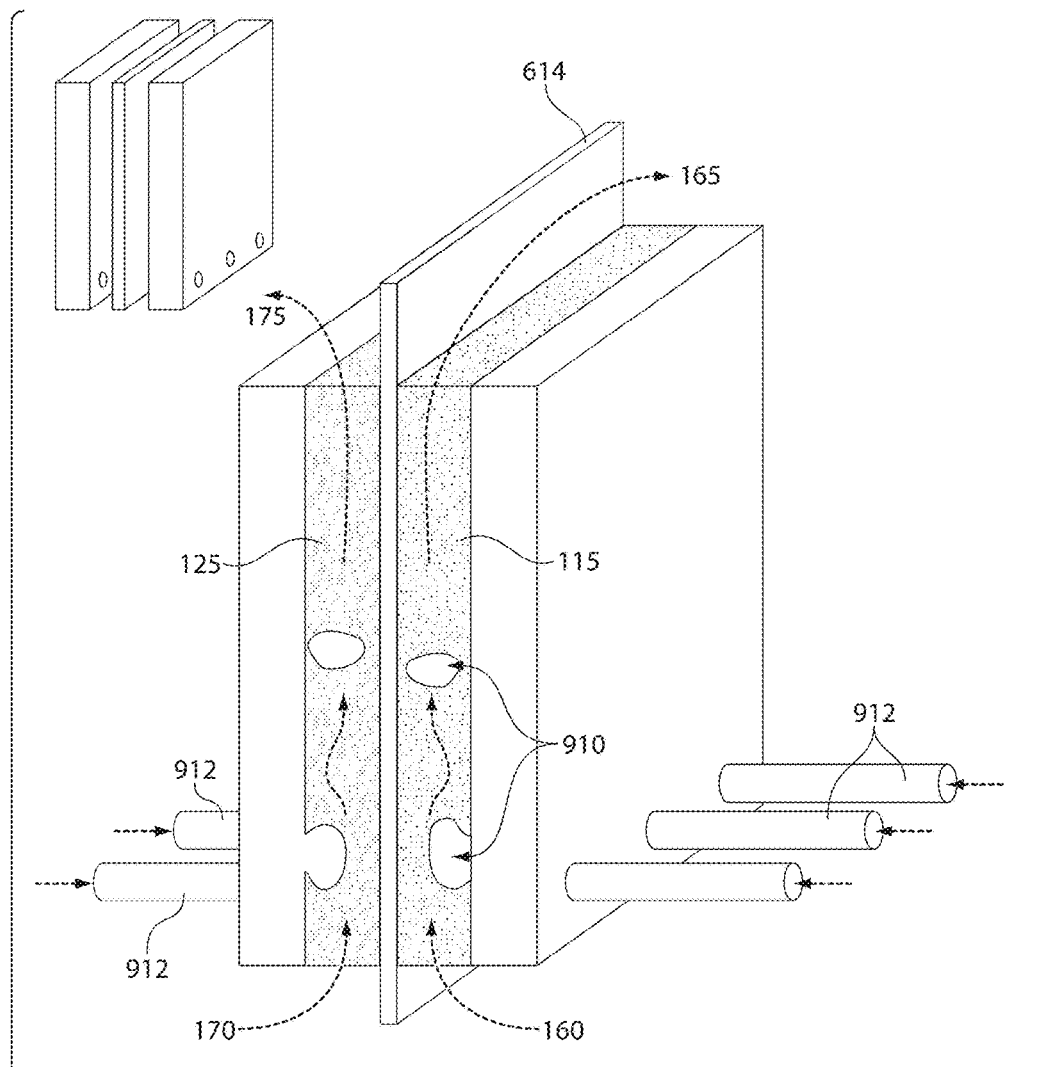
FIG. 1J includes a schematic illustration of an energy storage device into which a mixing fluid is transported, according to one set of embodiments.

In some embodiments, the source of the mixing fluid can comprise a volume external to the redox flow energy storage device. For example, in some cases, the redox flow energy storage device comprises a mixing fluid such as a gas (e.g., an inert gas) that originates from a source independent of the redox flow energy storage device, and is transported (e.g., injected via a conduit) into a positive and/or negative flowable redox composition. One such set of embodiments is illustrated in FIG. 1J. In this set of embodiments, fluid bubbles 910 are injected into the electroactive regions of the redox flow energy storage device via channels 912, which are in fluid communication with electroactive regions 115 and 125 of the redox flow energy storage device. In addition to promoting mixing, the injected fluid can assist in the pumping of the fluids through the flow cell. The bubbles can rise due to buoyant forces, and induce fluid flow in each fluid. In the set of embodiments illustrated in FIG. 1J, each flowing fluid abuts an electrically insulating, ion-permeable medium (e.g., a membrane). The inset of FIG. 1J (located in the upper-left-hand corner) includes a schematic illustration of the device without the positive and negative flowable redox compositions positioned within the electroactive zones.

Figure 1K:
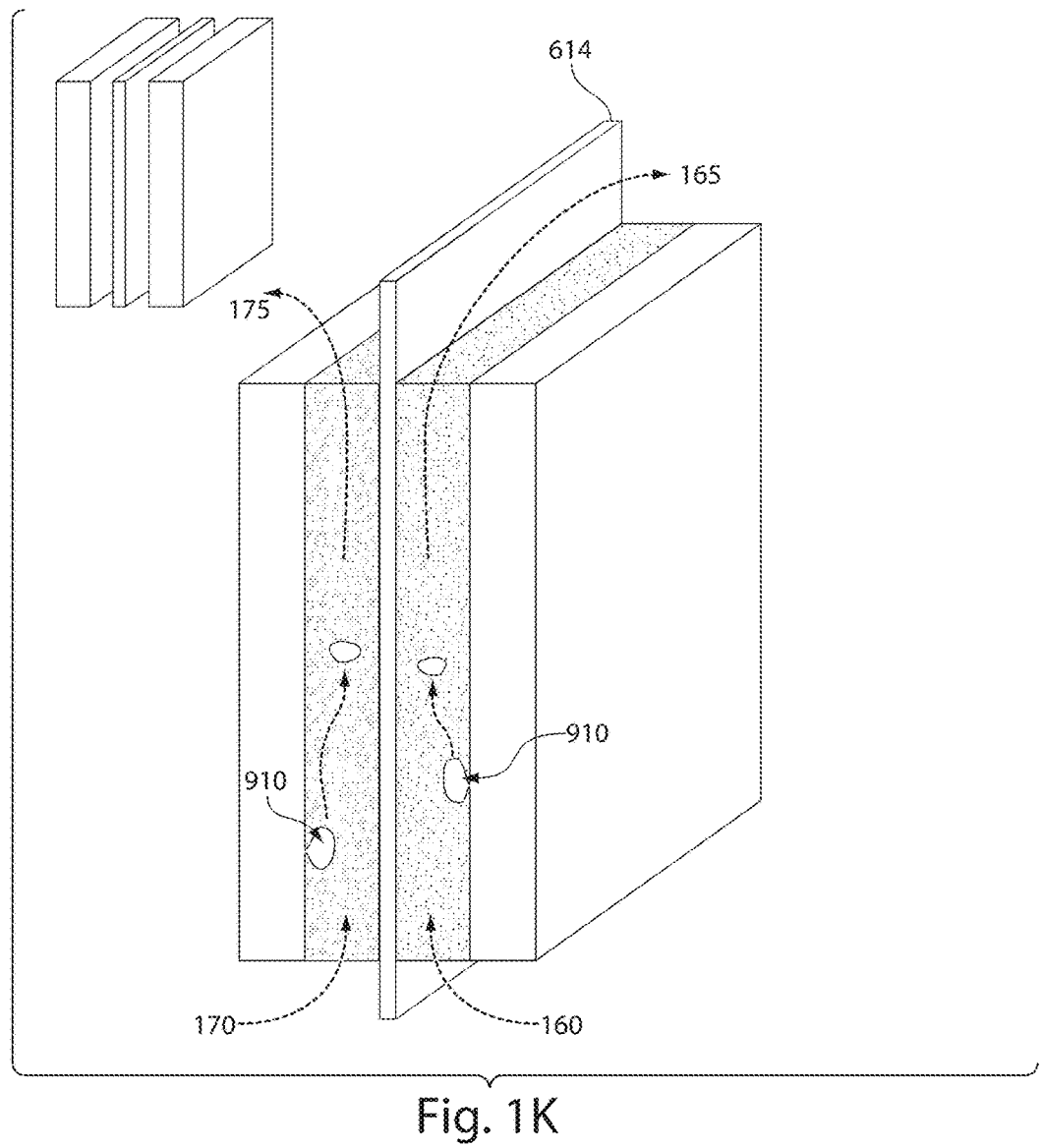
FIG. 1K includes an exemplary schematic illustration of an energy storage device in which a mixing fluid such as a gas is generated.

In some embodiments, the source of the mixing fluid can be a reactant within the redox flow energy storage device. For example, the mixing fluid (e.g., gas bubbles) can be produced, in some embodiments, as a side product of a reaction in the redox flow energy storage device. FIG. 1K includes a schematic illustration of one such set of embodiments. In FIG. 1K, fluid bubbles 910 are produced as a side product of an electrochemical reaction. The gas can rise due to buoyant forces, thereby assisting in the pumping of the catholyte and anolyte, and reducing the amount of energy needed to transport fluids within the cell. The mixing fluid bubbles can be created in the cathodic fluid, the anodic fluid, or in each of the positive and negative flowable redox composition (as illustrated in FIG. 1K). In one set of embodiments, one or both of the geometry and/or surface chemistry of the flow-cell vessels can be designed to control the location and rate of bubble nucleation, for example by providing indentations or cavities where the energy barrier to heterogeneous nucleation of a bubble is lowered. In the set of embodiments illustrated in FIG. 1K, each flowing electrode fluid abuts an electrically insulating, ion-permeable medium (e.g., a membrane). The inset of FIG. 1K (located in the upper-left-hand corner) includes a schematic illustration of the device without the positive and negative flowable redox compositions positioned within the electroactive zones.

The redox flow energy device can include, in some embodiments, a movable surface in contact with the flowable redox composition within the redox flow energy device. Generally, a surface is a "movable surface" if it is capable of being moved relative to other surfaces within the redox flow device. For example, in some embodiments, the movable surface can be movable relative to at least one current collector within the redox flow device (e.g., the movable surface can be part of a first current collector that is movable relative to a second current collector in the device). In some cases, the movable surface can be movable relative to an ion-permeable medium (e.g., a membrane) within the redox flow energy storage device. In some embodiments, at least a portion of the movable surface can be disposed within and/or be in contact with an electroactive zone within the redox flow energy storage device. For example, in the set of embodiments illustrated in FIG. 1C, at least a portion of internal surface 591 of negative electrode current collector 520 and/or at least a portion of internal surface 592 of positive electrode current collector 510 can be movable.

The movable surface can be constructed and arranged to at least partially direct the flow of the flowable redox composition through the redox flow energy device. This can be achieved, for example, by including one or more protrusions on the movable surface, and moving the surface such that the flowable redox composition is transported through the redox flow energy device.

As one particular example, in some embodiments, the flow cell can comprise one or both of an internal auger and an external auger, which may be used, for example, to transport an anodic and/or a cathodic fluid. Such an arrangement was briefly described in relation to the set of embodiments illustrated in FIGS. 1B-1C. FIGS. 1F-1G include schematic illustrations of a set of embodiments in which internal auger 610 and an external auger 612 comprising threaded, movable surfaces are employed. One or both of the internal and external augers can be rotated relative to a fixed ion-permeable medium 614 between the augers and/or each other, for example in the direction of arrow 615. In this way, the augers can transport fluid through the flow cell. For example, in one set of embodiments, a positive flowable redox composition can be transported into the flow cell via arrows 616 and out of the flow cell via arrows 617. In addition, the negative flowable redox composition can be transported into the flow cell via arrows 618 and out of the flow cell via arrows 619. Embodiments in which augers are employed may be advantageous in transporting or inducing mixing within fluids with relatively high viscosities. In the set of embodiments, illustrated in FIGS. 1F-1G, the anodic and cathodic fluids can be transported through concentric cylindrical shells, each of which can abut an electrically insulating, ion-permeable medium 614 (e.g., a membrane). In some embodiments, the augers can be electronically conductive, which can allow for the augers to act as current collectors and/or electronically communicate with separate current collectors in the flow cell.

Figure 1L:
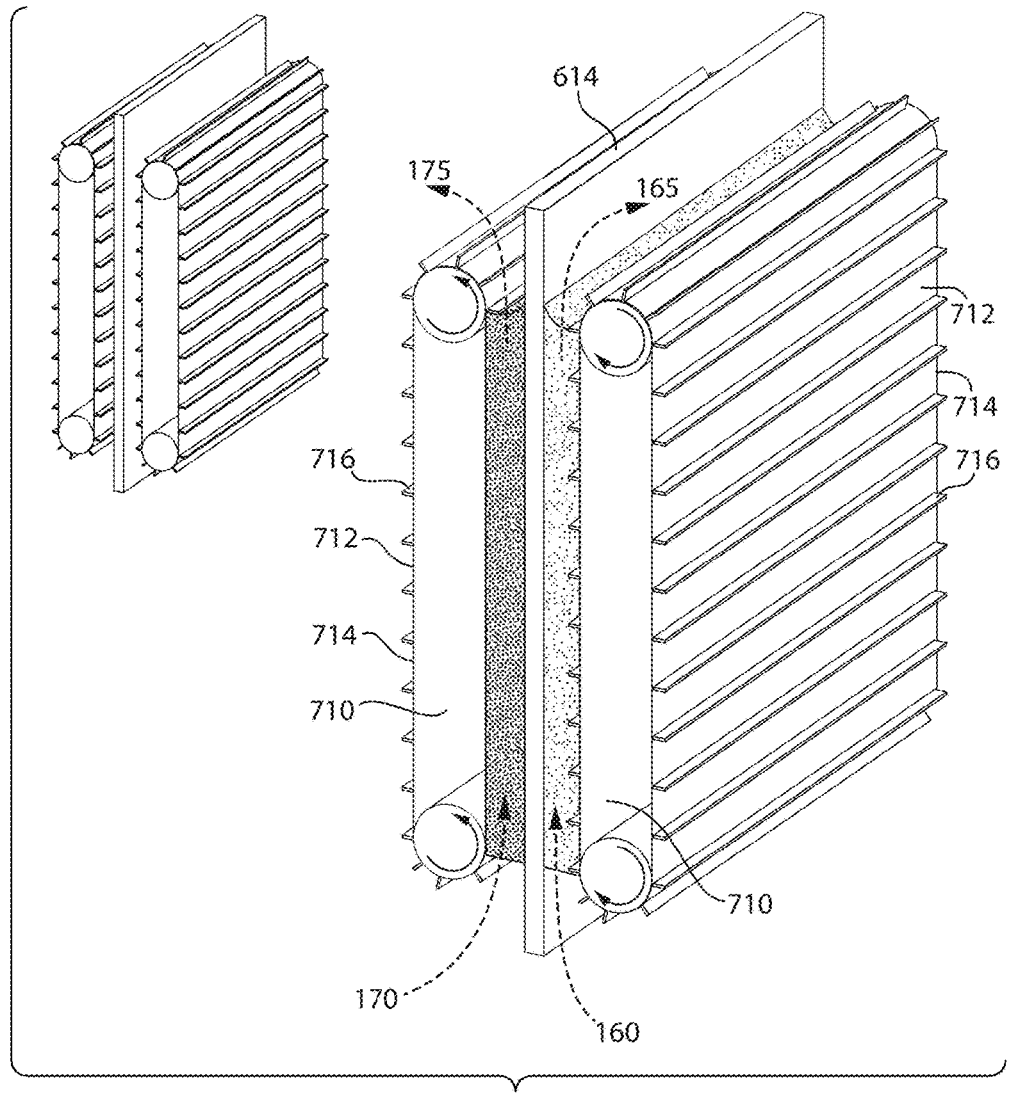
FIG. 1L includes a schematic illustration of an energy storage device comprising a plurality of track drives, according to one set of embodiments.

The moving surface can be of a variety of other forms. For example, in some instances, the flow cell can comprise a moving surface that is part of a track drive that can be used to transport a fluid within an electroactive region. The track drive can comprise a belt arranged around one or more rotatable axles, and can be at least partially disposed within an electroactive zone within the redox flow cell. The track can be constructed and arranged such that at least a portion of the surface exposed to the redox flow material (which can be disposed within an electroactive zone within the redox flow cell) comprises protrusions that direct the flow of fluid. For example, FIG. 1L includes a schematic illustration of a flow cell comprising two track drives 710. The track drives in FIG. 1L can transport an anodic and a cathodic fluid independently. The belts 712 on the track drives (which include moving surfaces 714) include protrusions 716 that enhance the movement and mixing of fluid adjacent the drives. While the track drives illustrated in FIG. 1L include linear protrusions, any suitable protrusion geometry can be employed. The fluids can be transported through a thin region with an approximately rectangular cross section, in some embodiments. As with the auger embodiments described above, the use of one or more track drives can be advantageous for transporting and/or mixing of fluids with relatively high viscosities. In the set of embodiments illustrated in FIG. 1L, each flowing fluid abuts an electrically insulating, ion-permeable medium 614 (e.g., a membrane). In some embodiments, one or both of the track drives can be electronically conductive, which can allow for the track drive(s) to act as a current collector and/or allow for the track drive(s) to electronically communicate with separate current collectors in the flow cell. The inset of FIG. 1L (located in the upper-left-hand corner) includes a schematic illustration of the device without the positive and negative flowable redox compositions positioned within the electroactive zones.

Figure 1M:
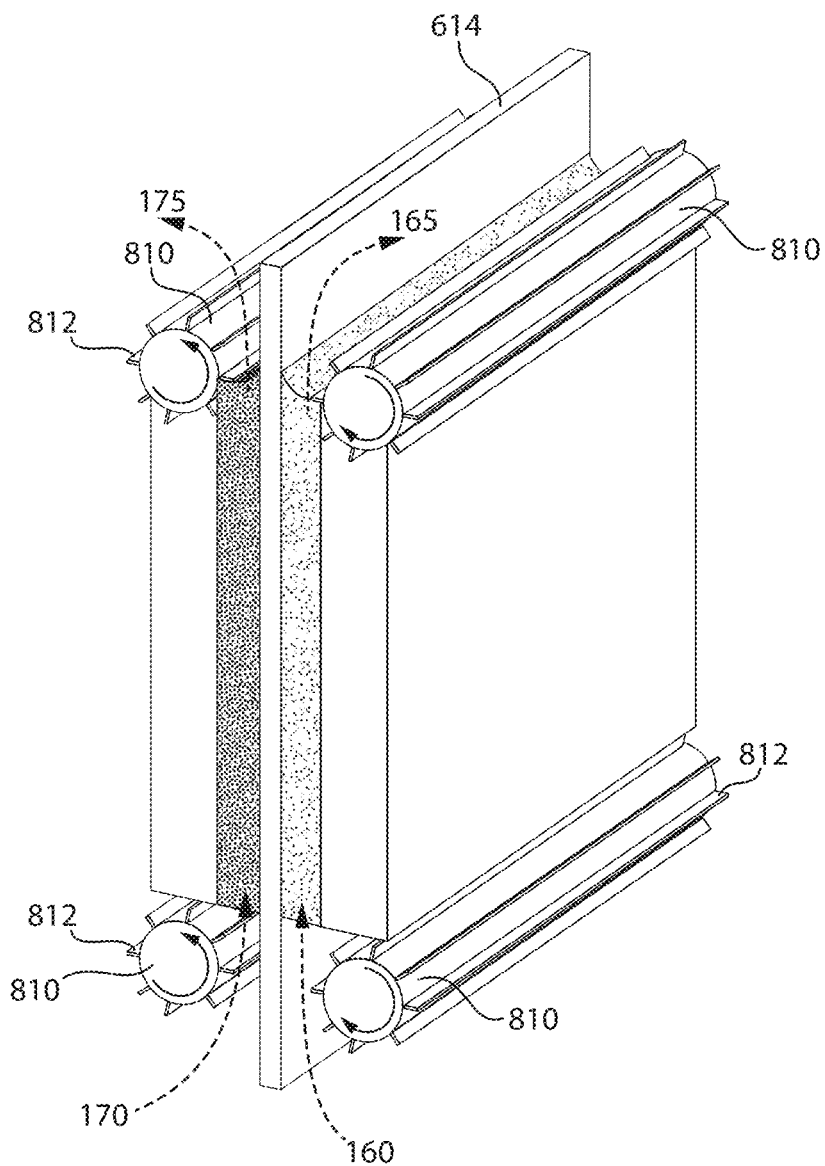
FIG. 1M includes an exemplary schematic illustration of an energy storage device comprising a plurality of rotatable axels.

The flow cell can comprise, in some cases, a moving surface associated with a rotatable shaft that propels and/or impels an anodic and/or a cathodic fluid through the flow cell. For example, FIG. 1M includes a schematic illustration of a flow cell that comprises multiple rotatable shafts 810. The external surfaces of the rotatable shafts can be moved by rotating the propellers about their longitudinal axes. The movable surfaces of the rotatable shafts include a plurality of protrusions 812 that help transport the fluid through the redox flow energy storage device. In this set of embodiments, each of rotatable shafts 810 impels an anodic and a cathodic fluid independently through the active region of the flow cell where electrochemical charging and discharging takes place. The fluids can flow through a thin region with an approximately rectangular cross section. In the set of embodiments illustrated in FIG. 1M, each flowing fluid abuts an electrically insulating, ion-permeable medium 614 (e.g., a membrane).

Example 1

Semi-Solid Lithium Redox Flow Battery

Figure 2:
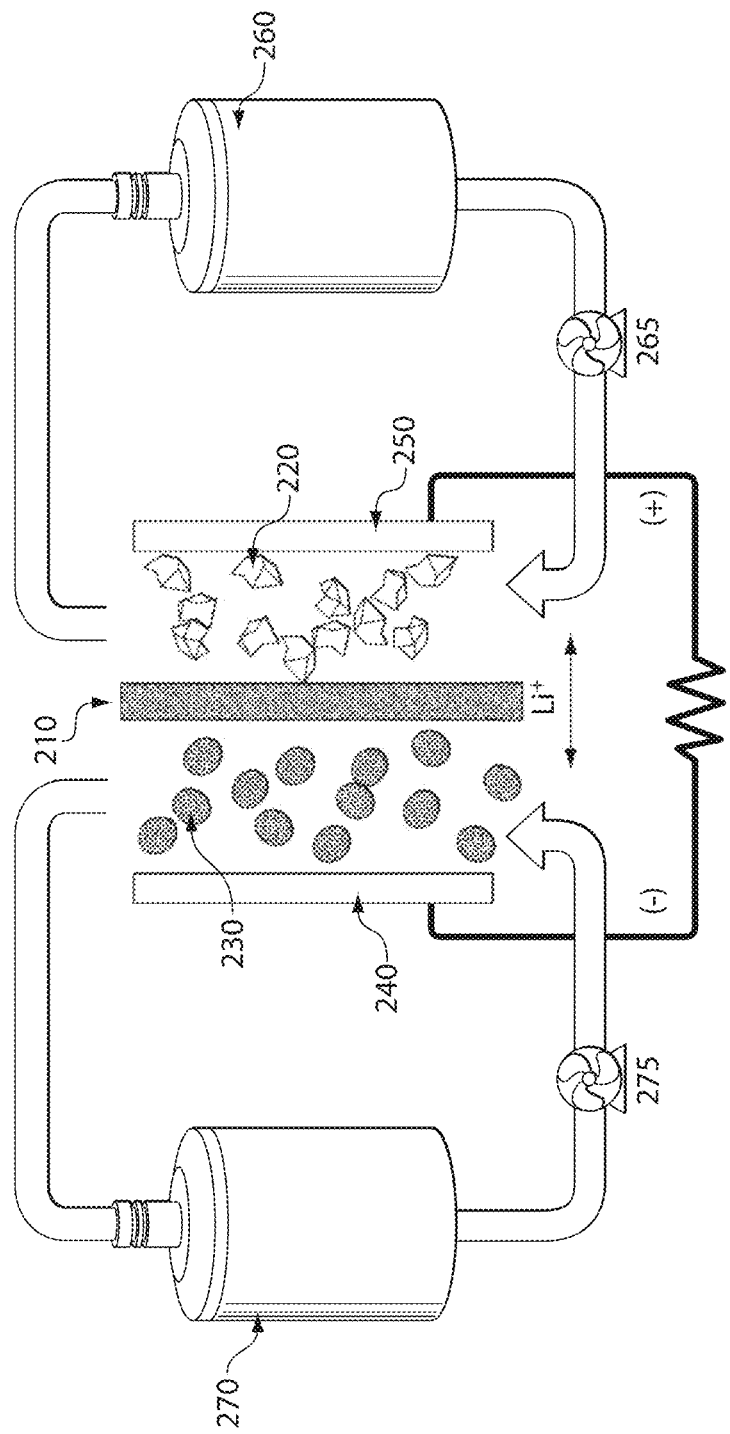
FIG. 2 is a schematic illustration of an exemplary redox flow cell for a lithium battery system.

An exemplary redox flow cell 200 for a lithium system is shown in FIG. 2. In this example, the membrane 210 is a microporous membrane such as a polymer separator film (e.g., Celgard™ 2400) that prevents cathode particles 220 and anode particles 230 from crossing the membrane, or is a solid nonporous film of a lithium ion conductor. The negative and positive electrode current collectors 240, 250 are made of copper and aluminum, respectively. The negative electrode composition includes a graphite or hard carbon suspension. The positive electrode composition includes $LiCoO_2$ or $LiFePO_4$ as the redox active component. Carbon particulates are optionally added to the cathode or anode suspensions to improve the electronic conductivity of the suspensions. The solvent in which the positive and negative active material particles are suspended is an alkyl carbonate mixture and includes a dissolved lithium salt such as $LiPF_6$. The positive electrode composition is stored in positive electrode storage tank 260, and is pumped into the electroactive zone using pump 265. The negative electrode composition is stored in negative electrode storage tank 270, and is pumped into the electroactive zone using pump 275. For the carbon and the $LiCoO_2$, the electrochemical reactions that occur in the cell are as follows:

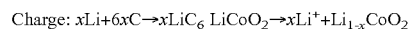

Charge: $xLi+6xC \rightarrow xLiC_6$ $LiCoO_2 \rightarrow xLi^+ + Li_{1-x}CoO_2$

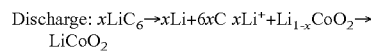

Discharge: $xLiC_6 \rightarrow xLi+6xC$ $xLi^+ + Li_{1-x}CoO_2 \rightarrow LiCoO_2$

Example 2

Semi-Solid Nickel Metal Hydride Redox Flow Battery

Figure 3:
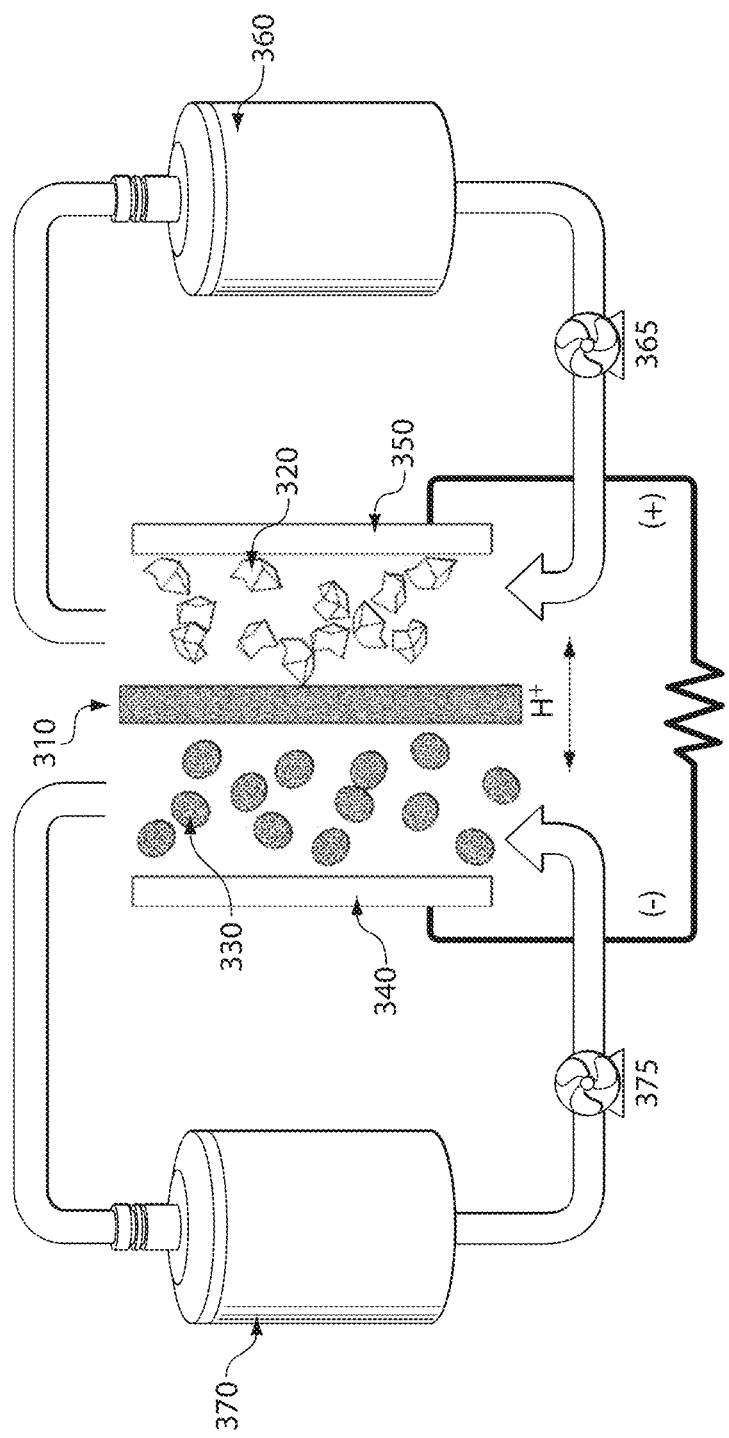
FIG. 3 is a schematic illustration of an exemplary redox flow cell for a nickel battery system.

An exemplary redox flow cell for a nickel system is shown in FIG. 3. In this example, the membrane 310 is a microporous electrolyte-permeable membrane that prevents cathode particles 320 and anode particles 330 from crossing the membrane, or is a solid nonporous film of a proton ion conductor, such as Nafion. The negative and positive electrode current collectors 340, 350 are both made of carbon. The negative electrode composition includes a suspension of a hydrogen absorbing metal, M. The positive electrode composition includes NiOOH as the redox active component. Carbon particulates are optionally added to the cathode or anode suspensions to improve the electronic conductivity of the suspensions. The solvent in which the positive and negative active material particles are suspended is an aqueous solution containing a hydroxyl generating salt such as KOH. The positive electrode composition is stored in positive electrode storage tank 360, and is pumped into the electroactive zone using pump 365. The negative electrode composition is stored in negative electrode storage tank 370, and is pumped into the electroactive zone using pump 375. The electrochemical reactions that occur in the cell upon discharge are as follows (the reactions upon charging being the reverse of these):

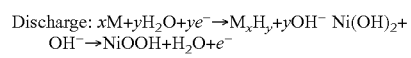

Discharge: $xM + yH_2O + ye^- \rightarrow M_xH_y + yOH^-$ $Ni(OH)_2 + OH^- \rightarrow NiOOH + H_2O + e^-$

Example 3

Reference Electrode Monitored Redox Flow Battery

Figure 4:
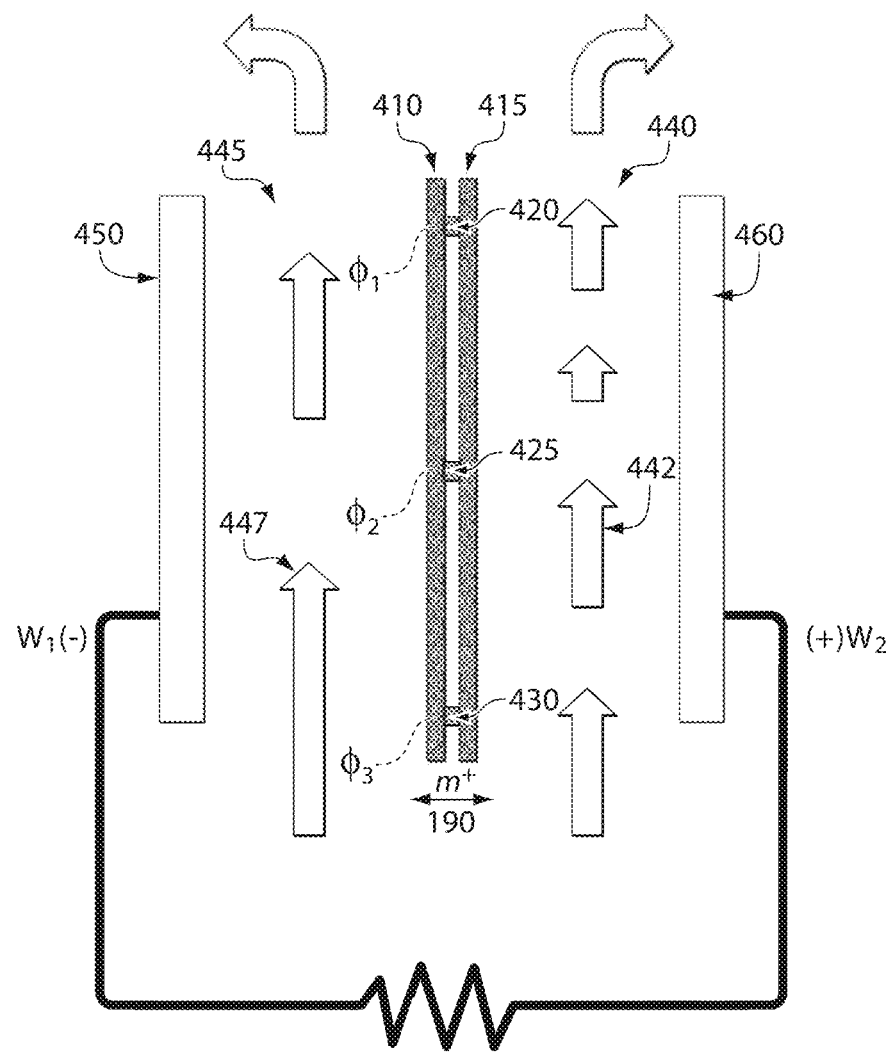
FIG. 4 is a schematic illustration of an exemplary redox flow battery using reference electrodes to monitor and optimize cell performance.

An exemplary redox flow battery using a reference electrode to optimize cell performance is shown in FIG. 4. The cell includes two membranes 410, 415. Reference electrodes 420, 425, 430 are positioned between the two membranes 410, 415 on a face opposite that of the electroactive zones 440, 445 where positive electrode redox flow composition 442 and negative electrode redox flow composition 447 flow, respectively. The cell also includes negative and positive current collectors 450, 460, respectively.

The potential at each reference electrode 420, 425 and 430 can be determined and are assigned a value of $\phi_1$, $\phi_2$ and $\phi_3$, respectively. The potentials at the working electrodes (current collectors) 450, 460 can also be determined and are assigned a value of $W_1$ and $W_2$, respectively. The potential differences of the cell components can be measured as follows:

$(W_1-W_2)$=cell voltage $(W_2-\phi_3)$=potential at cathode $(W_1-\phi_3)$=potential at anode $(\phi_3-\phi_2)$ or $(\phi_2-\phi_1)$=extent of reaction as redox compositions flow along stack.

In this example, three reference electrodes are used within the power generating stack (electroactive zone) in order to determine whether the flow rates of the positive and negative electrode redox flow compositions are at a suitable rate to obtain a desired power. For example, if the flow rate is too slow during discharge, the positive and negative electrode redox flow compositions fully discharge as the enter the stack and over most of their residence time in the stack there is not a high chemical potential difference for lithium. A higher flow rate allows greater power to be obtained. However, if the flow rate is too high, the active materials may not be able to fully charge or discharge during their residence time in the stack. In this instance the flow rate of the slurries may be slowed to obtain greater discharge energy, or one or more slurries may be recirculated to obtain more complete discharge. In the instance of charging, too high a flow rate prevents the materials from fully charging during a single pass, and the stored energy is less than the system is capable of, in which case the slurry flow rate may be decreased, or recirculation used, to obtain more complete charging of the active materials available.

Example 4

Preparing Partially Delithiated, Jet-Milled Lithium Cobalt Oxide

Lithium cobalt oxide powder was jet-milled at 15,000 RPM to produce particles with an average diameter of 2.5 microns. A 20 g sample of jet-milled lithium cobalt oxide was chemically delithiated by reacting with 2.5 g of nitronium tetrafluoroborate in acetonitrile over 24 hours. The delithiated $Li_{1-x}CoO_2$, having also a higher electronic conductivity by virtue of being partially delithiated, is used as the active material in a cathode semi-solid suspension.

Example 5

Preparing a Copper Plated Graphite Powder

Figure 5:
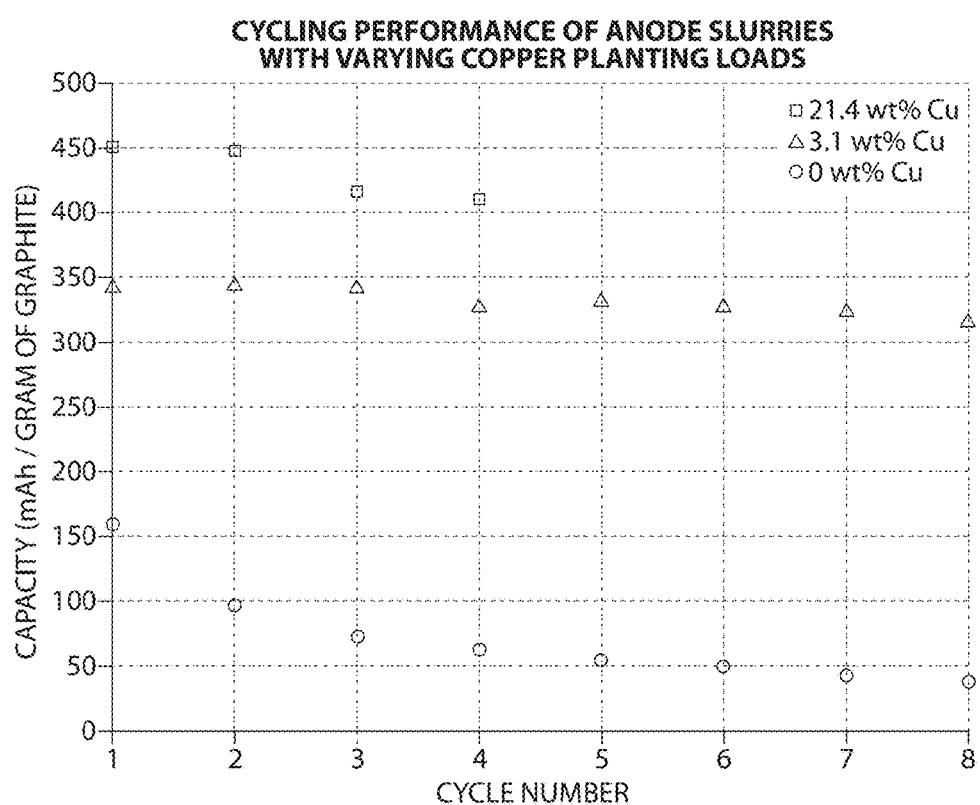
FIG. 5 illustrates cycling performance of anode slurries with varying copper plating load.

Commercial grade mesocarbon microbead (MCMB 6-28) graphitic anode powder was partially coated with, 3.1% by weight, metallic copper via an electroless plating reaction. MCMB (87.5 g) was stirred successively in the four aqueous solutions listed in Table 1. Between each step, the powder was collected by filtering and washed with reagent grade water. In the final solution, a concentrated solution of sodium hydroxide was added to maintain a pH of 12. Increasing the concentrations of the species in solution 4 would yield more copper rich powders. Powders with weight fractions 1.6%, 3.1%, 8.6%, 9.7%, 15%, and 21.4% copper were characterized by preparing slurries as described in Example 7, and testing the slurries as described in Example 8. The Cycling Performance Increased and Capacity Increased with Copper Plating Weight Percents as Illustrated in FIG. 5

TABLE 1

| Four aqueous solutions used to treat MCMB. | | |
| --- | --- | --- |
| Solution | Chemical | Concentration (M) |
| 1 (1 hr) | Nitric Acid | 4.0 |
| 2 (2 hr) | Stannous Chloride | 0.10 |
| | Hydrochloric Acid | 0.10 |
| 3 (2 hr) | Palladium Chloride | 0.0058 |
| | Hydrochloric Acid | 0.10 |
| 4 (0.5 hr) | Copper Sulfate | 0.020 |
| | EDTA | 0.050 |
| | Formaldehyde | 0.10 |
| | Sodium Sulfate | 0.075 |
| | Sodium Formate | 0.15 |
| | Polyethylene Glycol | 0.03 |
| | Sodium Hydroxide | Maintain at pH 12 |

Example 6

Preparing a Cathode Slurry

A suspension containing 25% volume fraction of delithiated, jet-milled lithium cobalt oxide, 0.8% volume fraction of Ketjen Black, and 74.2% volume fraction of a standard lithium ion battery electrolyte was synthesized. A stable cathode suspension was prepared by mixing 8.9 g of delithiated, jet-milled lithium cobalt oxide with 0.116 g of Ketjen Black carbon filler. The mixed powder was suspended in 5 mL of electrolyte and the suspension was sonicated for 20 minutes. Such a suspension was stable (i.e., there was no observable particle settling) for at least 5 days. The conductivity of such a suspension was measured to be 0.022 S/cm in an AC impedance spectroscopy measurement. Such slurries were tested in static and flowing cells as described in later Examples. Experimentation with the relative proportions of the constituents of the slurries showed that higher volume fractions of lithium cobalt oxide, which increase the storage capacity of the suspension, can be made. Increasing the volume fraction of solids in the suspension also increased the viscosity of the semi-solid suspensions. Higher volume fractions of Ketjen carbon particles increased suspension stability and electronic conductivity, but also the slurry viscosity. Straightforward experimentation was used to determine volume fractions of lithium cobalt oxide and Ketjen carbon that produce slurries of suitable viscosity for device operation.

Example 7

Preparing an Anode Slurry

A suspension containing 40% volume fraction of graphite in 60% volume fraction of a standard lithium ion battery electrolyte was synthesized by mixing 2.88 g of copper plated graphite (3.1 wt % copper) with 2.0 mL of electrolyte. The mixture was sonicated for 20 minutes. The conductivity of the slurry was 0.025 S/cm. Higher copper loadings on the graphite was observed to increase the slurries' viscosity.

Example 8

Static Half Cell Tests on Cathode and Anode Slurries

Figure 6:
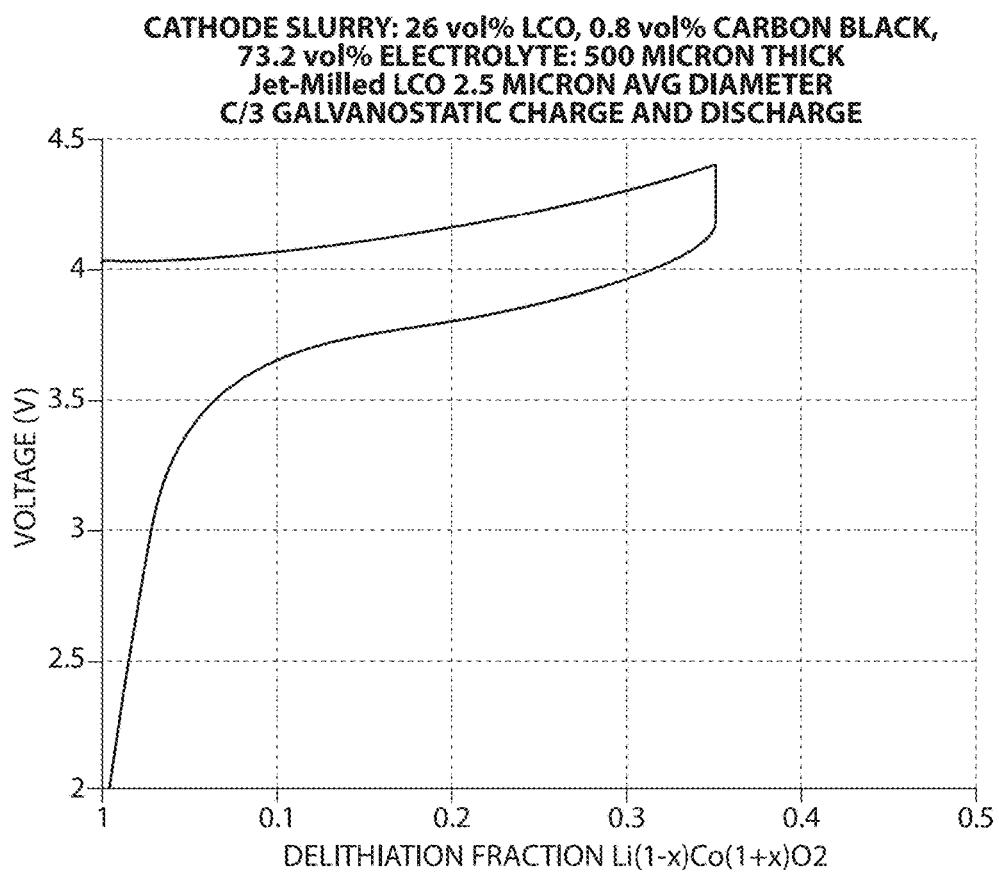
FIG. 6 illustrates a representative plot of voltage as a function of charging capacity for the cathode slurry half-cell.
Figure 7:
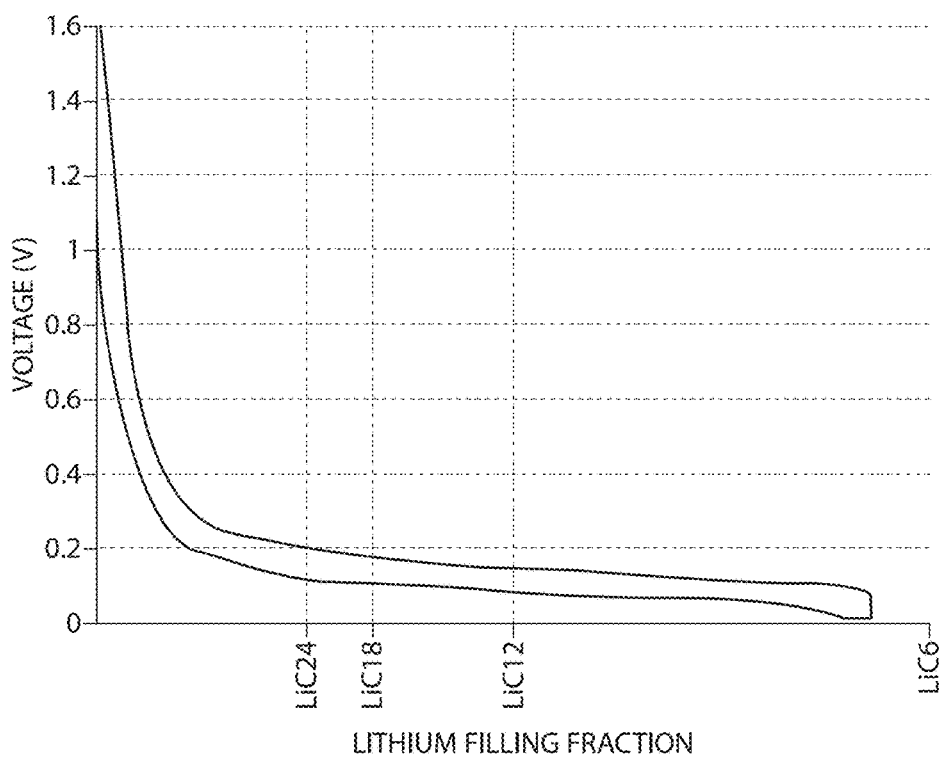
FIG. 7 illustrates a representative plot of voltage as a function of charging capacity for the anode slurry half-cell.
Figure 9:
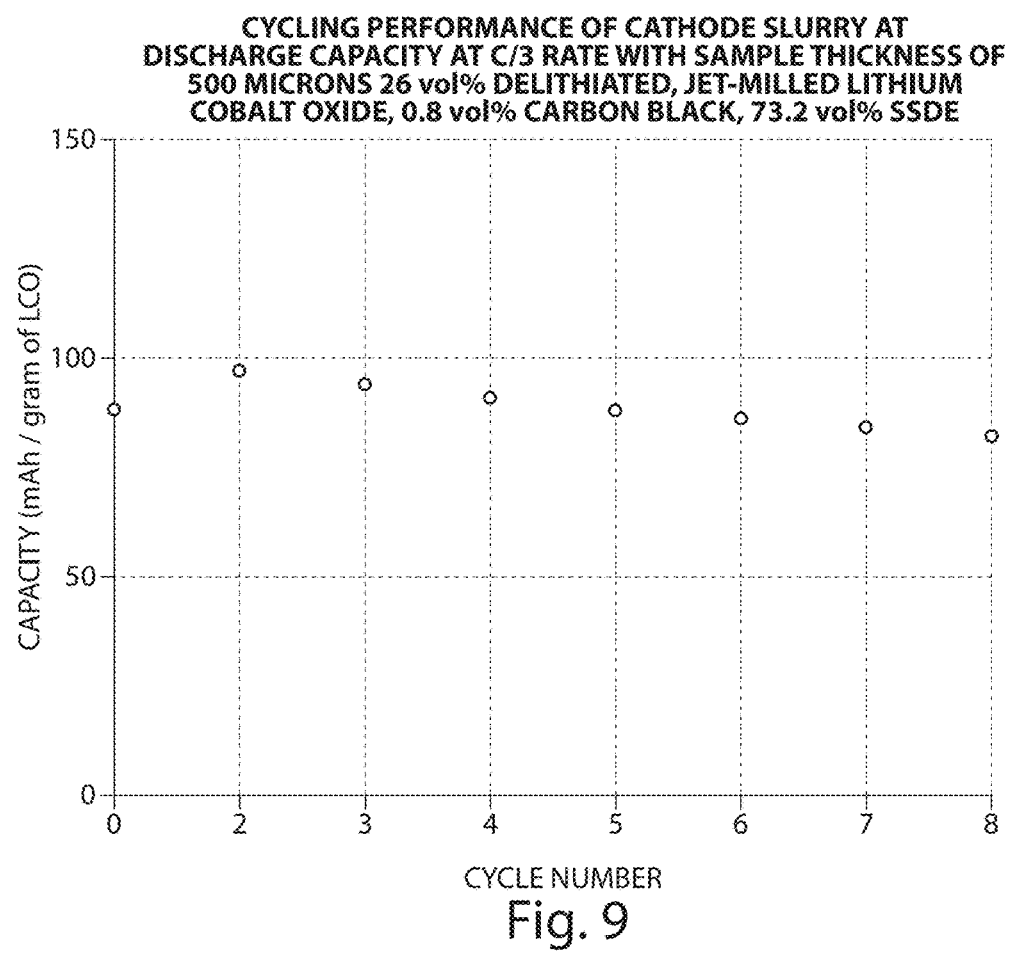
FIG. 9 illustrates a representative plot of the cathode discharge capacity vs. cycle number.

Semi-solid suspension samples, as described in Examples 6 and 7, were charged and discharged electrochemically against a lithium metal electrode in anelectrochemical cell where the suspension was static. The cathode or anode slurry was placed in a metallic well which also acted as the current collector. The well and current collectors were machined from aluminum and copper for the cathode and anode, respectively. The wells holding the slurries had cylindrical shape 6.3 mm in diameter and depths ranging from 250-800 µm. A Celgard 2500 separator film separated the slurry from a lithium metal counter electrode, and an excess of electrolyte was added to the gaps in the cell to ensure that the electrochemically tested materials remained wetted with electrolyte. Testing was conducted in an argon-filled glovebox. A representative plot of voltage as a function of charging capacity for the cathode slurry half-cell is shown in FIG. 6. A representative plot of the cathode discharge capacity vs. cycle number is shown in FIG. 9. A representative plot of voltage as a function of charging capacity for the anode slurry half-cell is shown in FIG. 7. Both anode and cathode behaved electrochemically in a manner similar to their solid (unsuspended) counterparts. Example capacity measurements are shown in Table 2.

TABLE 2

Example capacity measurements.

| Slurry Material | Specific Capacity in mAh per gram of MCMB or LiCoO$_2$ | Specific Capacity in mAh per gram of Slurry | Volumetric Capacity in mAh per mL of Slurry |
|---|---|---|---|
| MCMB with 0 wt % deposited Cu, [1]40 vol % anode powder in electrolyte | 96 | 51 | 85 |
| MCMB with 3.1 wt % Cu, [2]40 vol % anode powder in electrolyte | 344 | 179 | 300 |
| MCMB with 15 wt % Cu [1]40 vol % anode powder in electrolyte | 252 | 123 | 219 |
| MCMB with 21.4 wt % Cu, [3]40 vol % anode powder in electrolyte | 420 | 190 | 354 |
| 26 vol % LiCoO$_2$, 0.8 vol % Ketjen Carbon Black in electrolyte[4] | 97 | 56 | 127 |

[1]Capacity calculated from the 2$^{nd}$ cycle discharge in a C/20 galvanostatic cycling experiment between 0.01 V and 0.6 V versus Li metal;
[2]Capacity calculated from the 2$^{nd}$ cycle discharge in a C/20 CCCV charge, C/20 galvanostatic discharge cycling experiment between 0.01 V and 1.6 V versus Li metal;
[3]Capacity calculated from the 2$^{nd}$ cycle discharge in a C/20 galvanostatic cycling experiment between 0.01 V and 1.6 V versus Li metal;
[4]Capacity calculated from 2$^{nd}$ discharge in a C/3 galvanostatic cycling experiment between 4.4 V and 2 V.

Example 9

Figure 8:
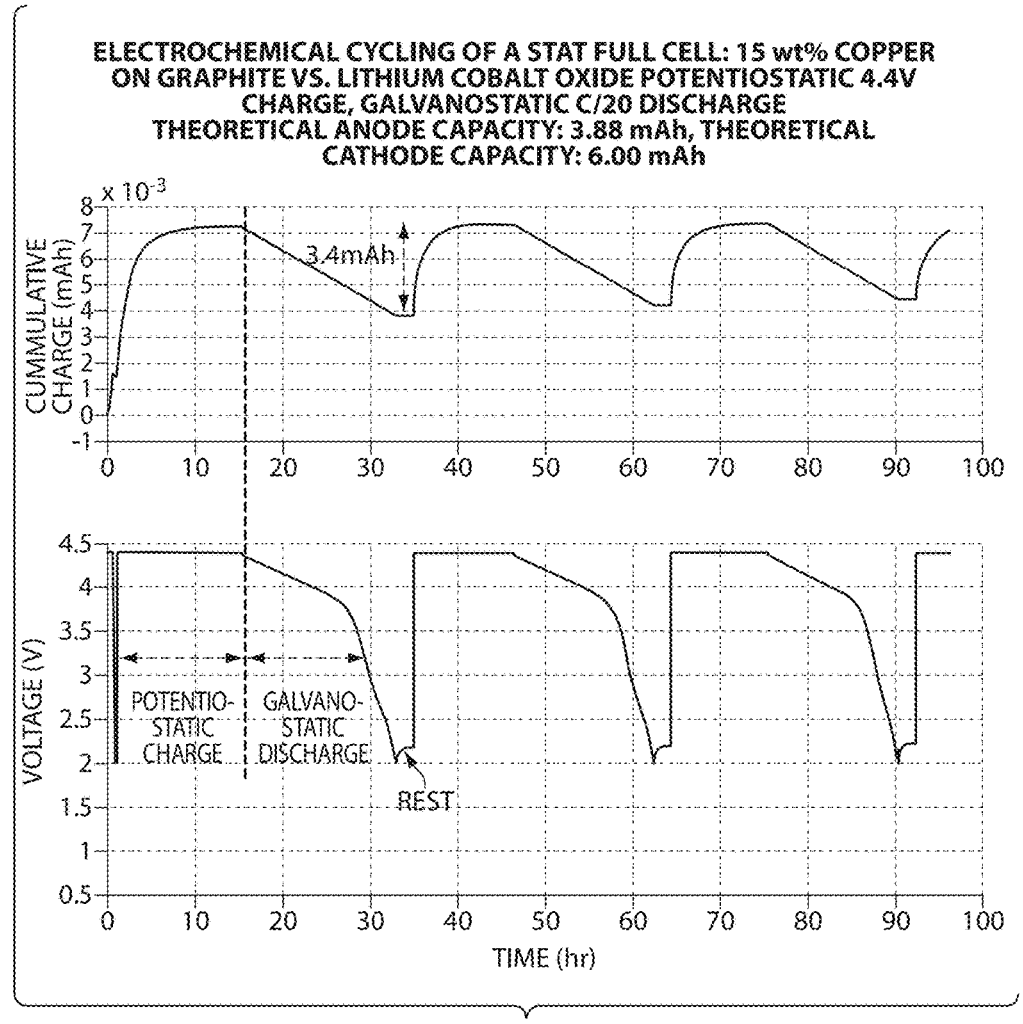
FIG. 8 illustrates a representative plot of voltage as a function of time (lower panel) and the corresponding charge or discharge capacity (upper panel) for a electrochemical cell with cathode and anode slurries.

Static Cell Tests of Full Lithium Ion Cell using Cathode and Anode Semi-Solid Suspensions Cathode and anode slurries, as described in Examples 6 and 7, were charged and discharged electrochemically against each other in a static, electrochemical cell. The cathode and anode slurries were each placed in metallic wells/current collectors of the dimensions described in Example 8. The wells/current collectors were made of aluminum and copper for the cathode and anode, respectively. A Celgard 2500 film separated the two slurries in the cell. The cathode and anode suspensions were charged and discharged relative to each other repeatedly under potentiostatic and galvanostatic conditions, with galvanostatic testing being done at C-rates ranging from C/20 to C/10. A representative plot of voltage as a function of time is shown in the lower panel in FIG. 8. The corresponding charge or discharge capacity is shown in the upper panel in FIG. 8. In this test, the cell was charged under potentiostatic conditions, holding the cell voltage at 4.4V, while the charge capacity was monitored. The rate of charging is initially high, then diminishes. The cell was then galvanostatically discharged at a C/20 rate. The capacity obtained in the first discharge is ~3.4 mAh, which is 88% of the theoretical capacity of the anode in the cell. There is an excess of cathode in this cell which is therefore not fully utilized.

Example 10

Lithium Titanate Spinel Anode Suspension

Figure 10:
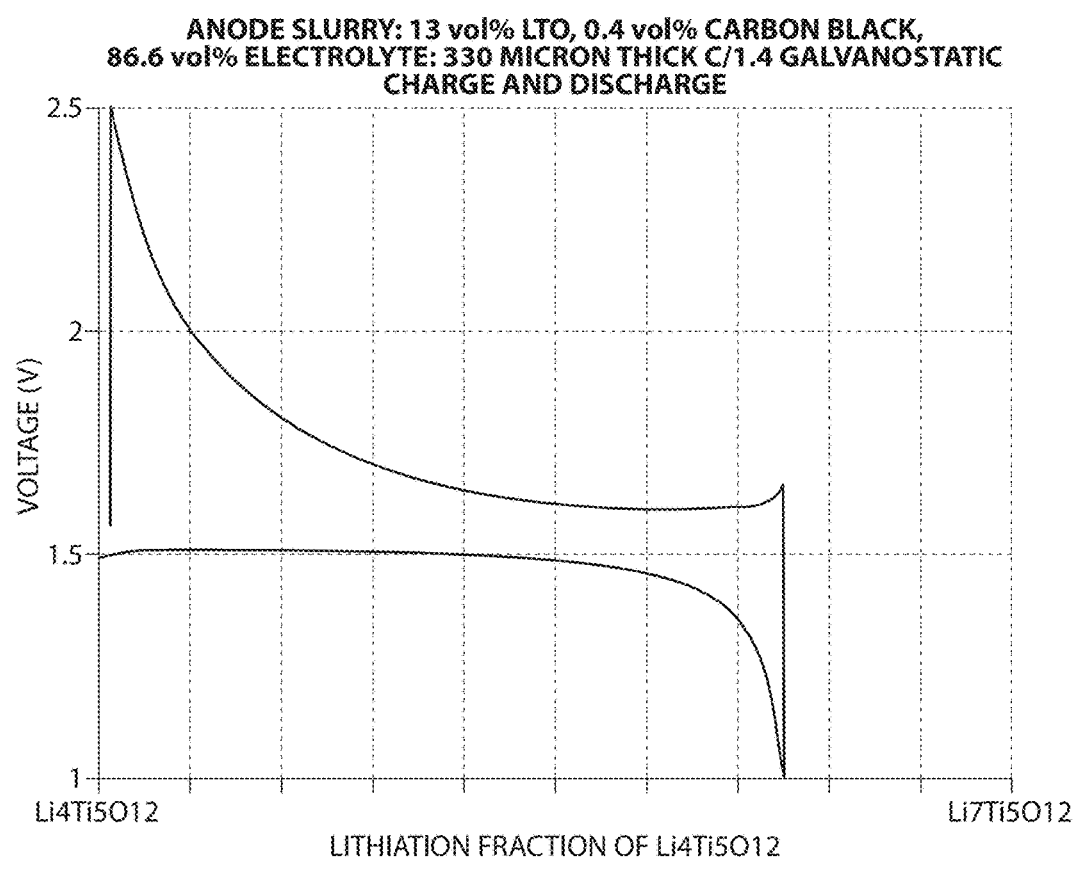
FIG. 10 illustrates the galvanostatic lithium insertion and extraction curves for the suspension at a relatively high C/1.4 rate.

Lithium titanate spinel, which may have a range of Li:Ti:O ratios and also may be doped with various metals or nonmetals, and of which a non-limiting composition is $Li_4Ti_5O_2$, intercalates lithium readily at a thermodynamic voltage near 1.5V with respect to Li/Li$^+$, and increases in its electronic conductivity as Li is inserted due to the reduction of Ti$^{4+}$ to Ti$^{3+}$. A 5 g sample of lithium titanate spinel powder is mixed with 100 mg of Ketjen Black and suspended in 10 mL of a standard lithium ion battery electrolyte, and the suspension is sonicated for 20 minutes. Such a suspension does not separate into components for at least 48 hours. This suspension was charged and discharged in a lithium half-cell as described in Example 8. FIG. 10 shows the galvanostatic lithium insertion and extraction curves for the suspension at a relatively high C/1.4 rate. During the lithium insertion step, the average voltage is very near the thermodynamic voltage of 1.55V, while upon extraction the average voltage is somewhat higher.

Example 11

Flowing Half Cell Tests on Cathode and Anode Slurries

Samples, as described in Examples 6 and 7, were charged and discharged electrochemically against a lithium metal electrode in a flowing, electrochemical cell. The cathode or anode slurry was pumped into a metallic channel of defined geometry, which acted as the current collector. The current collectors were aluminum and copper for the cathode and anode, respectively. Channels were 5 mm in diameter, 50 mm in length, and had a depth of 500 µm. A porous PVDF sheet (pore size: 250 µm), sandwiched between 2 Celgard 2500 separator films, added mechanical strength. In between the two separator films, separated from the slurries, was a lithium metal reference electrode attached to a copper wire and electrically isolated from both current collectors. An excess of liquid electrolyte was added to the gaps in the device to ensure that the electrochemically active components remained immersed in liquid electrolyte. Testing was conducted in an argon-filled glove box. The slurry in the channel was charged and discharged at rates ranging from C/20 to C/5. During charging, uncharged slurry was mechanically pumped into the test cell to replace that which had been fully charged in the channel. The charged slurry was pumped out of the cell and stored until the end of the charge. For discharging, the cell was run in reverse, both electrochemically and mechanically. New volume of slurry was pumped into the test cell as the volume in the cell was fully discharged. The volume of discharged suspension was pumped out of the cell and stored until the end of the discharge.

Example 12

Flowing Full Cell Tests on Cathode and Anode Slurries

Cathode and anode slurries, as described in Examples 3 and 4, were charged and discharged electrochemically in concert in a flowing, electrochemical cell. The cathode or anode slurry was pumped into a metallic channel, the channel material also acting as the current collector. The current collectors were aluminum and copper for the cathode and anode, respectively. Channels were 5 mm in diameter, 50 mm in length, and had a depth of 500 µm. A 250 µm perforated PVDF sheet, sandwich between 2 Celgard 2500 films, added mechanical strength and separated one slurry channel from the other. A piece of lithium foil attached to a copper wire was also sandwiched between the separator films and acted as a reference electrode. The slurries in the channel were charged and discharged at rates ranging from C/20 to C/5. Using peristaltic pumps, to which were attached elastomer tubing filled with cathode and anode slurries feeding the respective channels in the electrochemical cells, the slurries were pumped through the channels. During charging, uncharged slurry was mechanically pumped into the test cell to replace that which was fully charged. For discharging, the cell was run in reverse, both electrochemically and mechanically. The two slurries were flowed independent of one another and the state of charge of both anode and cathode slurries were monitored in real time using the lithium metal reference electrode. Several different modes of operation were used. In one instance, one or both slurries were intermittently pumped into the channels, the pumping stopped, and the slurries in the channel were charged or discharged, following which the slurry in the channel was displaced by fresh slurry and the process repeated. In another mode of operation, the slurries were pumped continuously, with the residence time of each slurry in its respective channel being sufficient for complete charge or discharge before exiting the channel. In yet another mode of operation, one or both slurries were pumped through their respective channels at a rate too high for complete charging or discharging during the residence time, but the slurry was continuously circulated so that over time, all of the slurry in the system was either charged or discharged. In yet another mode of operation, the pumping direction of one or both slurries was periodically reversed during a charging or discharging step, causing more slurry than the channel can accommodate at a given time to be charged or discharged.

Example 13

In-Line Electrochemical Sensor

Figure 11:
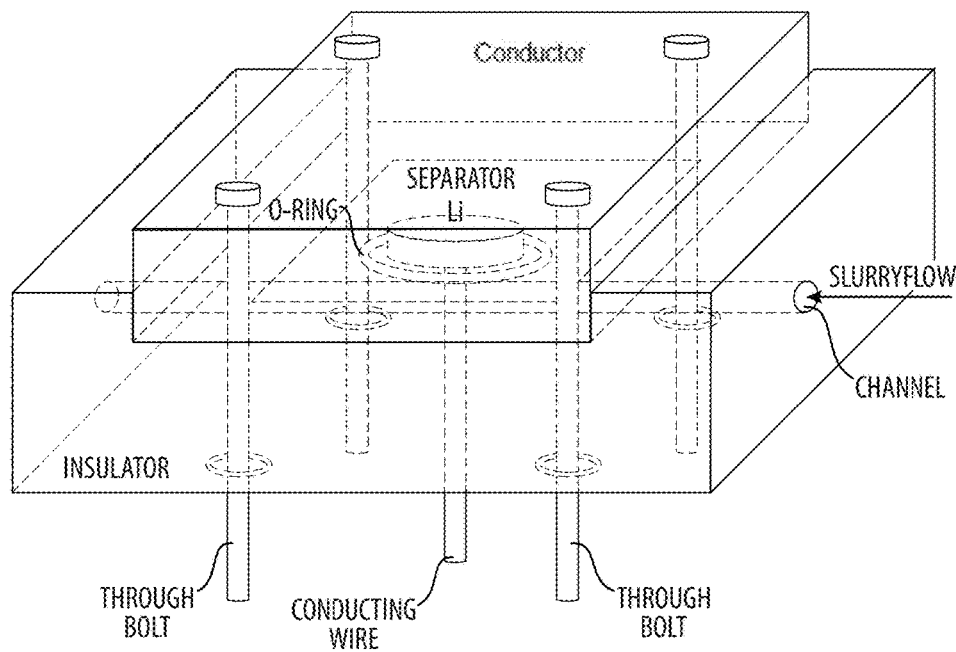
FIG. 11 includes a schematic illustration of an in-line sensor, according to one set of embodiments.
Figure 12:
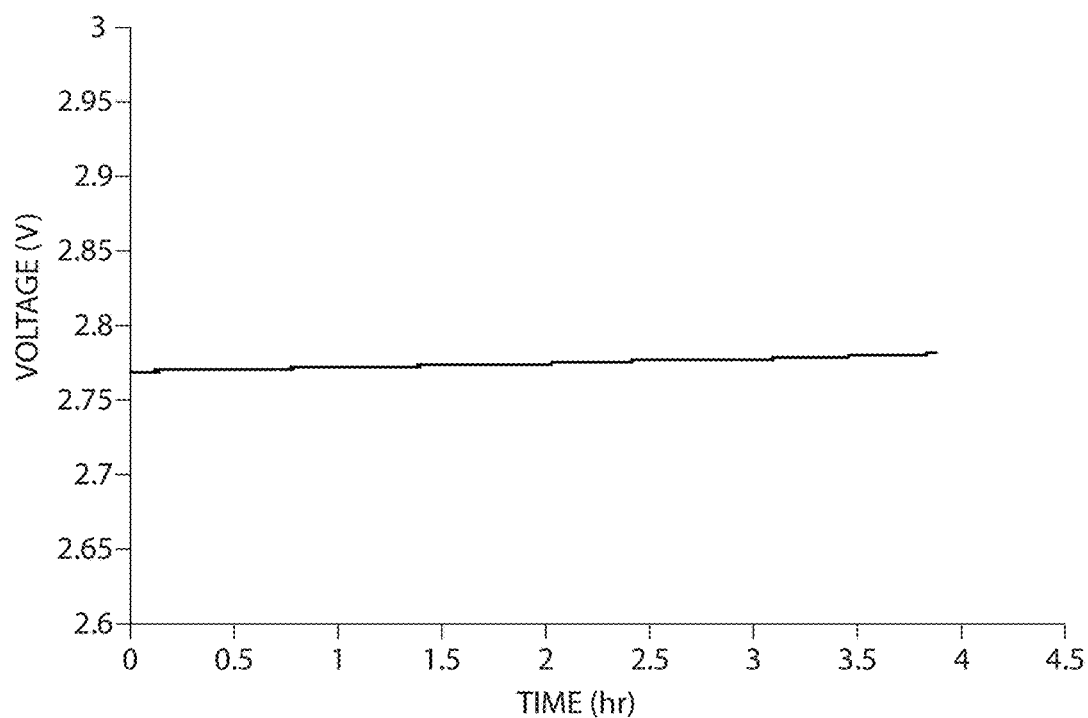
FIG. 12 includes, according to one set of embodiments, a plot of voltage as a function of time.

FIG. 11 includes a schematic illustration of a design for an in-line electrochemical sensor in which a flow channel allows the positive and/or negative flowable redox composition to flow past a galvanostatic sensor. The sensing elements include a lithium metal electrode connected to one terminal of the sensor, and a metal electrode connected to the other terminal of the sensor. The lithium metal electrode can be electronically isolated from the positive or negative flowable redox composition by a an ionically conducting separator layer, which may be a solid inorganic or organic ionic conductor, or a porous separator film infused with liquid electrolyte. In this particular example the electronically isolated metal electrode is a layer of microporous lithium ion battery polymer separator film. FIG. 12 includes a plot of potential as a function of time measured for a flowing semisolid suspension formulated with 20 vol % of a lithium titanate spinel active material and 5 vol % of Ketjen black in a nonaqueous electrolyte comprising 1M LiPF$_6$ in a mixture of alkyl carbonates. This plot demonstrates that the open circuit voltage of the suspension can be monitored over time, showing in this instance that the lithium titanate spinel is in a highly delithiated condition, since upon lithium insertion the open circuit voltage of this material is 1.55V with respect to Li/Li$^+$.

Example 14

Electronically Conductive Semi-Solid Suspensions

The rheology and electronic conductivity of semi-solid suspensions containing a small percentage of a high surface area nanoparticulate conductive carbon was measured, and showed that electronically conductive suspensions that are analogous to "liquid wires" are produced. In this example, the active materials tested are lithium cobalt oxide (LiCoO$_2$, from AGC Seimi Chemical Co. Ltd, Kanagawa, Japan)), lithium titanate spinel (Li$_4$Ti$_5$O$_{12}$, from AltairNano, Reno, Nev.), and Ketjen black (ECP600JD, Akzo Nobel Polymer Chemicals LLC, Chicago, Ill.). Prior to use, the LiCoO$_2$ was jet-milled to reduce its particle size, and the Li$_4$Ti$_5$O$_{12}$ (LTO) was heated under a gas mixture of Ar and H$_2$ in a 95:5 ratio at 800° C. for 20 hours in a quartz tube placed inside a Lindberg/Blue M furnace, in order to reduce the oxide and increase its electronic conductivity. After heat treatment, the color of the powder had changed from white to blue. The active material or carbon or both were weighed and mixed in a 20 mL glass vial and the solid mixture was suspended by addition of a conventional lithium-ion battery electrolyte using LiPF$_6$ as the lithium salt in a mixture of alkyl carbonates (Novolyte Technologies, Independence, Ohio). The resulting suspension was mixed and sonicated in a Branson 1510 ultrasonic bath for between 20 and 60 minutes. The viscosities of the particle suspensions in electrolyte were measured inside an argon-filled glove box using a Brookfield Digital Viscometer, mode DV-II+Pro Extra. The electrical conductivity of suspensions with and without flow was measured in an apparatus with a flow channel on either side of which were stainless steel electrodes, and an insulating body made of PVdF polymer. From the channel diameter and flow velocity, the shear rate of the fluid can be determined.

Figure 13A:
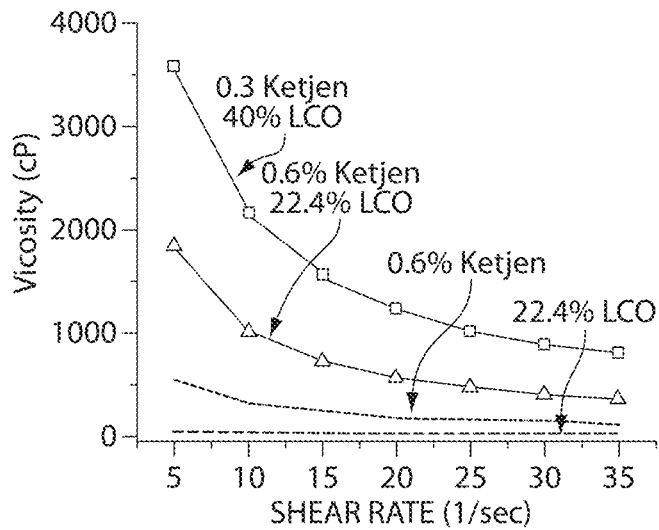
FIGS. 13A-13B include (A) an exemplary plot of viscosity versus shear rate for suspensions of nanoparticulate carbon (Ketjen black) and $LiCoO_2$ (LCO) in alkyl carbonate electrolyte and (B) an exemplary Nyquist plot showing AC impedance of alkyl carbonate electrolyte alone, and suspensions of particles in electrolyte, according to one set of embodiments.
Figure 13B:
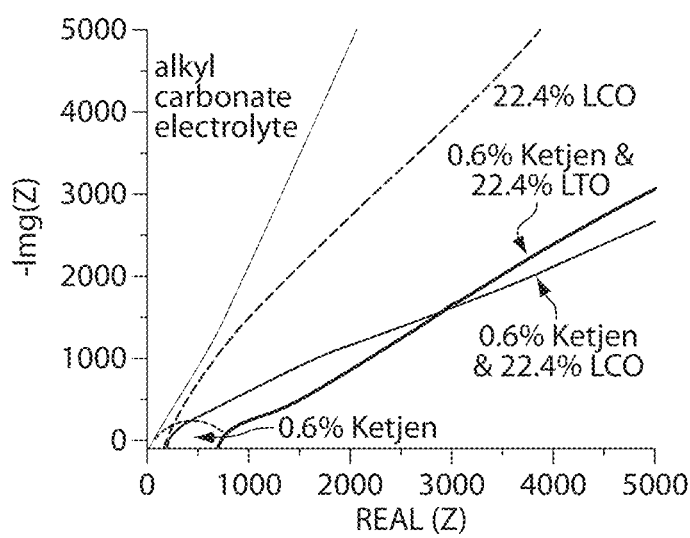

The measurements showed that the dispersed, electronically conductive carbon forms physically and electronically percolating networks within the flowable suspensions that enable charge and discharge of the semisolid suspensions. FIG. 13A shows viscosity versus shear rate for suspensions of nanoparticulate carbon (Ketjen black) and LiCoO$_2$ (LCO) in alkyl carbonate electrolyte. The suspensions show shear thinning behavior consistent with the presence of Ketjen networks that are partially disrupted by shear stress. Thus, even at dilute concentrations of the carbon additive (in the case, <1% volume fraction of Ketjen black), both of the suspensions containing $LiCoO_2$ (LCO) particles and Ketjen exhibit strong shear-thinning behavior characteristic of the carbon additive. FIG. 13B shows a Nyquist plot that shows the ionic and electronic conductivity of the different suspensions and their components. The ionic conductivity of suspensions was set by the electrolyte, while the electronic conductivity was set by the Ketjen black network. For 0.6% Ketjen black, the conductivity under non-flowing conditions was 1.2 mS/cm, while that under a high shear rate of 257 $sec^{-1}$ was reduced only slightly to 0.67 mS/cm, showing that electronic conductivity was maintained. Note that 0.6% Ketjen imparted similar electronic conductivity to suspensions containing either LCO or LTO. The conductivity of the LCO and Ketjen mixture was 0.06 mS/cm, and the conductivity of the ($Li_4Ti_5O_{12}$) LTO and Ketjen suspension was 0.01 mS/cm. The results show that while shear (due to flow) can change the electrical conductivity of the suspension, indicative of carbon networks that are physically altered by shear, it is possible to produce suspension formulations that have very low fractions of carbon additives and yet which have high electronic conductivities comparable to the ionic conductivities of the liquid electrolyte. Such a situation is desirable given that the semi-solid electrode materials should, like other battery electrodes, exhibit mixed electronic-ionic conductivity.

Example 15

Nonaqueous Flow Cell Using Cathode Semi-Solid Suspension

Figure 14:
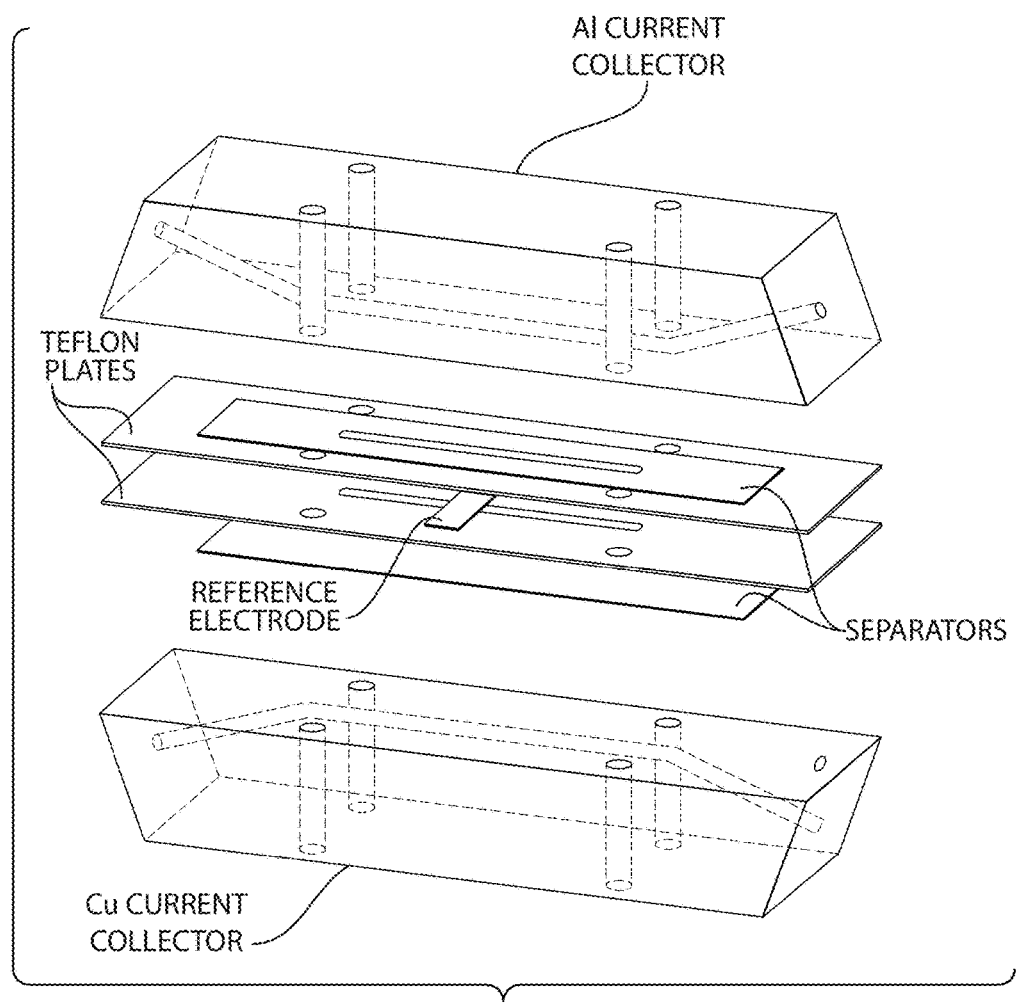
FIG. 14 includes, according to some embodiments, a flow cell configuration for energy storage.
Figure 15:
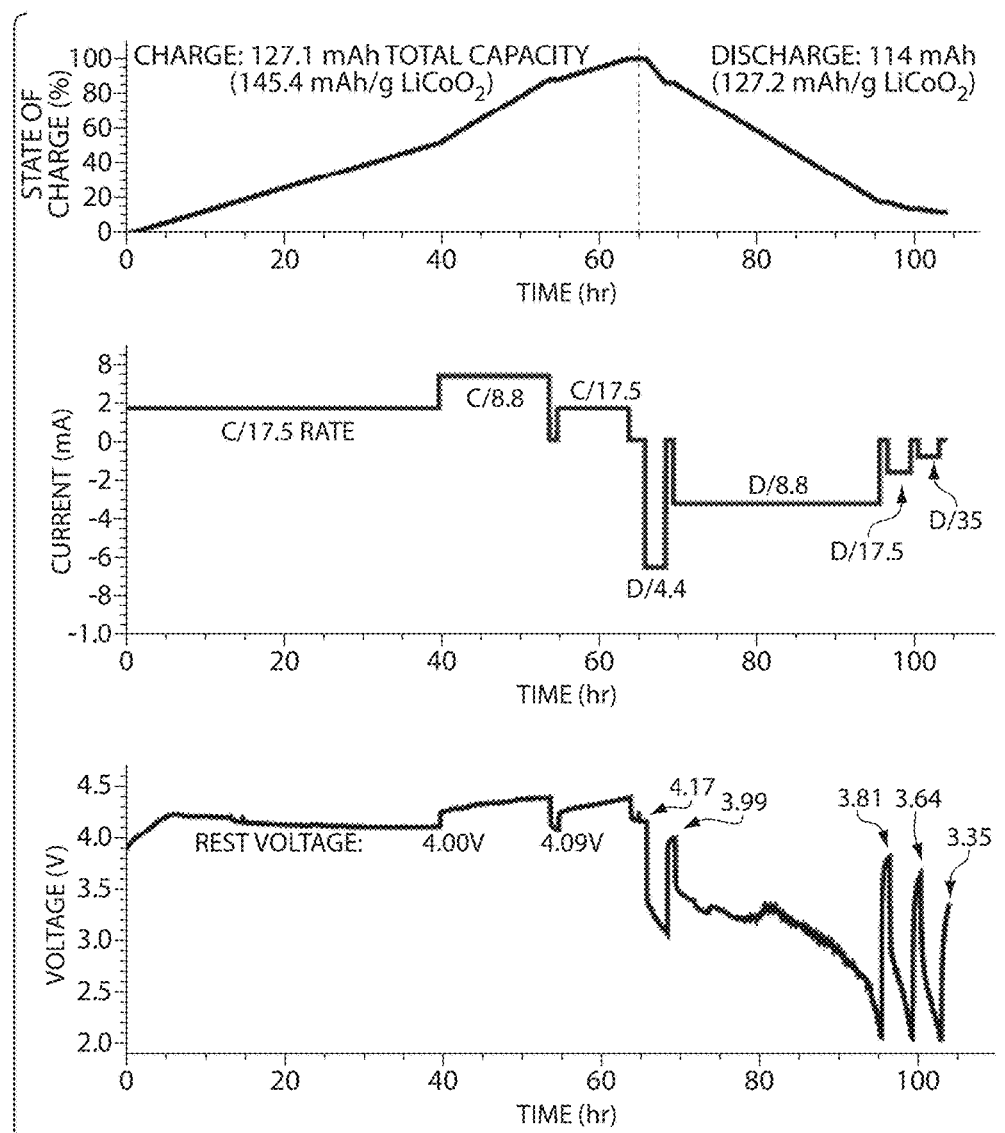
FIG. 15 includes exemplary plots of the state of charge, current, and voltage as a function of time for a semi-solid half-flow-cell test involving a multi-step galvanostatic charge/discharge of a $LiCoO_2$ suspension flowing continuously at 20.3 mL/min, separated from stationary Li metal negative electrode by microporous separator film, according to one set of embodiments.

A semi-solid suspension having by mass 51.3% $LiCoO_2$, 0.7% Ketjen black, and 48% of a nonaqueous electrolyte consisting of $LiPF_6$ in a mixture of alkyl carbonates (by volume: 22.4% $LiCoO_2$, 0.7% Ketjen black, and 76.9% electrolyte) was prepared according to the method of Example 14. FIG. 14 shows a schematic of the electrochemical cell configuration. The negative half was machined from 101 copper alloy and the positive half from 6061 aluminum alloy. The flow channel has a $\frac{1}{16}$" diameter and a volume of 0.16 ml. A stationary lithium metal foil electrode was affixed to the channel in the copper negative half of the cell, and separated from the flowing cathode semi-solid by a layer of microporous separator (Tonen Chemical Corporation, Japan). The working surface of the 6061 aluminum alloy cell components was sputtered with gold to reduce interfacial impedance. Electrochemical testing was performed using a Solartron potentiostat operating a 1400 Cell Test System (AMETEK Inc., Paioli, Pa., USA). Continuous flow experiments were performed using a Masterflex peristaltic pump (Masterflex, Vernon Hills, Ill., USA); Chem-Sure™ tubing (W.L. Gore and Associates, Elktron, Md., USA) was used inside the pump and was connected to the cell using Masterflex Chem-Durance™ tubing. The semi-solid was continuously circulated at 20.3 mL/min through the single channel half-flow-cell depicted in FIG. 14, while conducting multi-step galvanostatic charging/discharging between 2 and 4.4V (rate varied between C/8.8 and D/4.4). FIG. 15 includes plots of the state of charge, current, and voltage as a function of time for the cycled cell. The charge capacity at 4.4V (rest voltage 4.2V) corresponds to a $LiCoO_2$ specific capacity of 146 mAh/g (system-value), while the discharge capacity corresponds to 127 mAh/g. Compared to the expected reversible capacity of about 140 mAh/g, these values demonstrate high utilization of the system's $LiCoO_2$. Note that the 12.5% lower discharge capacity was obtained at a higher average discharge than charge rate and does not represent the maximum achievable coulombic efficiency.

Example 16

Nonaqueous Flow Cell Using Anode Semi-Solid Suspension

Figure 16:
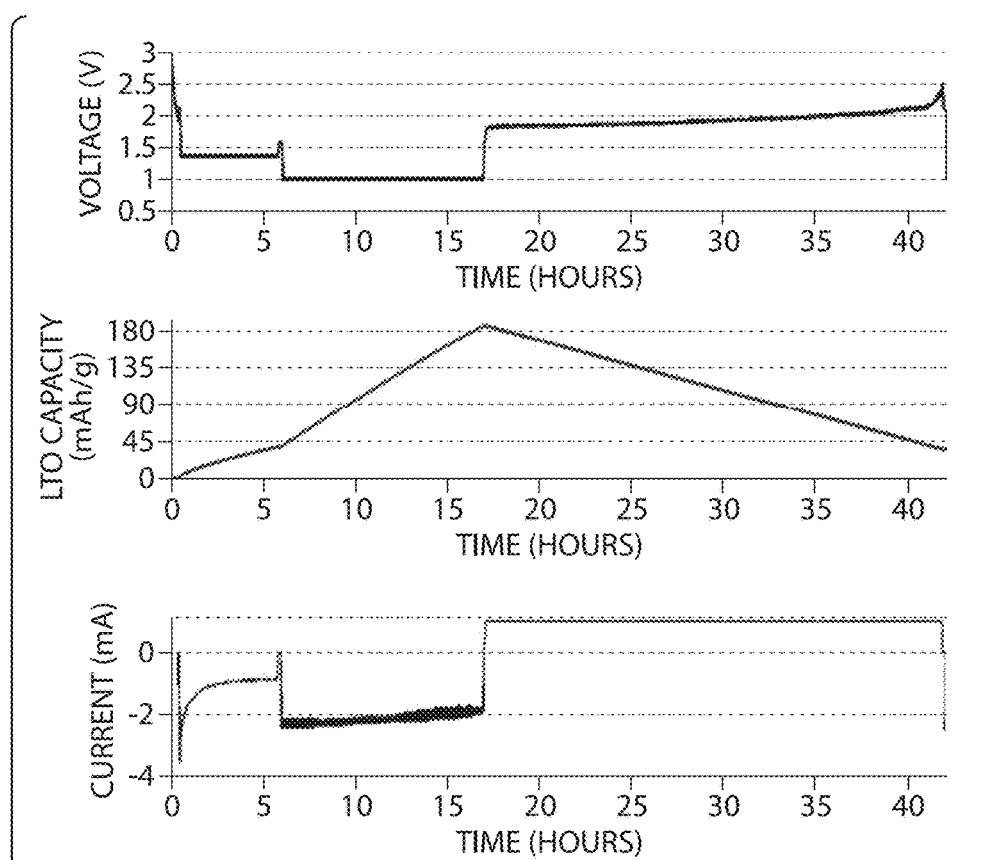
FIG. 16 includes, according to some embodiments, exemplary plots of voltage, charge storage capacity, and current as a function of time for a semi-solid anode suspension measured during continuous flow at 10 mL/min vs. a lithium metal counterelectrode.

A semi-solid suspension was prepared, having by mass 13.1% $Li_4Ti_5O_{12}$ (heat treated in reducing ambient as in Example 14), 1.7% Ketjen black, and 85.1% of a nonaqueous electrolyte consisting of 70:30 mass ratio of 1,3-dioxolane and LiBETI salt (by volume: 5.8% $Li_4Ti_5O_{12}$, 1.2% Ketjen black, and 93% electrolyte). The suspension was flowed through a cell like that in Example 15, with a $\frac{1}{16}$" diameter channel, at a flow rate of 10 mL/min. A lithium metal foil counterelectrode was used, as in Example 15. However, instead of being charged galvanostatically, the cell was charged potentiostatically, first at 1.35V and then at 1.0V, as shown in FIG. 16. After being fully charged potentiostatically, the cell was discharged galvanostatically at a current density of 17.1 $A/m^2$, the area being that of the microporous separator (made by Tonen). FIG. 16 shows the voltage, charge capacity, and current as a function of time. It is seen that the continuously flowing semi-solid suspension can be charged with a capacity of about 180 mAh/g and discharged with a discharge capacity of about 140 mAh/g, the specific capacity being that for the $Li_4Ti_5O_{12}$ alone, indicating substantially complete charging and discharging of the anode compound.

Example 17

Dual Electrolyte Lithium Ion Cell

Figure 17:
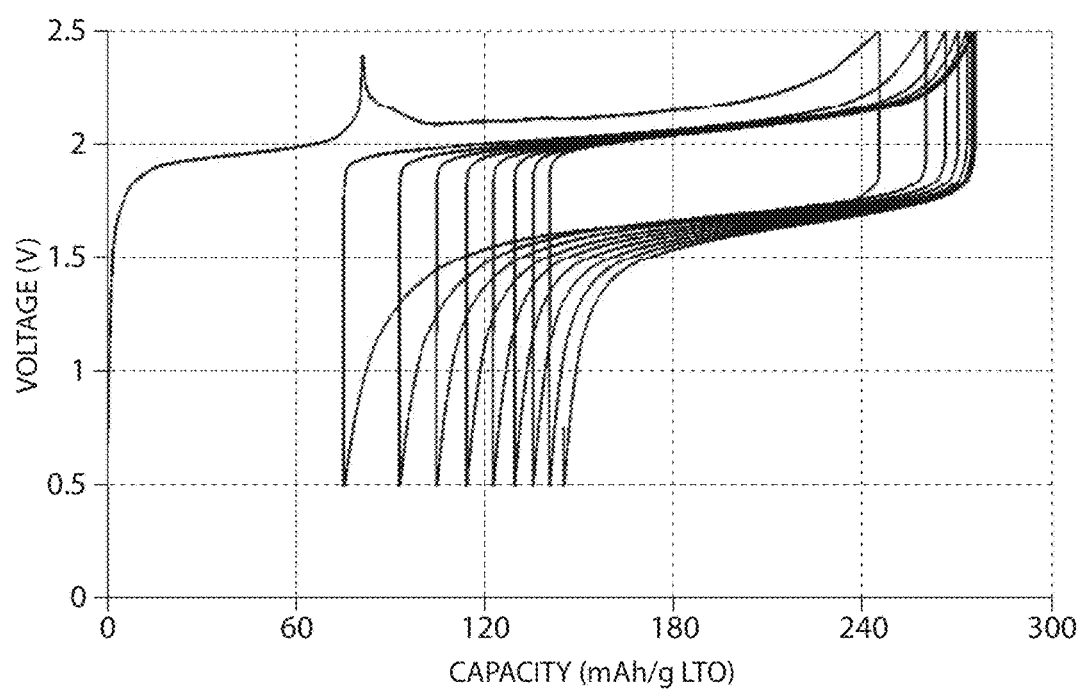
FIG. 17 includes an exemplary plot of voltage as a function of capacity for a dual electrolyte lithium ion cell using a semi-solid nanoscale olivine cathode and a semi-solid lithium titanate spinel anode, according to one set of embodiments.

The stability of common solvents found in commercial Li-ion batteries is directly dependent on the most polar chemical group found in the molecule. The most stable molecules are, going from 5 to 0 V vs. a $Li/Li^+$ electrode: carbonates (such as dimethly carbonate), esters (such as γ-butyrolactone) and ethers (such as 1,2-dimethoxyethane, tetrahydrofurane or 1,3-dioxolane). At the low insertion potentials of many anodes, solvent reduction can form detrimental insulating solid-electrolyte interface (SEI) films. This example demonstrates the use of dual fluid electrolytes in a redox flow energy storage device. A semi-solid anode suspension was prepared, having by mass 34.0% $Li_4Ti_5O_{12}$ (reduced as in Example 14), 1.1% Ketjen black, and 64.9% of a nonaqueous electrolyte consisting of 70:30 mass ratio of 1,3-dioxolane and LiBETI salt (by volume: 17.0% $Li_4Ti_5O_{12}$, 0.9% Ketjen black, and 82.1% electrolyte). The two suspensions were separated by a layer of microporous separator in a non-flowing cell. FIG. 17 shows galvanostatic charge-discharge curves for the cell, measured at a current density of 9.4 $A/m^2$ of separator. The charge and discharge voltages are as expected for this electrochemical couple, taking into account cell polarization. Since the cell has an excess of cathode capacity to anode capacity, the cell specific capacity is calculated with respect to the mass of $Li_4Ti_5O_{12}$ anode, and is about 130 mAh/g, showing good utilization of the active material in this semi-solid lithium ion cell.

Example 18

Ether Based Electrolyte for Semi-Solid Electrodes

Figure 18:
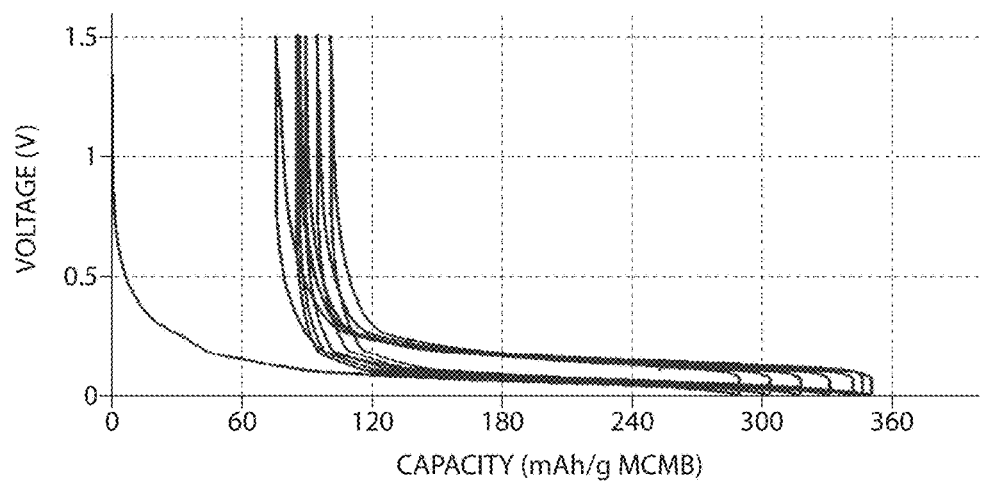
FIG. 18 includes, according to one set of embodiments, an exemplary plot of voltage vs. capacity for a system comprising a MCMB graphite anode semi-solid suspension tested in a dioxolane based electrolyte vs. a lithium metal counterelectrode.

The stability of common solvents found in commercial Li-ion batteries is directly dependent on the most polar chemical group found in the molecule. The most stable molecules are, going from 5 to 0 V vs. a Li/Li$^+$ electrode: carbonates (such as dimethly carbonate), esters (such as γ-butyrolactone) and ethers (such as 1,2-dimethoxyethane, tetrahydrofurane or 1,3-dioxolane). At the low insertion potentials of many anodes, solvent reduction can form detrimental insulating solid-electrolyte interface (SEI) films. This example demonstrates the use of ether based electrolytes to provide electrochemical stability under such conditions. A semi-solid anode suspension was prepared, having by mass 51.8% MCMB graphite (grade 6-28, Osaka Gas Co., Osaka, Japan) and 48.2% of an electrolyte consisting of 2M LiClO$_4$ in 1,3-dioxolane. By volume, the semi-solid has 40% MCMB and 60% electrolyte. The semi-solid anode was tested vs. a lithium metal anode in an non-flowing cell under C/8 galvanostatic conditions (current density 18.7 A/m$^2$ of Tonen separator). FIG. 18 shows the voltage vs. capacity results, which show that despite the low insertion potential, and absence of conductive additives, reversible cycling is obtained.

Example 19

Ionic Liquid Electrolyte for Semi-Solid Electrod

Figure 19:
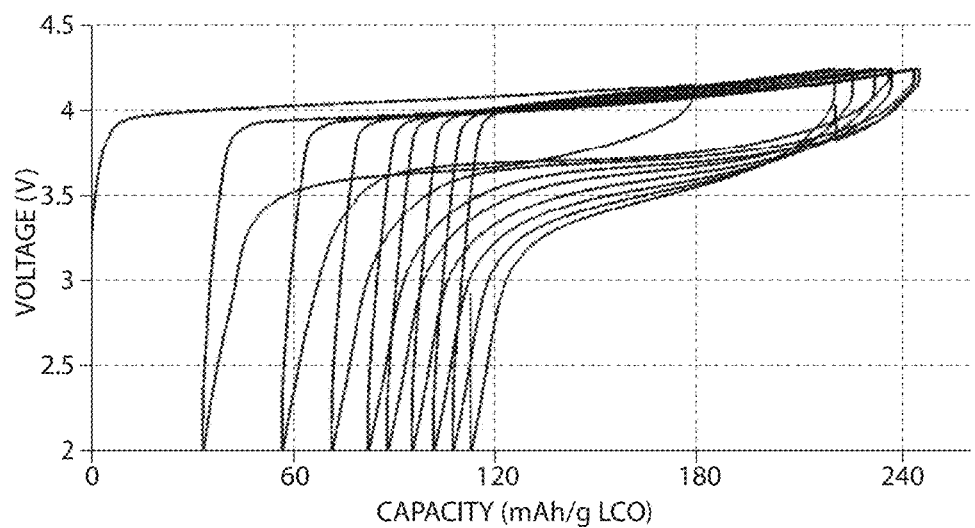
FIG. 19 includes an exemplary plot of voltage as a function of specific capacity for a $LiCoO_2$ cathode semi-solid suspension tested against a lithium metal counterelectrode in a [Li(G4)]TFSI ionic liquid electrolyte at C/11 rate, according to one set of embodiments.

In linear ethers with 4 or more oxygen atoms, the solvent can wrap around the Li$^+$ ion to form a more stable coordinated cation. At 1:1 molar ratios of solvent to salt, the product of mixing is an ionic liquid of the formula [Li(ether)](anion). Such ionic liquids have been proven to be electrochemically stable in the 0 to 5 V potential range vs. the Li/Li$^+$ electrode, which makes them suitable electrolytes for 4 V semi-solid flow cells. FIG. 19 shows the voltage vs. capacity curve for C/11 galvanostatic cycling (3.4 A/cm$^2$ of Celgard 2500 separator, Celgard LLC, Charlotte, N.C.) of a cathode semi-solid suspension having by mass 28.1% LiCoO$_2$, 3.4% Ketjen black, and 68.5% of tetraglyme and lithium bis(trifluoromethane)sulfonimide in a 1:1 molar ratio (referred to as [Li(G4)]TFSI), tested against a lithium metal counterelectrode in a non-flowing cell. By volume, the semi-solid has 10.0% cathode, 3.0% Ketjen, and 87.9% electrolyte. The cathode specific capacity with respect to the LiCoO$_2$ alone is about 120 mAh/g, showing good utilization of the semi-solid suspension.

Example 20

Cathode-Anode-Electrolyte Combinations for Semi-Solid Flow Cells

Selection of a suitable cathode-anode-electrolyte depends on the potentials at which the cathode and anode store ions, as well as the stability window of the electrolyte. FIG. 20 shows several suitable combinations. SSDE refers to LiPF$_6$ in a mixture of alkyl carbonates; DMC refers to LiPF$_6$ in dimethyl carbonate; DXL refers to 2M LiClO$_4$ in 1,3-dioxolane; DOL refers to 70:30 mass ratio of 1,3-dioxolane and LiBETI; and Li(G4)]TFSI refers to tetraglyme and lithium bis(trifluoromethane)sulfonimide in a 1:1 molar ratio. For example:

Olivine cathodes such as lithium iron phosphate or lithium manganese phosphate or their solid solutions, or doped and nanoscale olivines, can be used with Li$_4$Ti$_5$O$_{12}$ (LTO) in DMC based electrolytes. Such systems will have an operating voltage of 1.9 V to 2.5V. Power and cycle life is expected to be excellent for nanoscale active materials in these systems.

LiMn$_2$O$_4$—graphite used with DXL has a higher cell voltage of 2.8 V.

Li$_2$MnO$_3$.LiMO$_2$—LTO used with DMC has a cell voltage of 2.9 V. This high capacity cathode when used with the higher voltage LTO anode still has a high cell voltage and is expected to have high anode stability.

Li$_2$MnO$_3$.LiMO$_2$ when used with a high capacity anode such as that produced by 3M, or Si, or even graphite, and used with [Li(G4)]TFSI electrolyte will have a high energy density due to the high capacity of both cathode and anode, and the higher cell voltage: of 3.9-4.3 V. Note that the cycle life of high capacity anodes such as Si and the 3M alloy, which undergo large volume changes as they are charged and discharged, is likely to be improved in our semi-solid electrodes since the active materials particles are free to expand and contract within the liquid phase without generating large stresses as they do in a conventional electrode.

Example 21

Aqueous Lithium Ion Semi-Solid Flow Battery Using LiV$_3$O$_8$—LiCoO$_2$ in 5 M LiNO$_3$ Electrolyte This example is illustrative of a semi-solid flow battery that uses lithium metal oxides as the cathode and anode in conjunction with an aqueous lithium-ion conducting electrolyte.

Preparation of Aqueous Lithium Vanadium Oxide Anode Slurry:

Lithium vanadium oxide powder with a composition of LiV$_3$O$_8$ is synthesized via a solid state reaction method. LiOH is mixed with V$_2$O$_5$ in amounts producing the stoichiometric ratio of Li to V in LiV$_3$O$_8$. The powder mixture is ball milled for 24 hrs in methanol and then dried at 60° C. The dried powder mixture is then fired at 600° C. for 24 hr in air resulting in the LiV$_3$O$_8$ compound. To prepare the anode slurry, 15-30% by volume of lithium vanadate is mixed with 0.5-2% by volume of COOH functionalized carbon nanotube as a conductive additive. The dry powders are first mixed using a vortex mixer for 2 mins. The balance of the suspension is an electrolyte consisting of a 5 M solution of LiNO$_3$ in water. This electrolyte is added to the powder mixture and the mixture is sonicated for 1 hr to obtain the anode slurry.

Preparation of Aqueous Lithium Cobalt Oxide Cathode Slurry:

Suspensions containing 35% by volume of lithium cobalt oxide, 0.6-2% by volume of COOH functionalized carbon nanotubes, and the balance being an electrolyte consisting of a 5M solution of LiNO$_3$ in water, are prepared. For example, 3.5 g of lithium cobalt oxide is mixed with 0.0259 g of the carbon using a vortex mixture for 2 mins. Afterwards, the electrolyte is added in the appropriate amount to make up the balance of the semi-solid suspension, and mixture is sonicated for 1 hr.

The cathode and anode suspensions are used in a flow cell of the design in Example 15, but in which both current collectors are fabricated from a high chromium content stainless steel. Optionally, the stainless steel in contact with the semi-solid suspensions is coated with gold by electroplating. The separator membrane is selected to be one with improved wetting by an aqueous electrolyte, such as Celgard 3501.

Example 22

Lithium Ion Semi-Solid Flow Battery Using LiFePO$_4$—Li$_4$Ti$_5$O$_{12}$ in Aqueous Electrolyte Having 1 M LiNO$_3$ and 1M LiOH This example is illustrative of a semi-solid flow battery that uses lithium metal oxides as the cathode and anode in conjunction with an aqueous lithium-ion conducting electrolyte, and has a relatively high operating voltage.

Preparation of an Aqueous Lithium Titanate Spinel Anode Slurry:

A suspension containing 30% by volume of lithium titanium oxide (Li$_4$Ti$_5$O$_{12}$) and 1% by volume of Ketjen black as the conductive additive in 69% by volume of an aqueous electrolyte containing 1M each of LiNO$_3$ and LiOH is prepared by first mixing 2.076 g Li$_4$Ti$_5$O$_{12}$ and 0.0432 g of the Ketjen black in the dry state using a vortex mixer for 2 mins. 1.38 ml of the electrolyte is then added and the mixture is sonicated for 1 hr.

Preparation of an Aqueous Lithium Iron Phosphate Cathode Slurry:

A suspension containing 20% by volume of a carbon-coated lithium iron phosphate with 1% by volume of Ketjen black in 69% by volume of an aqueous electrolyte containing 1M each of LiNO$_3$ and LiOH is synthesized by mixing 3.577 g of lithium iron phosphate and 0.108 g of carbon in the dry state for 2 min using a vortex mixer. 3.95 ml of the electrolyte is then added, and the mixture is sonicated for 1 hr.

The cathode and anode suspensions are used in a flow cell of the design in Example 15, but in which both current collectors are fabricated from a high chromium content stainless steel. Optionally, the stainless steel in contact with the semi-solid suspensions is coated with gold by electroplating. The separator membrane is selected to be one with improved wetting by an aqueous electrolyte, such as Celgard 3501.

Example 23

Aqueous Sodium Ion Semi-Solid Flow Battery Using Na$_x$MnO$_2$—Activated Carbon in 1 M Na$_2$SO$_4$ Electrolyte This example is illustrative of an aqueous sodium ion semi-solid flow battery that uses a sodium metal oxide as the cathode and activated carbon as the anode. The cathode stores Na primarily by an intercalation reaction, while the anode stores Na primarily by surface adsorption.

Preparing an Aqueous Activated Carbon Anode Slurry:

A suspension containing 20% by volume of activated carbon (Darco, G-60) and 80% by volume of a 5M LiNO$_3$ aqueous electrolyte is prepared. 0.65 g of activated carbon is mixed with 1.2 ml of an electrolyte consisting of 1M Na$_2$SO$_4$ in water. The mixture is sonicated for 1 hr.

Preparing an Aqueous Sodium Manganese Oxide Cathode Slurry:

Sodium manganese oxide powder with a composition of Na$_{0.44}$MnO$_2$ is synthesized via a solid state reaction method. NaCO$_3$ powder is mixed with MnCO$_3$ powder in a ratio producing the Na:Mn stoichiometry of the oxide compound. The powder mixture is ball milled in methanol for 24 hrs and then dried at 60° C. The homogeneously mixed powder is then fired at 300° C. for 8 hr in air. After firing at 300° C. the powder is ground and is re-fired at 800° C. for another 9 hrs in air to obtain Na$_{0.44}$MnO$_2$. A cathode suspension containing 20% by volume of the sodium manganese oxide and 2% by volume of COOH functionalized carbon nanotubes as the conductive additive is mixed with 78% by volume of an electrolyte consisting of a 5M solution of LiNO$_3$ in water. Specifically, 1.269 g of sodium manganese oxide is mixed with 0.0648 g of the COOH functionalized carbon nanotubes. The dry powders are mixed using a vortex mixer for 2 mins. Afterwards, 1.17 ml of the 1 M Na$_2$SO$_4$ electrolyte is added to the powder mixture and the mixture is sonicated for 1 hr.

The cathode and anode suspensions are used in a flow cell of the design in Example 15, but in which both current collectors are fabricated from a high chromium content stainless steel. Optionally, the stainless steel in contact with the semi-solid suspensions is coated with gold by electroplating. The separator membrane is selected to be one with improved wetting by an aqueous electrolyte, such as Celgard 3501.

It is recognized, of course, that those skilled in the art may make various modifications and additions to the processes of the invention without departing from the spirit and scope of the present contribution to the art. Accordingly, it is to be understood that the protection sought to be afforded hereby should be deemed to extend to the subject matter of the claims and all equivalents thereof fairly within the scope of the invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or; when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A redox energy storage device comprising:
a positive electrode active material, a negative electrode active material, and an ion-permeable medium separating said positive and negative electrode active materials, wherein at least one of said positive and negative electrode active materials comprises solid ion-storing electroactive particles in a non-aqueous electrolyte, which particles (1) are capable of taking up or releasing said ions, and (2) remain substantially insoluble, during operation of the device,
wherein
a volume percentage of the solid ion-storing electroactive particles within the non-aqueous electrolyte is between 5% and 70%.

2. A redox energy storage device comprising:
a positive electrode active material, a negative electrode active material, and an ion-permeable medium separating said positive and negative electrode active materials, wherein at least one of said positive and negative electrode active materials comprises solid ion-storing electroactive particles in an aqueous liquid carrier, which particles (1) are capable of taking up or releasing said ions, and (2) remain substantially insoluble, during operation of the device,
wherein
a volume percentage of the solid ion-storing electroactive particles within the aqueous liquid carrier is between 5% and 70%.

3. A composition for a redox energy storage device, comprising solid ion-storing electroactive particles in a liquid, which particles (1) are capable of taking up or releasing said ions, and (2) remain substantially insoluble, during operation of the device, wherein a volume percentage of the solid ion-storing electroactive particles within the liquid is between 5% and 70%.

4. The redox energy storage device of claim 1, wherein the positive electrode active material comprises the solid ion-storing electroactive particles in the non-aqueous electrolyte.

5. The redox energy storage device of claim 1, wherein the negative electrode active material comprises the solid ion-storing electroactive particles in the non-aqueous electrolyte.

6. The redox energy storage device of claim 1, wherein the positive electrode active material is at least partially disposed within a positive electroactive zone between the ion-permeable medium and a positive electrode current collector.

7. The redox energy storage device of claim 1, wherein the negative electrode active material is at least partially disposed within a negative electroactive zone between the ion-permeable medium and a negative electrode current collector.

8. The redox energy storage device of claim 1, further comprising a conductive additive in the non-aqueous electrolyte.

9. The redox energy storage device of claim 8, wherein a volume percentage of total solids including the conductive additive within the non-aqueous electrolyte is between 10% and 75%.

10. The composition of claim 3, further comprising a conductive additive in the liquid.

11. The composition of claim 10, wherein a volume percentage of total solids including the conductive additive within the liquid is between 10% and 75%.

12. The redox energy storage device of claim 8, wherein the conductive additive forms a percolative continuously electronically conductive network in the non-aqueous electrolyte.

13. The redox energy storage device of claim 1, wherein the ion-storing electroactive particles store at least one of Li, Na, and H.

14. The redox energy storage device of claim 2, further comprising a conductive additive in the aqueous liquid carrier.

15. The redox energy storage device of claim 14, wherein a volume percentage of total solids including the conductive additive within the aqueous liquid carrier is between 10% and 75%.

16. The redox energy storage device of claim 14, wherein the conductive additive forms a percolative continuously electronically conductive network in the aqueous liquid carrier.

17. The redox energy storage device of claim 2, wherein the ion-storing electroactive particles store at least one of Li, Na, and H.

18. The composition of claim 10, wherein the conductive additive forms a percolative continuously electronically conductive network in the liquid.

19. The composition of claim 3, wherein the ion-storing electroactive particles store at least one of Li, Na, and H.

* * * * *